(12) United States Patent
Smith et al.

(10) Patent No.: US 10,104,318 B2
(45) Date of Patent: Oct. 16, 2018

(54) HIGH DYNAMIC-RANGE IMAGE SENSOR

(71) Applicant: Rambus Inc., Sunnyvale, CA (US)

(72) Inventors: Craig M. Smith, Spencerport, NY (US); Frank Armstrong, Rochester, NY (US); Jay Endsley, San Jose, CA (US); Thomas Vogelsang, Mountain View, CA (US); James E. Harris, Tyler, TX (US); John Ladd, Santa Clara, CA (US); Michael Guidash, Rochester, NY (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 15/100,976

(22) PCT Filed: Dec. 3, 2014

(86) PCT No.: PCT/US2014/068421
§ 371 (c)(1),
(2) Date: Jun. 1, 2016

(87) PCT Pub. No.: WO2015/084991
PCT Pub. Date: Jun. 11, 2015

(65) Prior Publication Data
US 2016/0323524 A1    Nov. 3, 2016

Related U.S. Application Data

(60) Provisional application No. 61/911,575, filed on Dec. 4, 2013, provisional application No. 61/911,579, filed
(Continued)

(51) Int. Cl.
*H04N 5/355* (2011.01)
*H04N 5/232* (2006.01)
(Continued)

(52) U.S. Cl.
CPC ........... *H04N 5/355* (2013.01); *H04N 5/2355* (2013.01); *H04N 5/23245* (2013.01);
(Continued)

(58) Field of Classification Search
CPC .. H04N 5/23245; H04N 5/2355; H04N 5/347; H04N 9/045; H04N 5/361; H04N 5/37457; H04N 5/355
See application file for complete search history.

(56) References Cited

U.S. PATENT DOCUMENTS 7,514,716 B2    4/2009  Panicacci
8,026,966 B2 *  9/2011  Altice ................ H04N 5/35527
                                              348/294
(Continued)

FOREIGN PATENT DOCUMENTS

EP    1499112 A2    1/2005
EP    2063632 A1    5/2009
(Continued)

OTHER PUBLICATIONS

Jiminez, Manuel, "Combining Different Binning Data With Pixinsight," downloaded from http://www.manuelj.com/Tutorials/Combining-different-binning/22233628_LF2mX8#!l=1776178855&k32 Jc9KHMn on Jun. 7, 2013. 2 pages.
(Continued)

*Primary Examiner* — Twyler Haskins
*Assistant Examiner* — Carramah J Quiett
(74) *Attorney, Agent, or Firm* — Charles Shemwell

(57) ABSTRACT

A pixel array within an integrated-circuit image sensor is exposed to light representative of a scene during a first frame interval and then oversampled a first number of times within the first frame interval to generate a corresponding first number of frames of image data from which a first output image may be constructed. One or more of the first number
(Continued)

of frames of image data are evaluated to determine whether a range of luminances in the scene warrants adjustment of an oversampling factor from the first number to a second number, if so, the oversampling factor is adjusted such that the pixel array is oversampled the second number of times within a second frame interval to generate a corresponding second number of frames of image data from which a second output image may be constructed.

20 Claims, 45 Drawing Sheets

Related U.S. Application Data on Dec. 4, 2013, provisional application No. 61/914,394, filed on Dec. 11, 2013, provisional application No. 61/918,382, filed on Dec. 19, 2013.

(51) Int. Cl.
| | | |
|---|---|---|
| *H04N 5/235* | (2006.01) | |
| *H04N 5/347* | (2011.01) | |
| *H04N 5/361* | (2011.01) | |
| *H04N 5/3745* | (2011.01) | |
| *H04N 9/04* | (2006.01) | |

(52) U.S. Cl.
CPC ......... *H04N 5/347* (2013.01); *H04N 5/35536* (2013.01); *H04N 5/361* (2013.01); *H04N 5/37457* (2013.01); *H04N 9/045* (2013.01)

(56) References Cited

U.S. PATENT DOCUMENTS

| | | | |
|---|---|---|---|
| 8,059,174 B2 | 11/2011 | Mann et al. | |
| 8,169,517 B2 | 5/2012 | Poonnen et al. | |
| 2002/0008766 A1 | 1/2002 | Tariki | |
| 2007/0262237 A1 | 11/2007 | Mann | |
| 2008/0055441 A1* | 3/2008 | Altice | H04N 5/35527 |
| | | | 348/297 |
| 2008/0219585 A1 | 9/2008 | Kasai et al. | |
| 2009/0059044 A1 | 3/2009 | Tay | |
| 2009/0086056 A1 | 4/2009 | Asoma | |
| 2012/0069213 A1 | 3/2012 | Jannard et al. | |
| 2012/0188392 A1 | 7/2012 | Smith | |
| 2012/0307121 A1 | 12/2012 | Lu et al. | |
| 2012/0314100 A1 | 12/2012 | Frank | |
| 2012/0314124 A1 | 12/2012 | Kaizu et al. | |
| 2013/0009042 A1 | 1/2013 | Bechtel et al. | |
| 2013/0050520 A1 | 2/2013 | Takeuchi | |

FOREIGN PATENT DOCUMENTS

| | | |
|---|---|---|
| WO | WO-2012-098117 A2 | 7/2012 |
| WO | WO-20134070942 A1 | 11/2012 |

OTHER PUBLICATIONS

Notification Concerning Transmittal of International Preliminary Report on Patentability dated Jun. 16, 2016 re: Int'l Appln. No. PCT/US14/063421. 13 Pages.
Nurmi, Pasi, "Combining Binned Images Using the Drizzle Algorigthm," 2003, downloaded from wwwhip.obspm.fr/heritage/gaia/dms/torino/PN-Torino2003.pdf. 23 pages.
PCT Int'l Search Report and Written Opinion dated Mar. 4, 2015 re PCT/US14/68421. 20 pages.
Solhusvik, Johannes, et al. "A comparison of high dynamic range CIS technologies for automotive applications." Proc. 2013 Int. Image Sensor Workshop (IISW). 2013. 4 pages.
EP Extended European Search Report dated Jul. 24, 2017 re: EP Appln. No. 14868569.6. 8 Pages.
EP Response Filed on Feb. 16, 2018 in Response to the Official Communication dated Jul. 24, 2017 re: EP Appln. No. 14868569.6. 16 Pages.

* cited by examiner

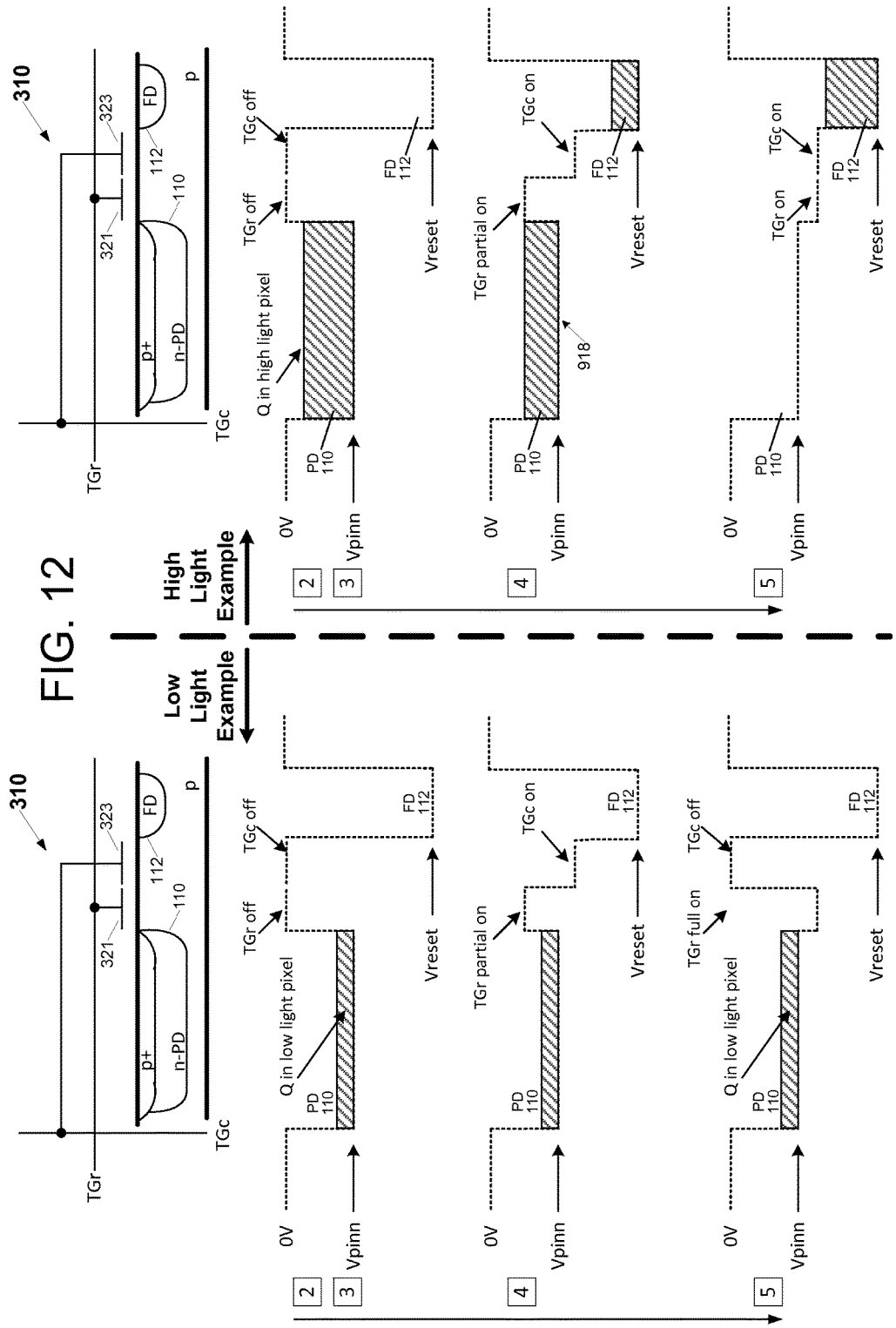

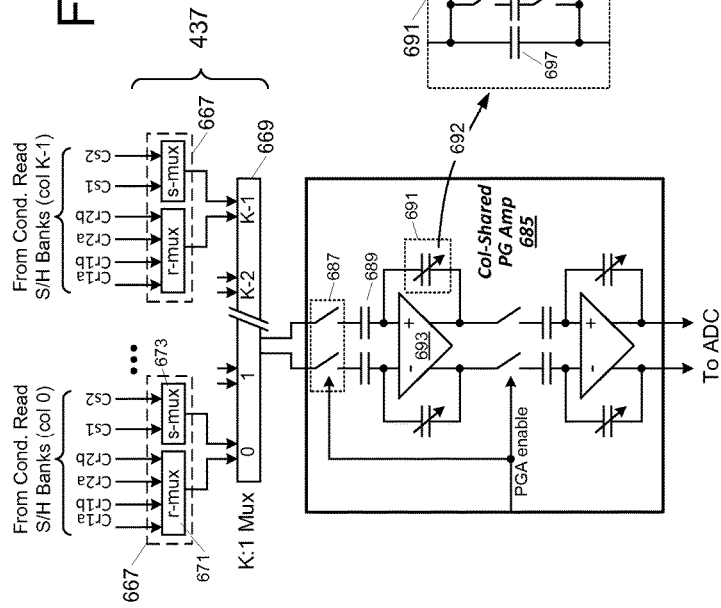
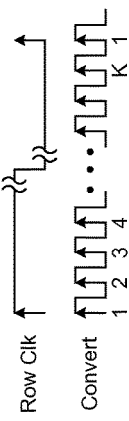
FIG. 22
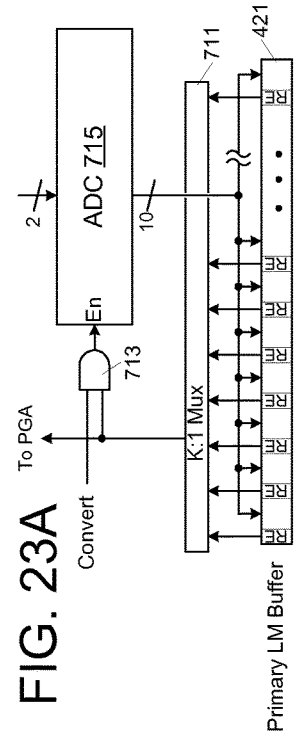
FIG. 23B
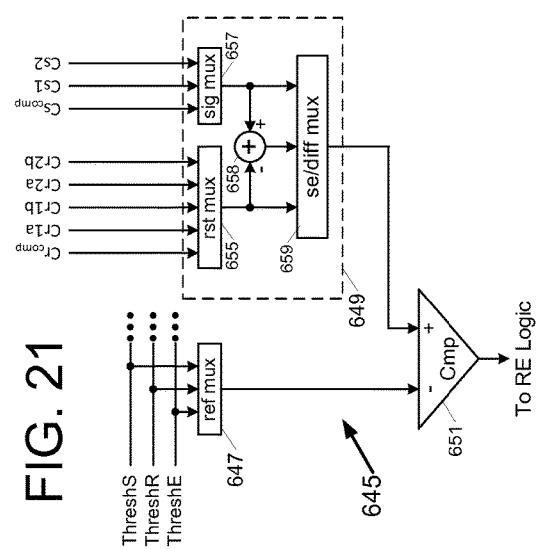
FIG. 21
FIG. 23A

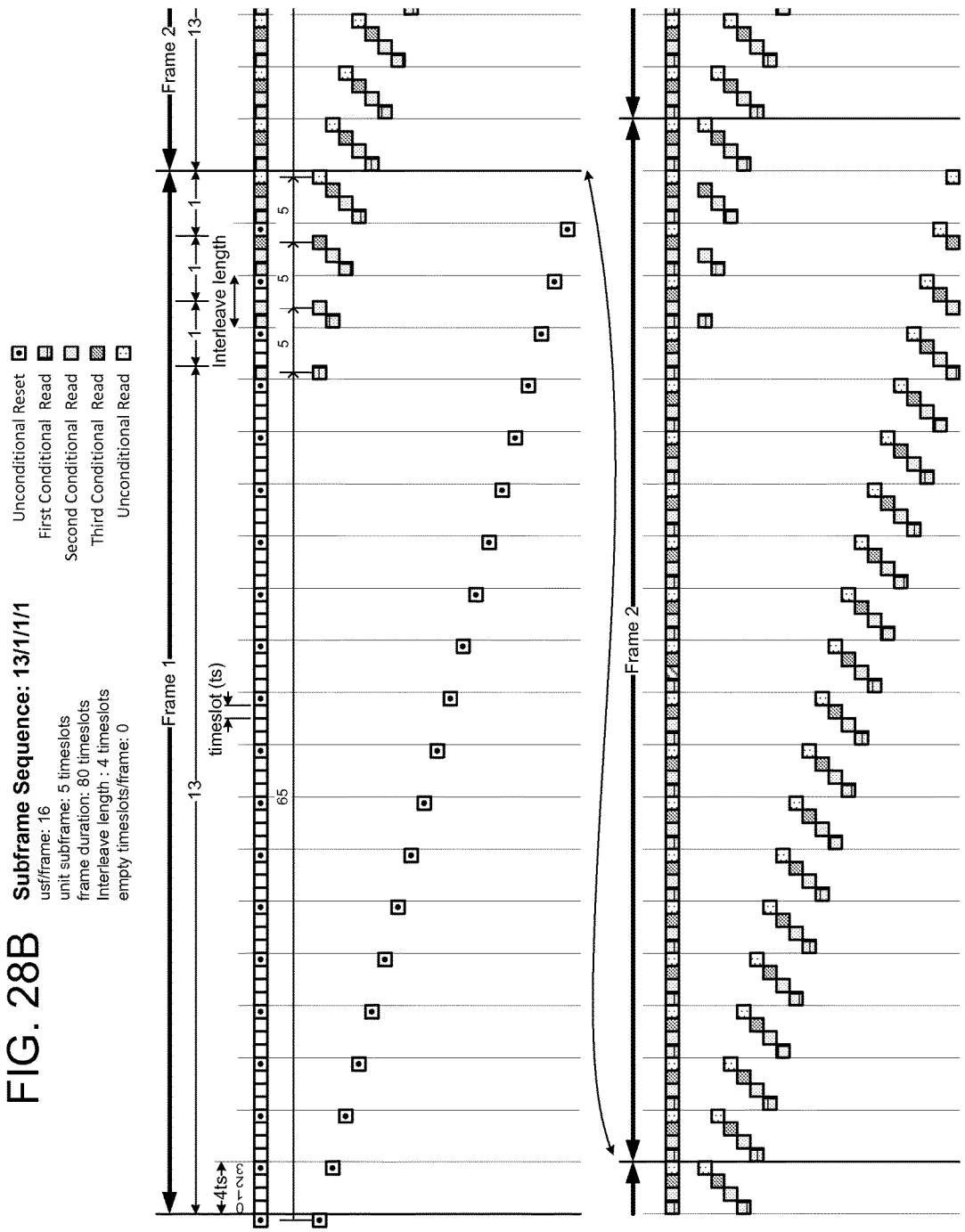

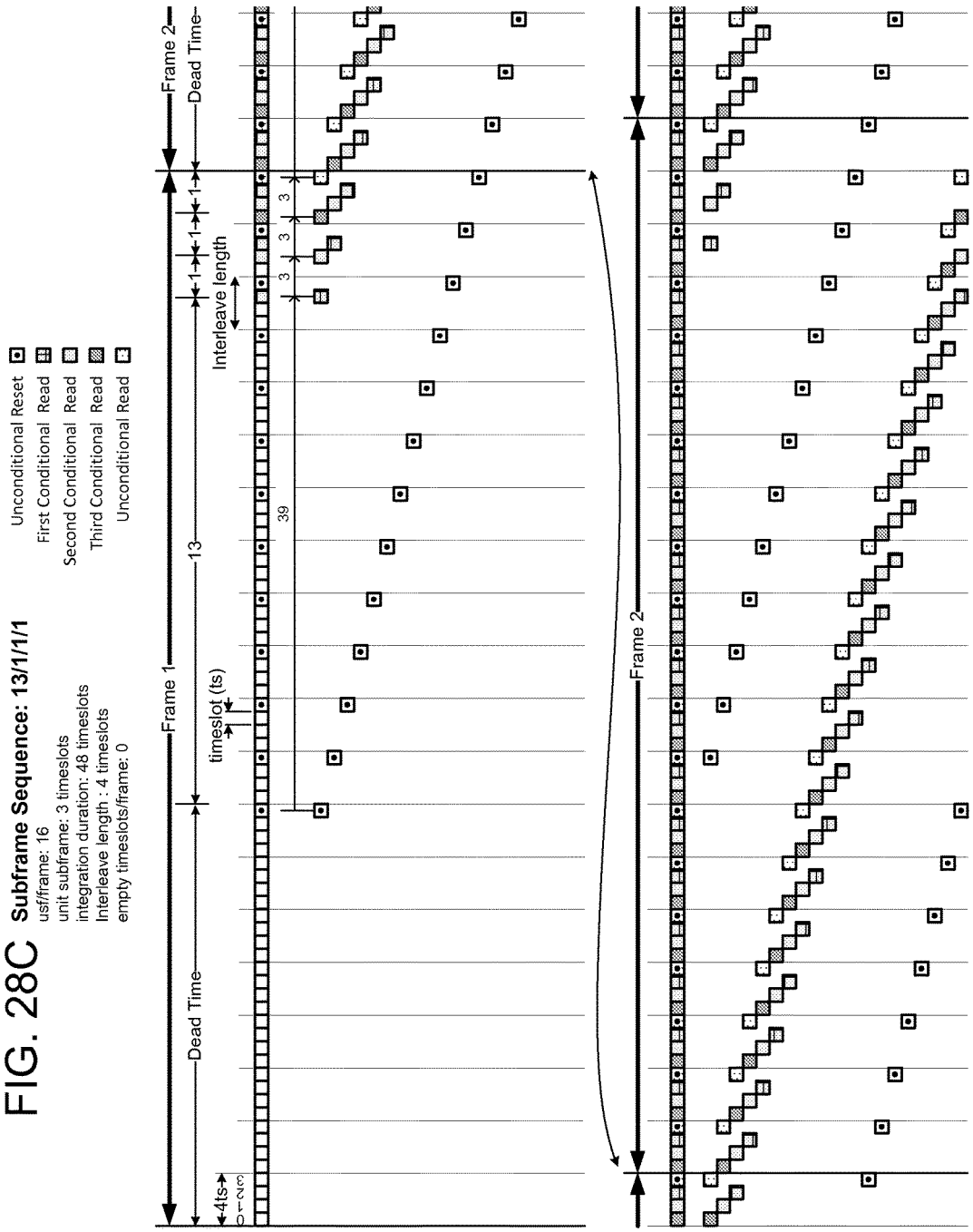

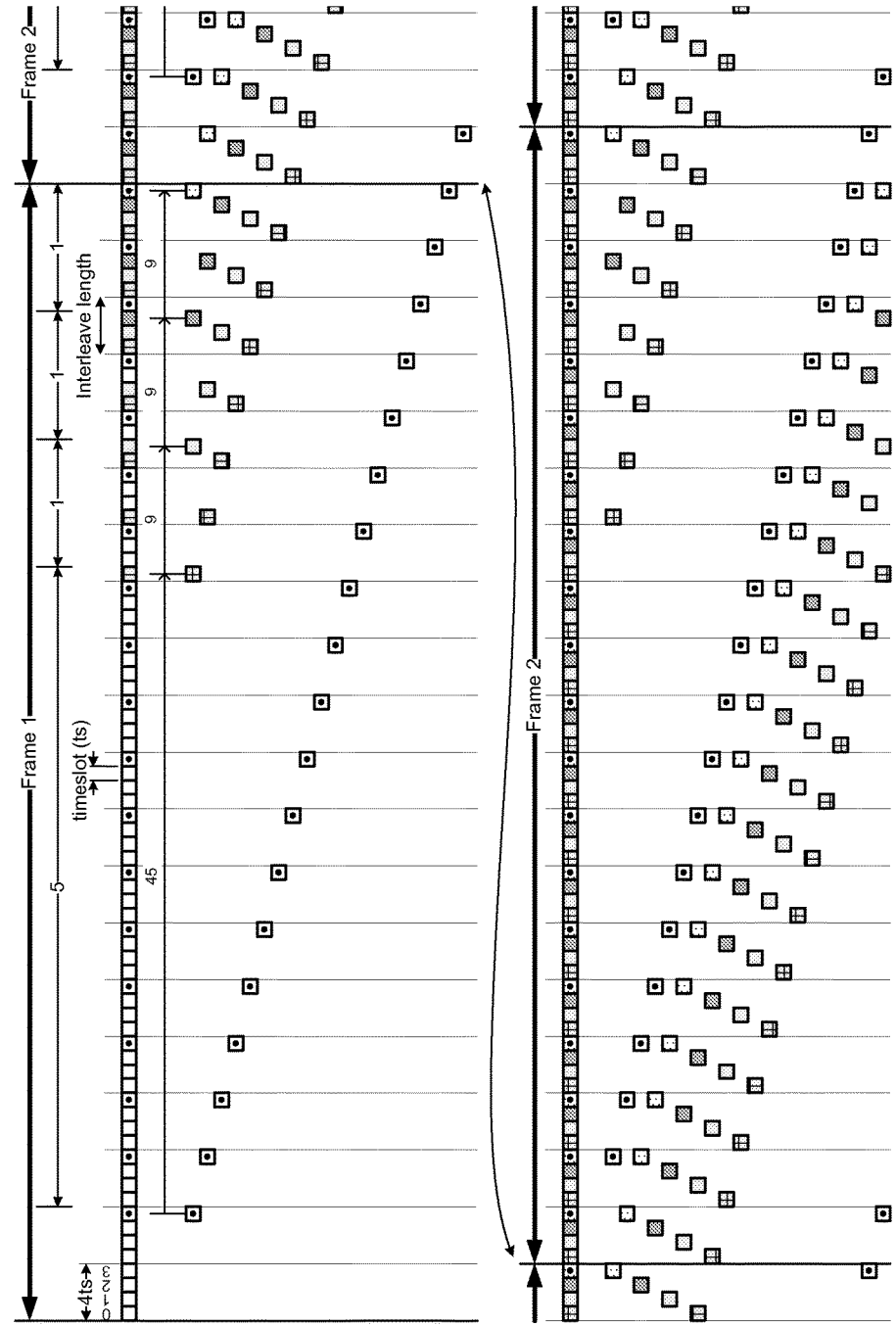

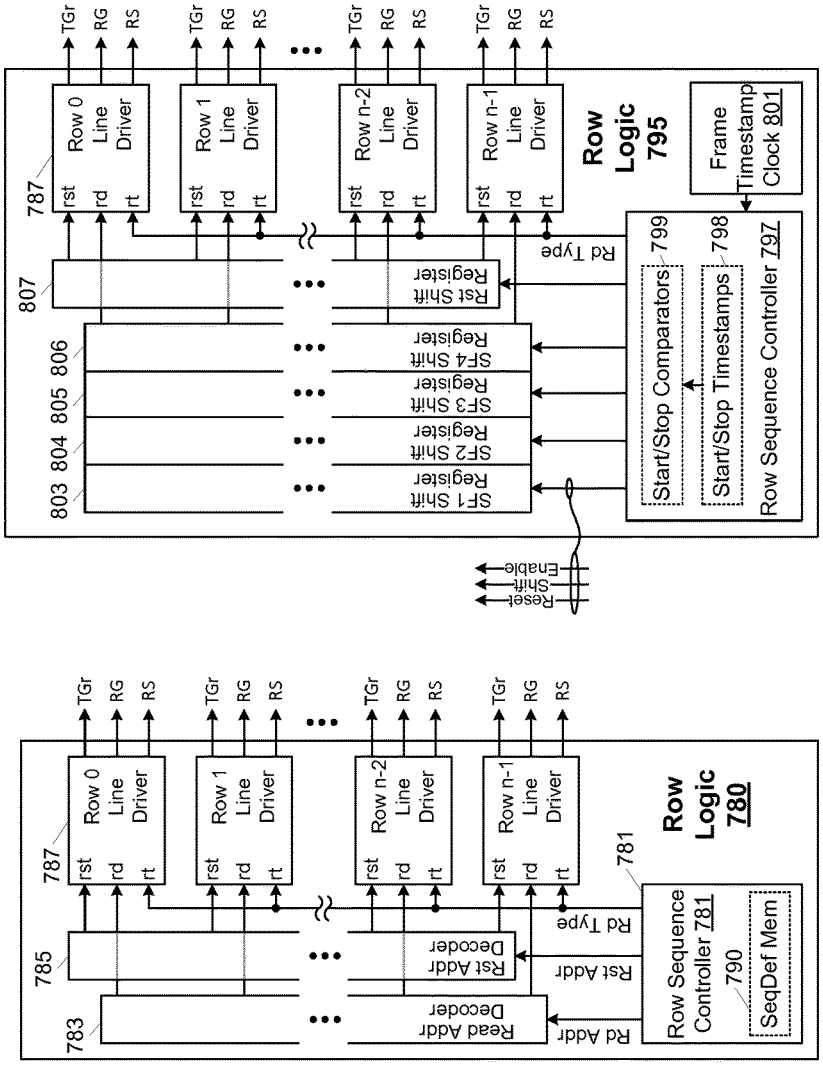

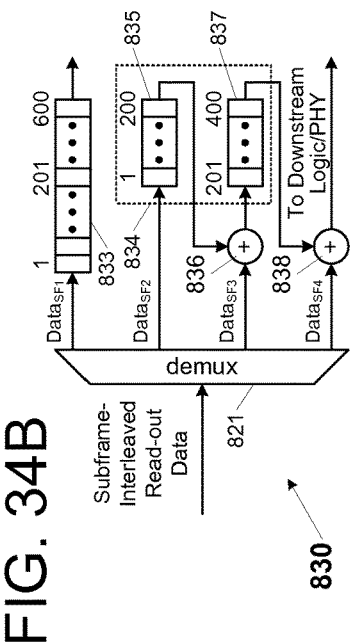
FIG. 34B
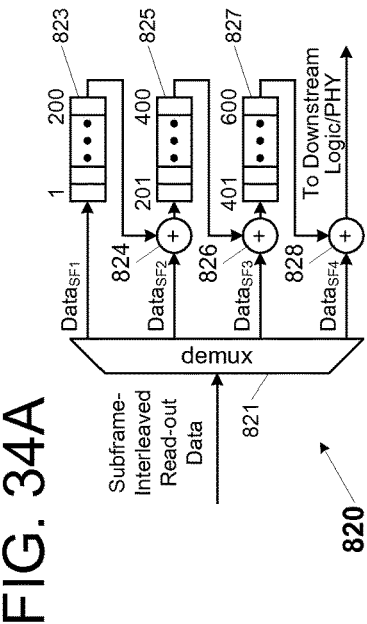
FIG. 34A
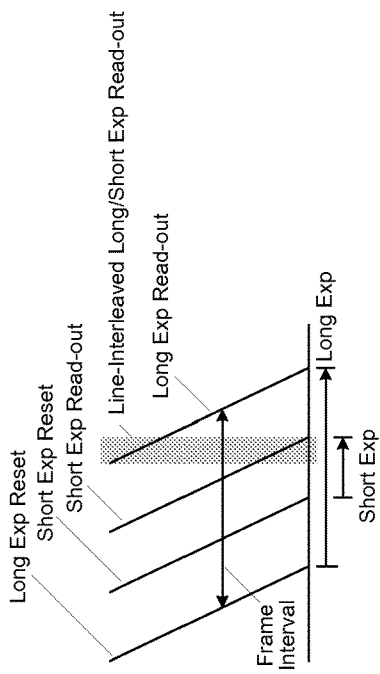
FIG. 35
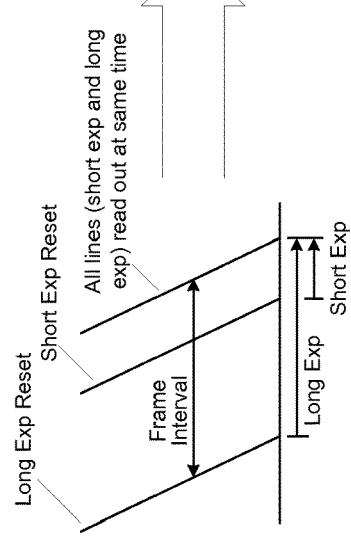

FIG. 48

951 — generate forecasts of full-resolution read-out value for each pixel in bin group based on subframe read-out results 953 — assign pro-rata portion of binned read-out to each pixel in bin group set according to forecast of full-res read-out value

961 — overthresh in condional-read SF ?

yes → 963 — determine charge accumulation rate (CAR) from cond read-out value(s)

no → 965 — estimate CAR on based on assumed charge level at conclusion of penultimate SF → 967 — generate predicted full-res read-out based on CAR and charge-accumulation interval (e.g., $CAR*t_{acc}$)

- Voltage-Binned within switchably-coupled SH element
- Charge-Binned within common floating-diffusion
- CFA Fragment 170
- Full-Res Pixel 925
- Color-Plane Neighbors (929)
- 928
- Component (Full-Res) Pixels
- 927
- Bin Group (930)
- Low-Light Decision Kernel (932)
- Bin-group-bounded pixel set (933)

Fig. 47 — Selective Reconstruction

941 — Over-threshold determination in non-final subframe for any pixel within low-light decision kernel ?

No (Dark) → 943 — generate pixel value for each full-res pixel through bi-linear interpolation between surrounding binned pixel values Yes (Bright) → 945 — generate pixel value for each full-res pixel based on unbinned read-out(s) and estimated contribution to binned read-out

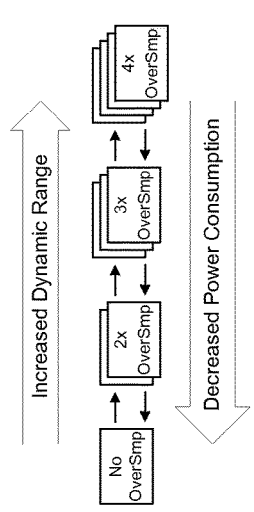
FIG. 54
Dynamically Selected Subframe Sequencing
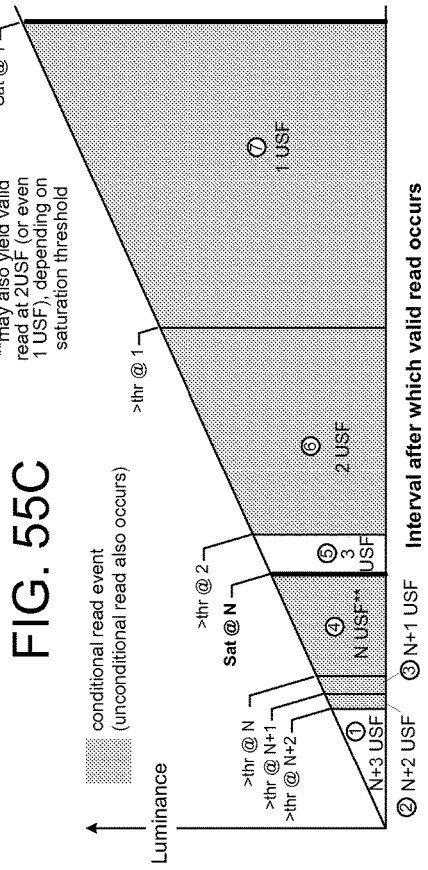
FIG. 55B
FIG. 55C
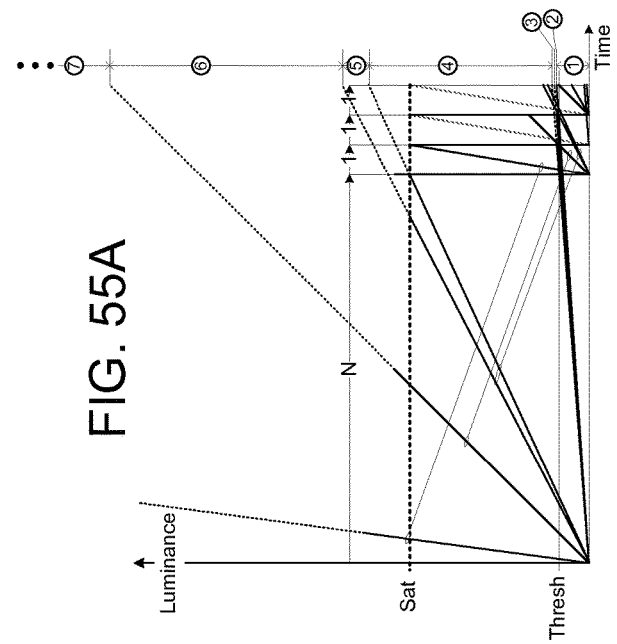
FIG. 55A

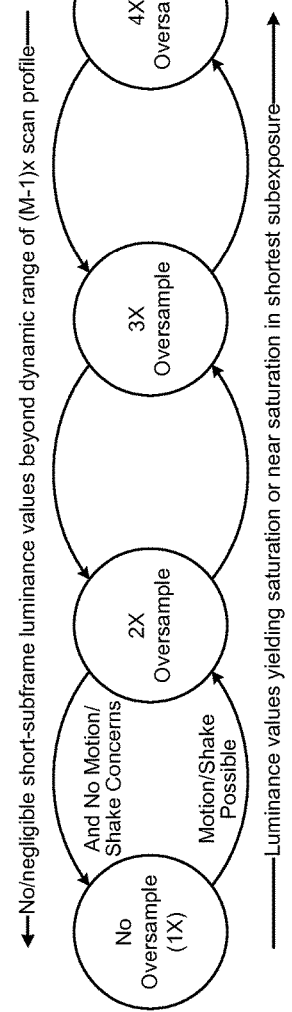
FIG. 58
FIG. 57
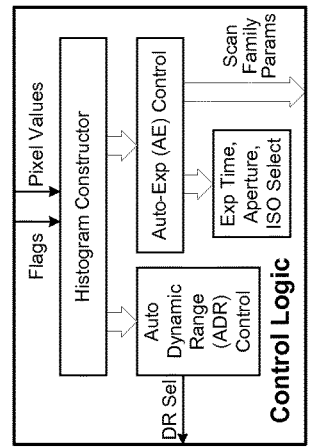
FIG. 60
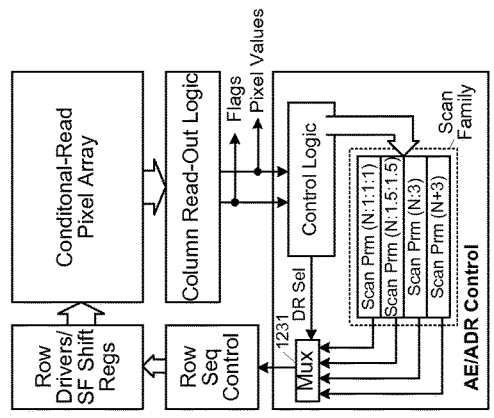
FIG. 59

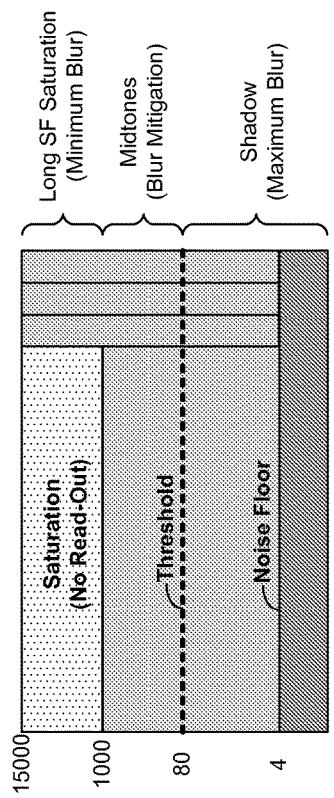
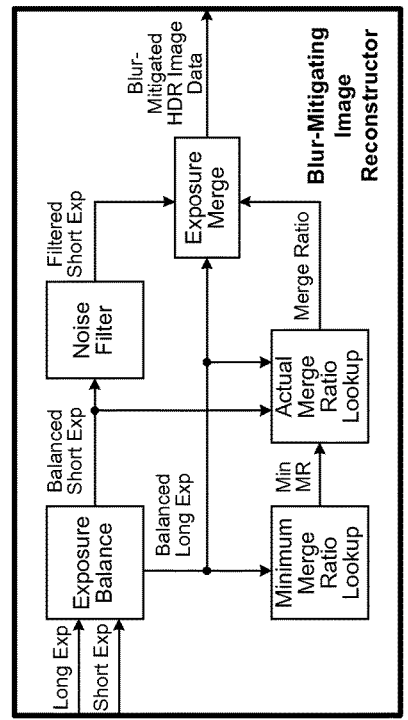
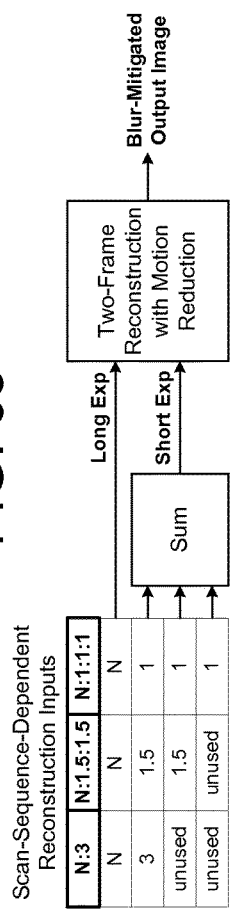
FIG. 62
FIG. 64
FIG. 63

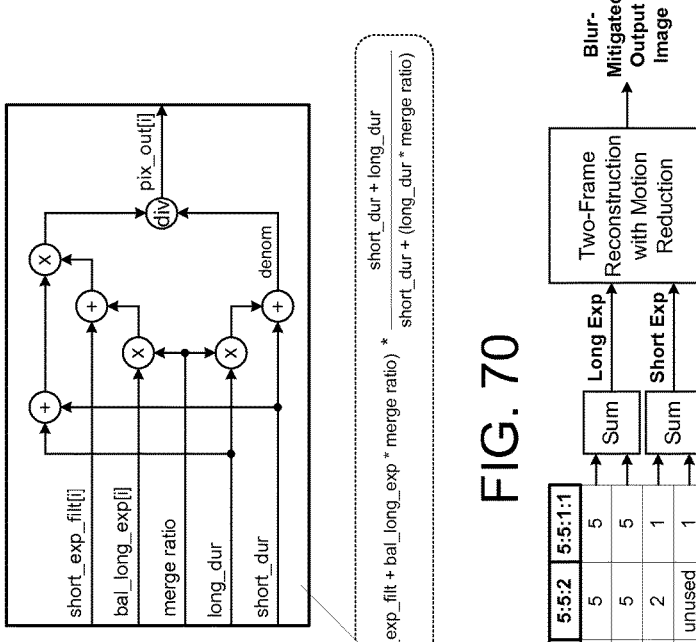
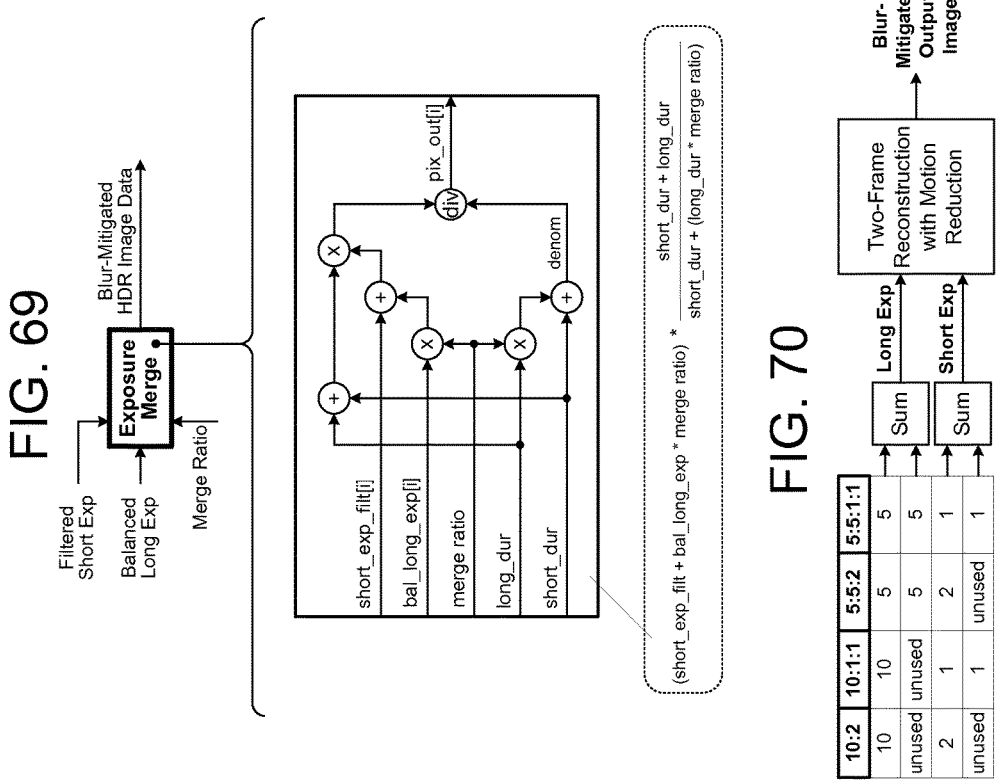
FIG. 69
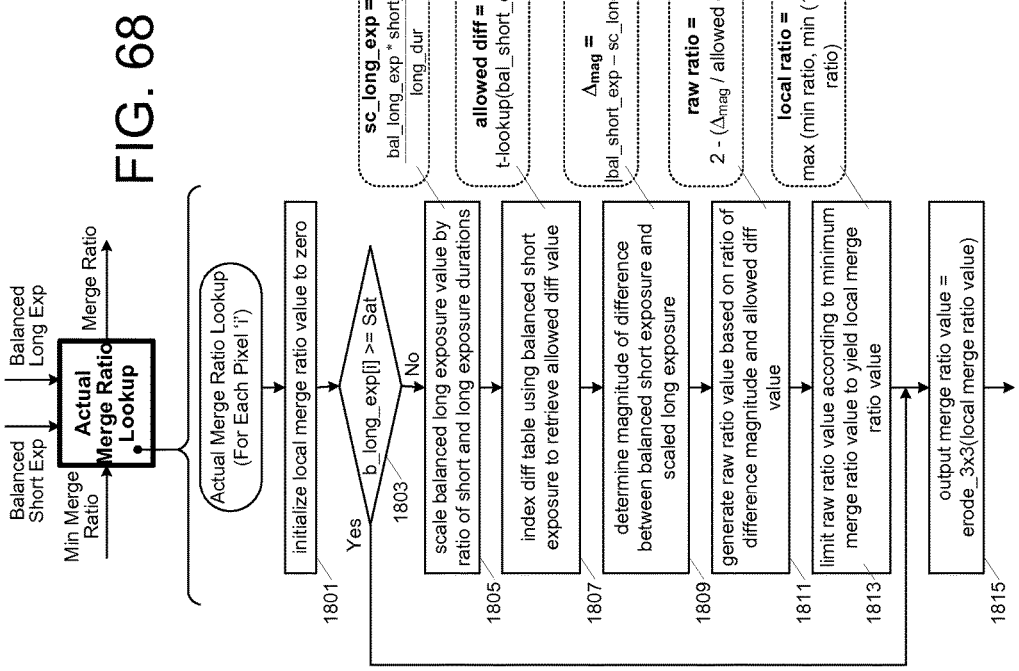
FIG. 68
FIG. 70

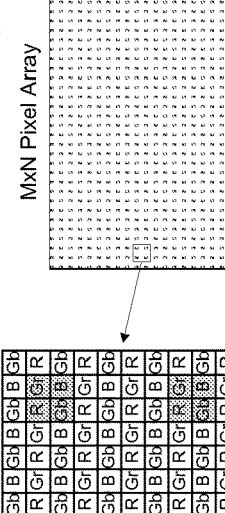
FIG. 73
Preview-Mode Decimation of MxN Pixel Array
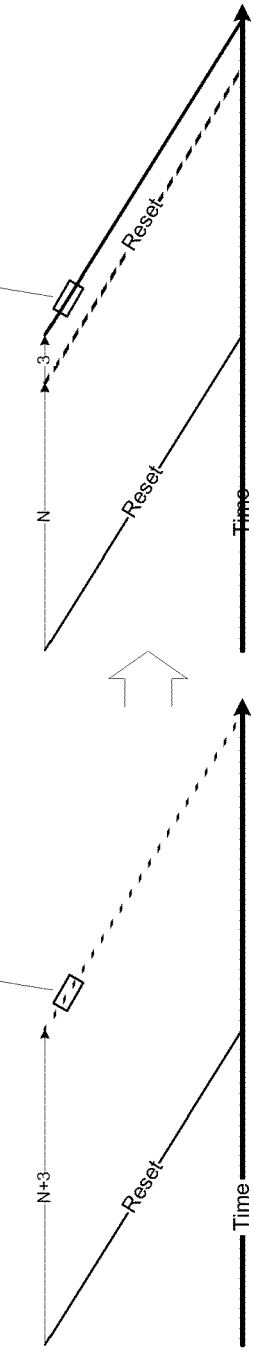
FIG. 74A
FIG. 74B

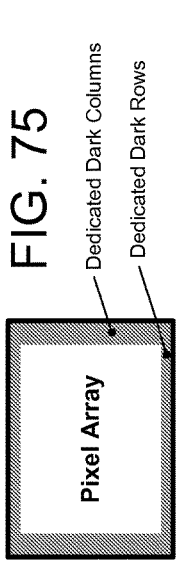
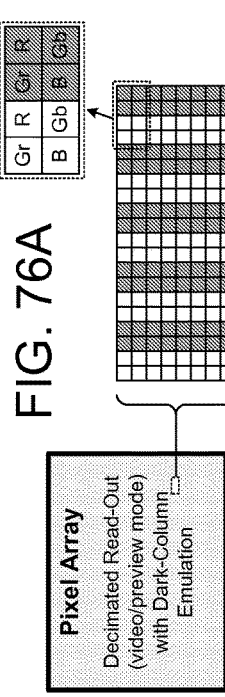
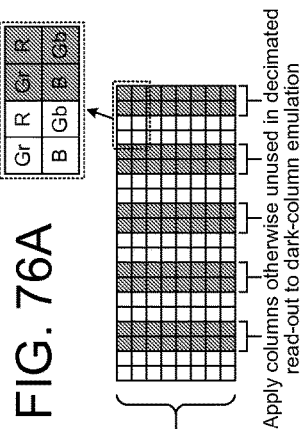
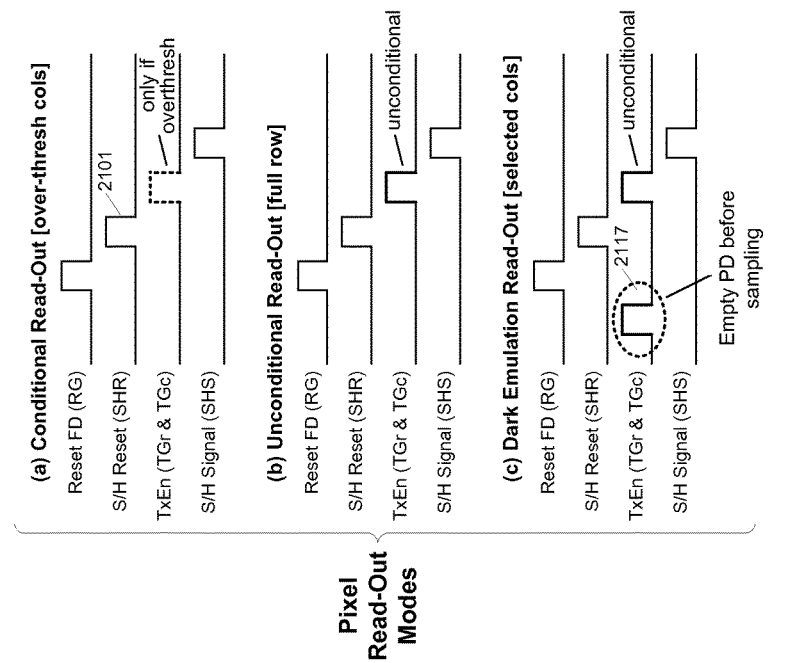

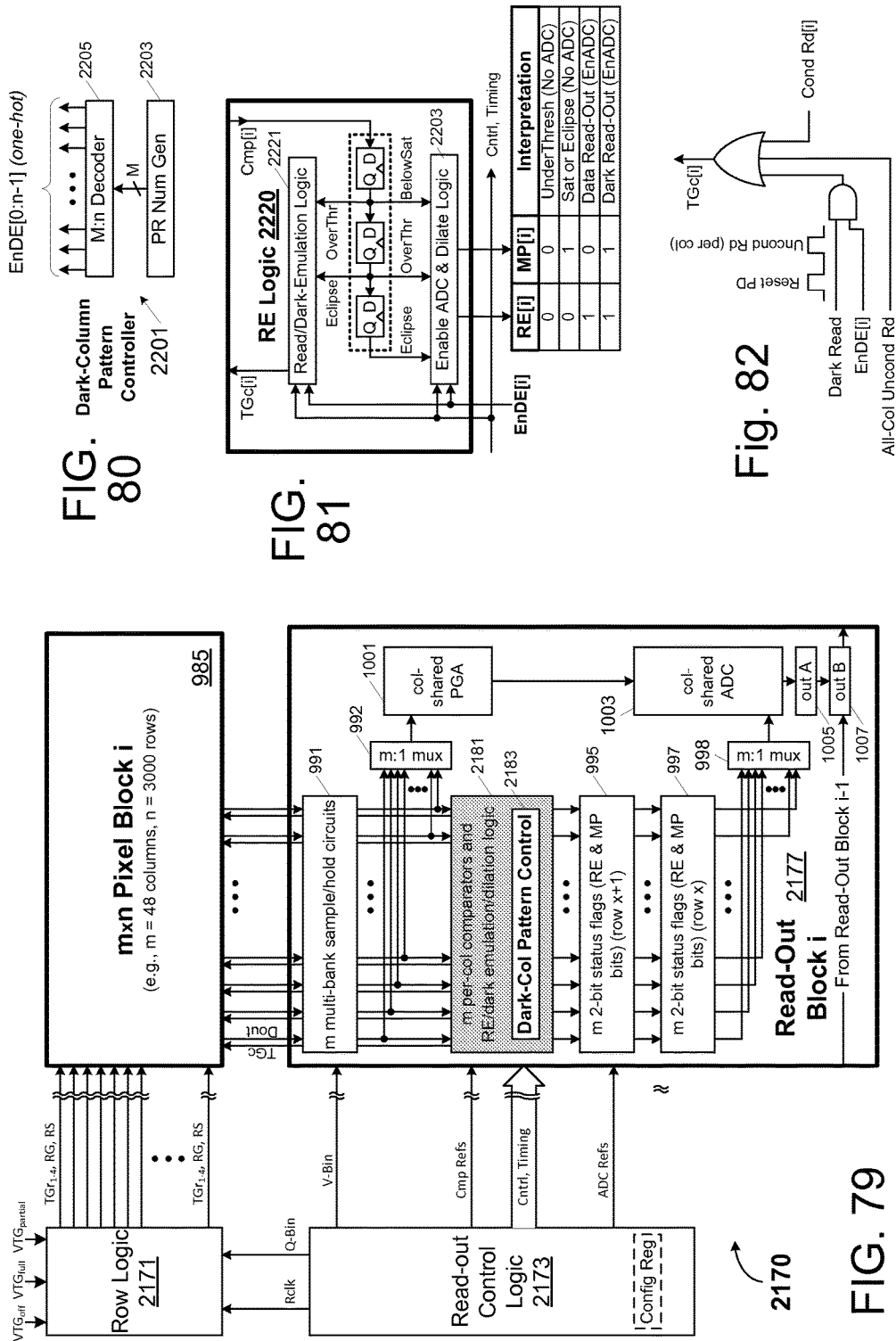

HIGH DYNAMIC-RANGE IMAGE SENSOR

TECHNICAL FIELD

The present disclosure relates to the field of electronic image sensors, and more specifically to a sampling architecture for use in such image sensors.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 12 illustrates exemplary low-light and high-light operation of the split-gate pixel of FIG. 10, showing electrostatic potential diagrams in each case beneath schematic cross-section diagrams of the photodetector, dual-control transfer gate and floating diffusion;

FIG. 21 illustrates embodiments of a reference multiplexer, comparator input multiplexer and comparator that may be used to implement like-named components depicted in FIG. 16;

FIG. 22 illustrates embodiments of a column-shared programmable gain amplifier and K:1 ADC input multiplexer that may be deployed within the embodiment of FIG. 16.

FIG. 23A illustrates embodiments of a read-enable multiplexer, ADC-enable logic and ADC circuit that may be used to implement the K:1 read-enable multiplexer and ADC circuitry of FIG. 16;

FIG. 23B illustrates a convert signal timing diagram corresponding to FIG. 23A;

FIG. 28B illustrates an A=13, 13-1-1-1 subframe read-out sequence designed according to an alternative timing enforcement approach;

FIG. 28C illustrates an A=39, B=3, 39-3-3-3 subframe read-out sequence designed according to the alternative timing enforcement approach;

FIG. 28D shows another scheduling solution for 20 rows and 80 timeslots, this time for A=5 and a 5-1-1-1 policy;

FIG. 31A illustrates an embodiment of a row logic circuit that may be used to establish a wide variety of run-time and/or production-time selectable subframe sequences including, without limitation, those depicted in FIGS. 27-30;

FIG. 31B illustrates another embodiment of a row logic circuit that may be used to establish a wide variety of subframe sequences including, without limitation, those depicted in FIGS. 27-30;

FIGS. 32A-32C illustrate alternative parameter loading operations with respect to the sequence definition memory of FIG. 31A;

FIG. 34A illustrates an embodiment of a buffering circuit that may be used to reconstruct an image frame from the 12-1-1-1 subframe sequence of FIG. 33C with only partial subframe buffering;

FIG. 34B illustrates an alternative embodiment of a buffering circuit that enables partial image reconstruction from the 12-1-1-1 subframe sequence of FIG. 33C;

FIG. 35 contrasts a more artifact-prone fully-interleaved read-out approach (left) and a more artifact-resistant frame-centered short-exposure approach (right);

FIG. 46 illustrates an exemplary segment of a bin-enabled pixel array together with corresponding color filter array (CFA) elements;

FIG. 47 illustrates an example of selective image reconstruction with respect to a pixel bin group;

FIG. 48 illustrates an exemplary approach to combining binned and unbinned read-out results in bright-light reconstruction of full-resolution pixel values;

FIGS. 49 and 50 illustrate a more detailed example of predicting end-of-frame charge accumulation states within bin group pixels for purposes of estimating full-resolution pixel contributions to binned read-outs;

FIG. 51 illustrates a bi-linear interpolation that may be applied to generate final full-resolution pixel values for the pixels of a bin-group-bounded pixel set following determination of a low-light condition;

FIG. 54 illustrates an exemplary imaging sensor embodiment in which the oversampling factor is varied dynamically between minimum and maximum values;

FIG. 55A illustrates an exemplary set of pixel charge integration profiles that occur at various luminance levels and the corresponding read-out/reset events given an N:1:1:1 scan sequence;

FIG. 55B is a table illustrating exemplary pixel state assessment results and read-out events for each of the four subframes and eight luminance levels discussed in reference to FIG. 55A;

FIG. 55C illustrates the various charge integration periods corresponding to valid read-out events within the exemplary luminance ranges of FIG. 55A;

FIG. 57 illustrates a set of operations that may be executed within a conditional-read image sensor or associated integrated circuit to dynamically scale the sensor's dynamic range and power consumption based, at least in part, on the scene being imaged;

FIG. 58 presents an example of dynamic transition between scan sequences of an exposure family operation;

FIG. 59 illustrates an image sensor embodiment that carries out the exposure-setting and dynamic range scaling operations as described in reference to FIGS. 57 and 58;

FIG. 60 illustrates an embodiment of a control logic circuit that may be used to implement the control logic of FIG. 59;

FIG. 62 illustrates a photoelectric charge-integration range in log scale, showing an exemplary noise floor, conditional-read threshold, and saturation threshold;

FIG. 63 illustrates summation of short-exposure pixel values in the context of a family of scan sequences each of which includes, respectively one, two or three short subexposures;

FIG. 64 illustrates an embodiment of a blur-mitigating image reconstructor that may be used to implement the two-frame reconstruction module of FIG. 63;

FIG. 68 illustrates an exemplary actual-difference lookup operation carried out using the balanced short and long exposure values and the luminance-indexed minimum difference value output from the minimum difference lookup unit;

FIG. 69 illustrates an exemplary exposure merge operation carried out using the filtered short exposure value, balanced long exposure value and difference value output from the actual difference lookup unit;

FIG. 70 illustrates an alternative scan sequence family in which an otherwise solitary long subexposure has been split into medium-duration subexposures;

FIG. 73 illustrates an exemplary sensor-decimation mode that may be employed within the various sensor embodiments presented herein to enable generation of a reduced resolution preview image or before recording video frames;

FIG. 74A illustrates an alternative decimated read-out mode in which at least some of the non-preview pixel rows are used to capture short sub-exposure data for purposes of characterizing the dynamic range and/or motion characteristics of the scene being previewed;

FIG. 74B contrasts the basic and short-exposure-data-gathering decimation readout modes described in reference to FIGS. 71 and 72A;

FIG. 75 illustrates a pixel array having shielded dark correction blocks;

FIG. 76A illustrates an exemplary 2:1 video-capture decimation mode in which unused pixel columns are applied to emulate a dark-column read;

FIG. 76B illustrates an exemplary dark-emulation with respect to a full-resolution temporally-oversampled pixel array;

FIG. 77 illustrates exemplary timing diagrams for a number of pixel read-out modes within a conditional-read image sensor, including the conditional and unconditional read-out modes described above as well as a dark-emulation read-out mode;

FIG. 79 illustrates an exemplary image sensor architecture that supports emulated-dark read-out operations discussed in reference to FIGS. 76 through 78;

FIG. 80 illustrates an embodiment of a dark-column pattern controller that may be used to implement the pattern controller of FIG. 79;

FIG. 81 illustrates an embodiment of a read-enable logic circuit modified to support dark-emulation read-out;

FIG. 82 illustrates an embodiment of a read/dark-emulation logic circuit that may be deployed within the read-enable logic circuit of FIG. 81.

DETAILED DESCRIPTION

Figure 1:
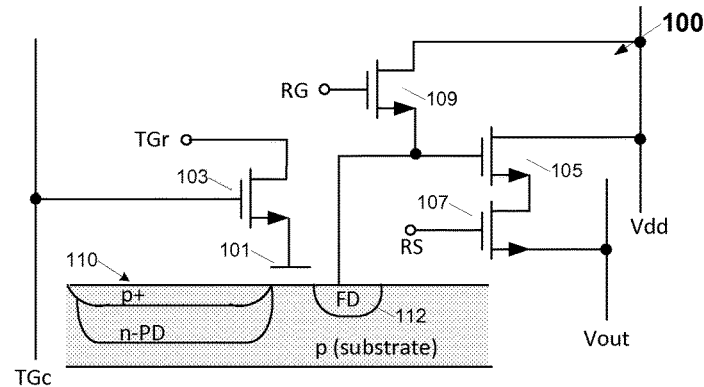
FIG. 1 illustrates an embodiment of a modified 4-transistor pixel in which a non-destructive overthreshold detection operation is executed to enable conditional-read operation in conjunction with correlated double sampling.

In various embodiments disclosed herein, an oversampled image sensor is operated in both full-resolution and reduced-resolution (enhanced low-light sensitivity) read-out modes during respective subframes of an exposure interval. By this arrangement, spatial resolution of the image sensor is preserved while also enhancing low-light sensitivity. In a number of embodiments, reduced-resolution image data is selectively applied in final image reconstruction according to a light-intensity determination based upon the subframe read-outs themselves. In other embodiments, subframe intervals are programmably controlled to balance read-out circuitry utilization and limit on-board data storage needs while achieving desired imaging results effects. In yet other embodiments, a binary threshold used to trigger conditional read-out operations is calibrated according to read-out results and/or reference charge injection. These and other features and benefits are disclosed in greater detail below.

High-SNR Image Sensor with Non-Destructive Threshold Monitoring

While three-transistor (3T) pixel architectures are suitable for many applications, four-transistor (4T) designs having a "transfer gate" disposed between the photodiode and a floating-diffusion region provide a number of advantages. First, the floating diffusion, which serves as a temporary storage of charge transferred from the photodiode, may be reset (e.g., coupled to $V_{DD}$) and read out without disturbing the charge state of the photodiode, thereby enabling a correlated double-sampling (CDS) operation in which the state of the floating diffusion is read twice; immediately after reset (the "reset-state" sample or noise sample) and then again after charge transfer from the photodiode (the "signal-state" sample), thus enabling the noise floor to be subtracted from the photodiode output signal (i.e., subtracting the reset-state sample from the signal-state sample), significantly improving the SNR. Another advantage is, counter-intuitively, a more compact pixel design as the switched connection between the photodiode and a source follower transistor (i.e., via the transfer gate and floating diffusion) enables the source follower transistor as well as a reset transistor and access transistor to be shared among multiple photodiodes. For example, only seven transistors are required to implement a set of four "4T" pixels having a shared source follower, reset transistor and access transistor (i.e., four transfer-gates plus the three shared transistors), thus effecting an average of 1.75 transistors per pixel (1.75T).

In terms of pixel read-out, the direct connection between photodiode and source follower in a 3T pixel permits the charge state of the photodiode to be read-out without disturbing ongoing photocharge integration. This "non-destructive read" capability is particularly advantageous in the context of the conditional reset operation described above as the 3T pixel may be sampled following an integration interval and then conditionally permitted to continue integrating charge (i.e., not be reset) if the sampling operation indicates that the charge level remains below a predetermined threshold. By contrast, the charge transfer between photodiode and floating diffusion as part of a 4T pixel readout disrupts the state of the photodiode, presenting a challenge for conditional-read operation.

In a number of embodiments described below in connection with FIGS. 1-4, a modified 4T pixel architecture is operated in a manner that dissociates the reset threshold from pixel sample generation to enable a non-destructive (and yet correlated double-sampling) overthreshold determination. That is, instead of reading out the net level of charge accumulated within the photodiode (i.e., a pixel sampling operation) and conditionally resetting the photodiode based on that read-out (i.e., as in a 3T pixel sampling operation), a preliminary overthreshold sampling operation is executed to enable detection of an overthreshold state within the photodiode, with the full photodiode read-out (i.e., pixel sample generation) being conditionally executed according to the preliminary overthreshold detection result. In effect, instead of conditionally resetting the photodiode according to the pixel value obtained from full photodiode readout, full photodiode readout is conditioned on the result of a preliminary, non-destructive determination of whether the threshold has been exceeded; an approach enabled, in at least one embodiment, by dissociating the conditional-read threshold from the pixel value generation.

FIG. 1 illustrates an embodiment of a modified 4T pixel 100, referred to herein as a "progressive read-out" or "conditional-read" pixel, in which a non-destructive overthreshold detection operation is executed to enable conditional-reset/read operation in conjunction with correlated double sampling. As explained more fully below, the overthreshold detection involves a limited read-out of the photodiode state which, when determined to indicate an overthreshold condition, will trigger a more complete read-out of the photodiode state. That is, pixel 100 is read-out in a progression from a limited overthreshold detection read-out to a complete read-out, the latter being conditional according to the overthreshold detection result and hence referred to as a conditional read.

Still referring to FIG. 1, conditional-read pixel 100 includes a transfer gate 101 disposed between a photodiode 110 (or any other practicable photosensitive element) and floating diffusion node 112, and a transfer-enable transistor 103 coupled between a transfer-gate row line (TGr) and transfer gate 101. The gate of transfer-enable transistor 103 is coupled to a transfer-gate column line (TGc) so that, when TGc is activated, the potential on TGr is applied (minus any transistor threshold) via transfer-enable transistor 103 to the gate of transfer-gate 101, thus enabling charge accumulated within photodiode 110 to be transferred to floating diffusion 112 and sensed by the pixel readout circuitry. More specifically, floating diffusion 112 is coupled to the gate of source follower 105 (an amplification and/or charge-to-voltage conversion element), which is itself coupled between a supply rail ($V_{DD}$ in this example) and a read-out line, Vout, to enable a signal representative of the floating diffusion potential to be output to read-out logic outside the pixel.

As shown, a row-select transistor 107 is coupled between source follower 105 and the read-out line to enable multiplexed access to the read-out line by respective rows of pixels. That is, row-select lines ("RS") are coupled to the control inputs of row-select transistors 107 within respective rows of pixels and operated on a one-hot basis to select one row of pixels for sense/read-out operations at a time. A reset transistor 109 is also provided within the progressive read-out pixel to enable the floating diffusion to be switchably coupled to the supply rail (i.e., when a reset-gate line (RG) is activated) and thus reset. The photodiode itself may be reset along with the floating diffusion by fully switching on transfer gate 101 (e.g., by asserting TGc while TGr is high) and reset transistor 109 concurrently, or by merely connecting the photodiode to a reset-state floating diffusion.

Figure 2:
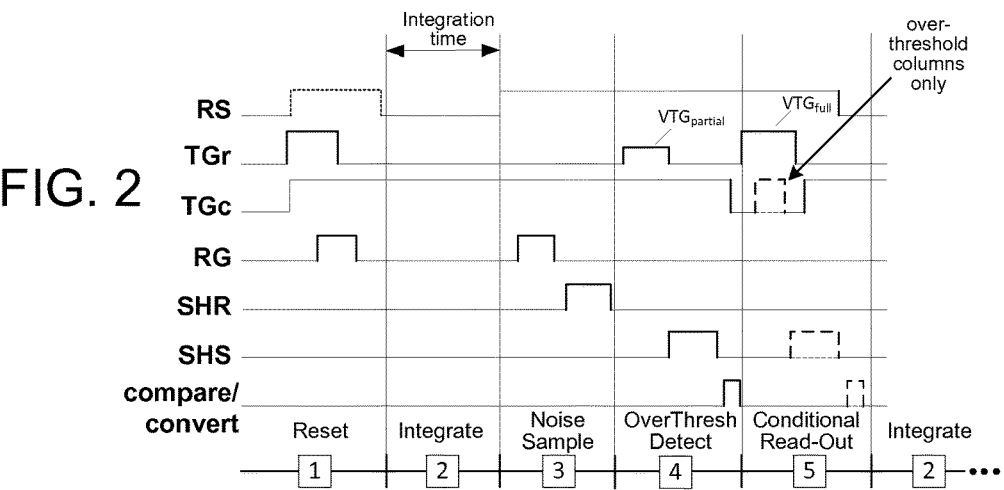
FIG. 2 is a timing diagram illustrating an exemplary pixel cycle within the progressive read-out pixel of FIG. 1.

FIG. 2 is a timing diagram illustrating an exemplary pixel cycle within the progressive read-out pixel of FIG. 1. As shown, the pixel cycle is split into five intervals or phases corresponding to distinct operations carried out to yield an eventual progressive read-out in the final two phases. In the first phase (phase 1), a reset operation is executed within the photodiode and floating diffusion by concurrently asserting logic high signals on the TGr, TGc and RG lines to switch on transfer-enable transistor 103, transfer gate 101 and reset transistor 109, thereby switchably coupling photodiode 110 to the supply rail via transfer gate 101, floating diffusion 112 and reset transistor 109 (the illustrated sequence can begin with an unconditional reset (e.g., at the start of a frame), and can also begin from a preceding conditional read-out/reset operation). To conclude the reset operation, the TGr and RG signals (i.e., signals applied on like-named signal lines) are lowered, thereby switching off transfer gate 101 (and reset transistor 109) so that the photodiode is enabled to accumulate (or integrate) charge in response to incident light in the ensuing integration phase (phase 2). Lastly, although the row-select signal goes high during the reset operation shown in FIG. 2, this is merely a consequence of an implementation-specific row decoder that raises the row-select signal whenever a given row address is decoded in connection with a row-specific operation (e.g., raising the TGr and RG signals during reset directed to a given row). In an alternative embodiment, the row decoder may include logic to suppress assertion of the row-select signal during reset as indicated by the dashed RS pulse in FIG. 2.

At the conclusion of the integration phase, the floating diffusion is reset (i.e., by pulsing the RG signal to couple the floating diffusion to the supply rail) and then sampled by a sample-and-hold element within the column read-out circuit. The reset and sample operation (shown as phase 3 in FIG. 2), in effect, samples the noise level of the floating diffusion and is executed in the embodiment shown by asserting the row-select signal for the pixel row of interest (i.e., the "$i^{th}$" pixel row, selected by RSi) while pulsing a reset-state sample-and-hold signal (SHR) to convey the state of the floating diffusion to the sample-and-hold element (e.g., a switch-accessed capacitive element) within the column read-out circuit via read-out line, Vout.

Figure 3:
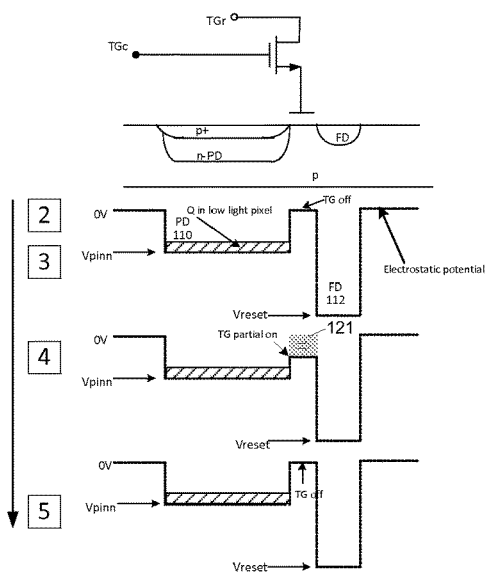
FIGS. 3 and 4 illustrate exemplary electrostatic potential diagrams for the photodiode, transfer gate and floating diffusion of FIG. 1 below their corresponding schematic cross-section diagrams.
Figure 4:
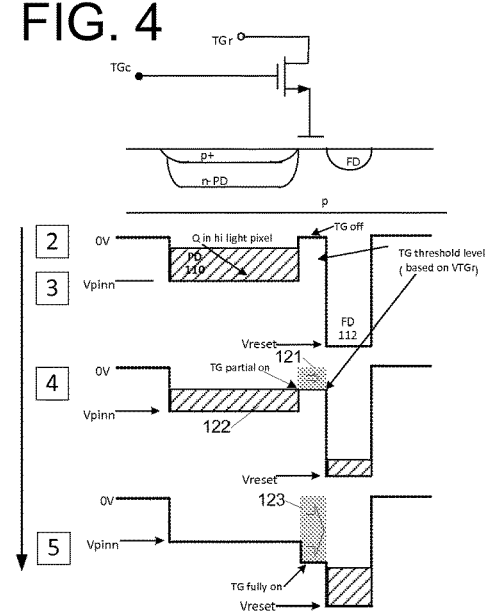

After acquiring the noise sample in phase 3, an overthreshold detection operation is executed in phase 4 by raising the TGr line to a partially-on, "overthreshold-detection" potential, $VTG_{partial}$, concurrently with switching on transfer-enable transistor 103 (i.e., by asserting a logic high TGc signal, although in this embodiment TGc is already on). By this operation, illustrated graphically in FIGS. 3 and 4, $VTG_{partial}$ is applied to transfer gate 101 to switch the transfer gate to a "partial on" state ("TG partial on"). Referring to FIGS. 3 and 4, electrostatic potential diagrams for photodiode 110 (a pinned photodiode in this example), transfer gate 101 and floating diffusion 112 are shown below their corresponding schematic cross-section diagrams. Note that the depicted levels of electrostatic potential are not intended to be an accurate representation of the levels produced in an actual or simulated device, but rather a general (or conceptual) representation to illustrate the operation of the pixel read-out phases. Upon application of $VTG_{partial}$ to transfer gate 101, a relatively shallow channel potential 121 is formed between photodiode 110 and floating diffusion 112. In the example of FIG. 3, the level of charge accumulated within the photodiode at the time of the overthreshold detection operation (phase 4) does not rise to the threshold level required for charge to spill over (i.e., be transferred) to the floating diffusion via the shallow channel potential of the partially-on transfer gate. Accordingly, because the accumulated charge level does not exceed the spillover threshold established by application of $VTG_{partial}$ to the control node of transfer gate 101, there is no spillover from the photodiode to the floating diffusion and the accumulated charge instead remains undisturbed within the photodiode. By contrast, in the example of FIG. 4, the higher level of accumulated charge does exceed the spillover threshold so that a portion of the accumulated charge (i.e., that subset of charge carriers that are above the transfer gate partially-on electrostatic potential) spills over into floating diffusion node 112, with the residual accumulated charge remaining within the photodiode as shown at 122.

Still referring to FIGS. 2, 3 and 4, prior to conclusion of overthreshold detection phase 4, the charge level of the floating diffusion is sampled and held within a signal-state sample-and-hold element (i.e., in response to assertion of signal SHS) to yield a threshold-test sample—the difference between the signal-state sample and the previously obtained reset-state sample—to be evaluated with respect to a conditional-read threshold. In one embodiment, the conditional-read threshold is an analog threshold (e.g., to be compared with the threshold-test sample in a sense amplifier in response to assertion of a compare/convert strobe signal) set or programmed to a setting above the sampling noise floor, but low enough to enable detection of minute charge spillover via the shallow transfer gate channel. Alternatively, the threshold-test sample may be digitized in response to assertion of the compare/convert signal (e.g., within an analog-to-digital converter that is also used to generate the finalized pixel sample value) and then compared with a digital conditional-read threshold, again, set (or programmed to a setting) above the noise floor, but low enough to enable detection of trace charge spillover. In either case, if the threshold-test sample indicates that no detectable spillover occurred (i.e., threshold-test sample value is less than conditional-read spillover threshold), then the photodiode is deemed to be in the underthreshold state shown in FIG. 3 and the TGc line is held low in the ensuing conditional read-out phase (phase 5, the final phase) to disable transfer gate 101 for the remainder of the progressive read-out operation—in effect, disabling further read-out from the photodiode and thus enabling the photodiode to continue integrating charge without disruption for at least another sampling interval. By contrast, if the threshold-test sample indicates a spillover event (i.e., threshold-test sample greater than conditional-read/spillover threshold), then the TGc line is pulsed during the conditional read-out phase concurrently with application of a fully-on, "remainder-transfer" potential, $VTG_{full}$, to the TGr line, thereby enabling the remainder of the charge (i.e., charge 122 as shown in FIG. 4) within photodiode 110 to be transferred to floating diffusion 112 via the full-depth transfer-gate channel (123) so that, between the overthreshold transfer in phase 4 and the remainder transfer in phase 5, the charge accumulated within the photodiode since the hard reset in phase 1 is fully transferred to the floating diffusion where it may be sensed in a pixel read-out operation. In the embodiment shown, the pixel-readout operation is effected by pulsing the SHS signal and compare/convert strobe in sequence during conditional read-out phase 5, though either or both of those pulses may optionally be suppressed in absence of an overthreshold detection. Note that conditional read-out of the photodiode (i.e., effected by pulsing TGc in conjunction with application of $VTG_{full}$ on TGr) effectively resets the photodiode (i.e., drawing off all charge to the floating diffusion), while suppression of the conditional read-out leaves the integration state of the photodiode undisturbed. Accordingly, execution of the conditional read-out operation in phase 5 conditionally resets the photodiode in preparation for integration anew in the succeeding sampling interval (subframe) or refrains from resetting the photodiode to enable cumulative integration in the subsequent sampling interval. Thus, in either case, a new integration phase follows phase 5, with phases 2-5 being repeated for each subframe of the overall frame (or exposure) interval, before repeating the hard reset in a new frame. In other embodiments, where cumulative integration is permitted across frame boundaries, the hard reset operation may be executed to initialize the image sensor and omitted for an indeterminate period of time thereafter.

In the embodiment shown, each column of the pixel array is populated by shared-element pixels in which every four pixels form a quad pixel cell 150 and contain respective photodiodes 110 (PD1-PD4), transfer gates 101, and transfer-enable transistors 103, but share a floating diffusion node 152, reset transistor 109, source follower 105 and row-select transistor 107. By this arrangement, the average transistor count per pixel is 2.75 (i.e., 11 transistors/4 pixels), thus effecting a relatively efficient, 2.75T-pixel image sensor.

Image Decimation and Pixel Binning

A number of conditional-read image sensor embodiments described herein are operable in decimation modes that yield less than maximum image resolution. For example, in one embodiment an image sensor capable of generating an 8 MP (8 megapixel) output in a still-image mode, yields a 2 MP output in a decimated, high-definition (HD) video mode; a 4:1 decimation ratio (higher or lower resolutions may apply in each mode, and other decimation modes and ratios may be achieved in alternative embodiments; also, if the still and video frame aspect ratios differ, some areas of the sensor may not be used at all in one or the other modes).

While post-digitization logic may be provided to decimate full-resolution data (e.g., on-chip logic at the output of the ADC bank or off-chip processing logic), pixel charge aggregation or "binning" within the pixel array and/or voltage binning within sample-and-hold storage elements is applied in a number of embodiments to effect pre-digitization (i.e., pre-ADC and thus analog) decimation, obviating die-consuming and power-consuming digital binning logic and, in many cases, yielding improved signal-to-noise ratio in the decimated output.

Figure 5:
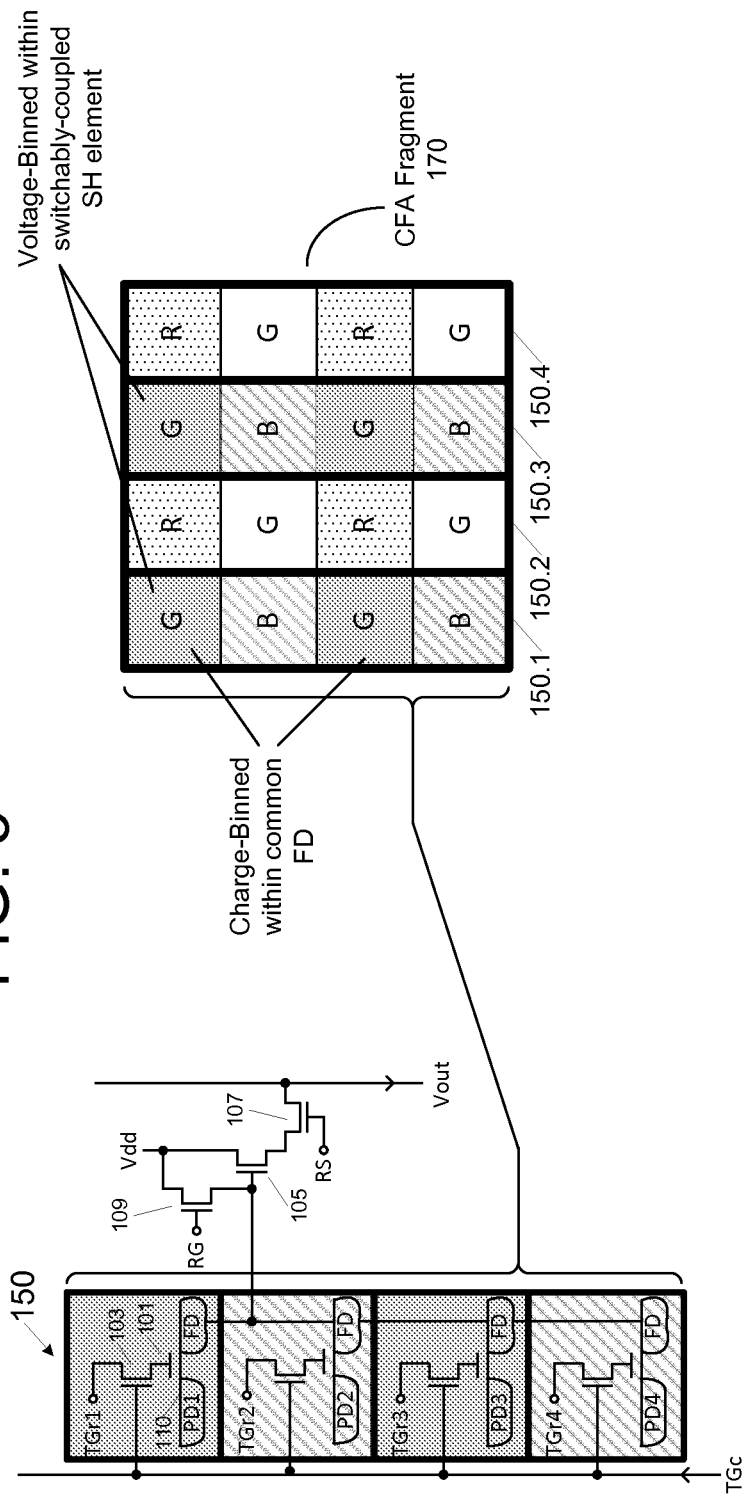
FIG. 5 illustrates an alternative binning strategy that may be executed with respect to a collection of 4×1 quad-pixel blocks in conjunction with a color filter array.

FIG. 5 illustrates a pixel binning/decimation strategy that may be executed with respect to a collection of 4×1 quad-pixel blocks 150 and the color filter array (CFA) fragment shown at 170. In the embodiment shown, the four pixels within each quad pixel block 150 (shown at 150.1-150-4 with respect to the CFA fragment) contain respective photodiodes 110 (PD1-PD4), transfer gates 101, and transfer-enable transistors 103, but share a floating diffusion node 152, reset transistor 109, source follower 105 and row-select transistor 107. By this arrangement, the average transistor count per pixel is 2.75 (i.e., 11 transistors/4 pixels), thus effecting a relatively efficient, 2.75T-pixel image sensor.

As shown, CFA fragment 170 (i.e., a sufficient portion of a sensor-wide CFA to demonstrate the CFA pattern) includes collections of like colored filter elements at the corner pixels of each 3×3 pixel group. Thus, green filter elements are disposed over shaded pixels 'G', blue filter elements are disposed over striped pixels 'B' and red filter elements are disposed over hashed pixels 'R'. In this arrangement, each pair of like-filtered pixels (i.e., subject to light filtered by same-color filter elements, R, G or B) disposed in the same quad-pixel block thus permit charge binning within their shared floating diffusion as detailed below. Further, referring to FIG. 6, by fixing a column offset between the pixel pair within each column and the like-filtered/same color-plane pair of pixels coupled to the same row lines (i.e., fixed at a spacing of two columns in the example shown) and by providing switching elements at the column read-out points of pixel array 181 (i.e., switching elements 191 and 192 within sample-and-hold circuitry 183), it becomes possible to "voltage-bin" the results of the two charge-binned pixel pairs within sample-and-hold circuitry 183, thus combining (i.e., aggregating, binning) the four corner pixels in each 3×3 pixel group prior to digitization within the ADC elements of SA/ADC block 185.

Figure 6:
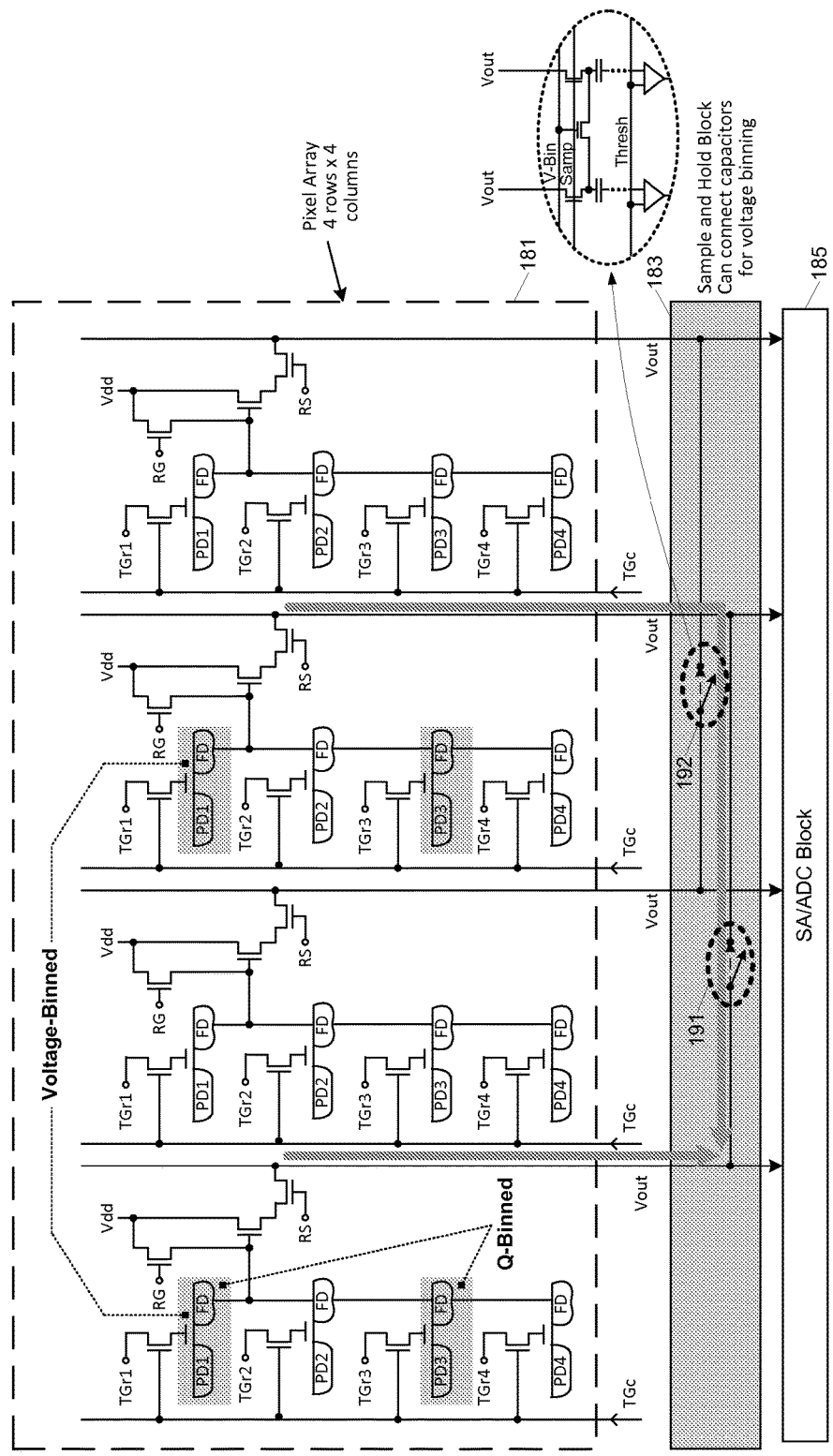
FIG. 6 illustrates a column-interconnect architecture that may be applied to enable voltage-binning of analog signals read-out from selected columns of 4×1 quad-pixel blocks.
Figure 7:
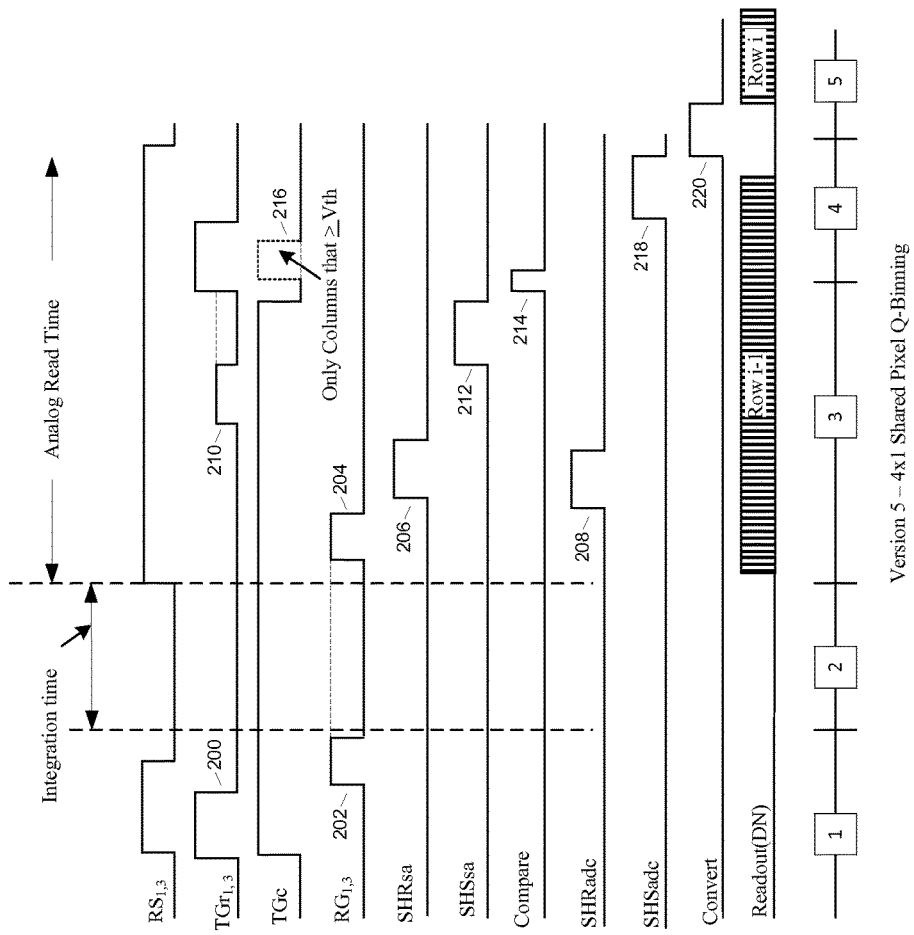
FIG. 7 illustrates an exemplary timing diagram of binned-mode read-out operations within the 4×1 quad-pixel architecture of FIGS. 5 and 6.

FIG. 7 illustrates an exemplary timing diagram of binned-mode read-out operations within the 4×1 quad-pixel architecture of FIGS. 5 and 6. In the example shown, row lines for pixel rows i and i+2 are operated in lock step to achieve 2:1 charge binning within the shared floating diffusion of a given quad-pixel block. More specifically, row signals for pixel rows 1 and 3 of a 4×1 quad pixel block (or row of such quad pixel blocks) are asserted in unison, followed by locked-step assertion of row signals for pixel rows 2 and 4, before advancing to assert row signals for the next row of 4×1 quad pixel blocks. Transverse connections are established within sample-and-hold switch elements (e.g., at 191 and 192 of sample-and-hold block 183 as shown in FIG. 6) to achieve 2:1 voltage binning and thus an overall 4:1 analog signal summing and concomitant image decimation.

Referring more specifically to FIG. 7, the row-select signals ($RS_{1,3}$), reset-gate signals ($RG_{1,3}$) and row transfer-gate signals ($TGr_{1,3}$) for rows 1 and 3 are operated in lock step to reset the photodiodes and shared floating diffusion of the selected pixel rows during hard-reset phase 1, permit charge integration during integration phase 2, determine whether the charge-binned and voltage-binned charge-accumulation results within each column-interleaved collection of four pixels (i.e., the 3×3 corner pixels as described in reference to FIGS. 5 and 6) exceed the conditional-read threshold in threshold-test phase 3, and, if an overthreshold condition is detected, conditionally read-out and digitize the full charge-binned and voltage-binned accumulated charge within the subject pixel collections in conditional read-out phase 4 before transmitting the digitized pixel value to downstream (on-chip or off-chip) processing logic in output phase 5. Considering the phases one by one, during hard-reset phase 1, the row-transfer gate signals TGr1 and TGr3 are pulsed to $VTG_{full}$ (as shown at 200) while simultaneously raising column transfer-gate signal TGc, thus transferring accumulated charge from photodiodes PD1 and PD3 to their shared floating diffusion node. After the photodiode-to-floating-diffusion charge transfer, reset signal RG is pulsed at 202 to clear charge from the floating diffusion in preparation for the ensuing charge integration in phase 2. At the start of threshold-test phase 3, the reset signal is pulsed again (204) to reset the floating diffusions and then signals SHRsa and SHRadc are pulsed at 206 and 208 (while RSi is asserted) to capture samples of the reset-state of the floating diffusions within the respective sample-and-hold elements for the sense amplifier and ADC. After capture, switch 191 is closed to voltage-share between the reset signal sample-and-hold elements for columns 1 and 3, thus producing a reset signal representative of the average of the column 1 and 3 floating diffusions. At 210, TGr1 and TGr3 are raised to the partial-on transfer potential, $VTG_{partial}$, to enable charge spillover to the shared floating diffusions if an overthreshold condition exists in either or both of the photodiodes of the subject pixels in a column. The SHSsa signal is then pulsed at 212 to capture the signal-state of the floating diffusion nodes. Subsequently, switch 191 is closed to voltage-share between the threshold-compare sample-and-hold elements for columns 1 and 3, thus voltage binning the two charge-binned spillover samples. The threshold-test phase is concluded by lowering the TGc signal and asserting the compare-strobe (214) to trigger a threshold comparison within the sense amplifier of either column 1 or column 3 (the other may be deactivated), comparing the aggregated spillover charge from the four charge/voltage binned pixels against a conditional-read threshold. If the comparison result indicates an overthreshold condition, the TGc signals on both columns 1 and 3 are pulsed at 216 during application of $VTG_{full}$ on the TGr1 and TGr3 lines, (thus enabling a full read-out of photodiodes PD1 and PD3 to the shared floating diffusions within corresponding quad pixel blocks), and then the SHSadc signal is raised at 218 to capture the signal-state of the floating diffusion nodes within a signal-state sample-and-hold element in each column. Subsequently, switch 191 is closed to voltage-share between the signal-state sample-and-hold elements for columns 1 and 3, (i.e., voltage-binning the charge-binned floating diffusion contents). Thereafter, the convert-strobe is pulsed at 220 to trigger an ADC operation (for either column 1 or 3, but both are not necessary) with respect to the voltage/charge-binned signal state captured within the sample-and-hold circuit (if any), followed by transmission of the ADC output in phase 5. As discussed above, the ADC operation and data transmission operations may be suppressed to save power and reduce signaling bandwidth if an overthreshold condition is not detected in threshold-test phase 4.

Image Sensor Architecture, System Architecture

Figure 8:
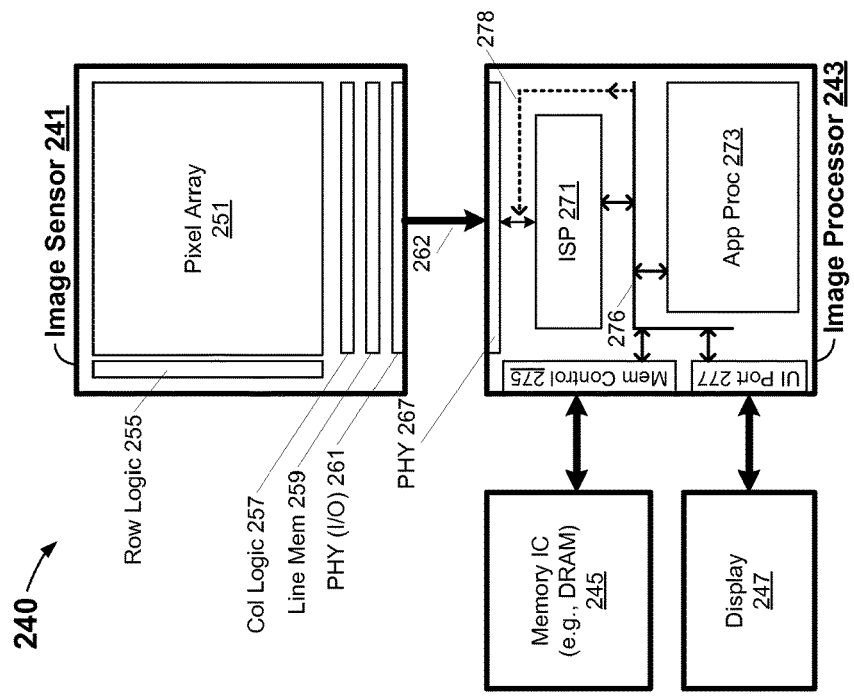
FIG. 8 illustrates an embodiment of an imaging system having a conditional-read image sensor together with an image processor, memory and display.

FIG. 8 illustrates an embodiment of an imaging system 240 having an image sensor 241, image processor 243, memory 245 and display 247. The image sensor 241 includes a pixel array 251 constituted by temporally-over-sampled conditional-read pixels according to any of the embodiments disclosed herein, and also includes pixel control and read-out circuitry as described above, including row logic 255, column logic 257, line memory 259 and PHY 261. Image processor 243 (which may be implemented as a system-on-chip or the like) includes an image signal processor (ISP) 271 and application processor 273, coupled to one another via one or more interconnect buses or links 276. As shown, ISP 271 is coupled to receive imaging data from the pixel array via PHY 267 (and signaling link(s) 262, which may be implemented, for example, by a Mobile Industry Processor Interface ("MIPI" bus) or any other practicable signaling interface), and the ISP and application processor are coupled to a memory control interface 275 and user-interface port 277 via interconnect 276. Further, as explained below, interconnect 276 may also be coupled to the image sensor interface of ISP 271 (i.e., the ISPs interface to PHY 267) via side-channel 278 to enable the application processor to deliver data to the ISP in a manner that emulates an image sensor.

Still referring to FIG. 8, imaging system 240 further includes one or more memory components 245 coupled to the memory control interface 275 of image processor 243. In the example shown, and in the discussion below, the memory components are assumed to include a dynamic random access memory (DRAM) which may serve as a buffer for image sub-frame data and/or as a frame buffer for other functions. The memory components may additionally include one or more non-volatile memories for long-term storage of processed images.

User-interface port 277 is coupled to a user display 247 which may itself include a frame memory (or frame buffer) to store an image to be displayed for a user (e.g., a still image frame or video frame). Though not shown, user-interface port 277 may also be coupled to a keypad, touchscreen or other user-input circuitry capable of providing information to image processor 243 corresponding to user-input, including operating mode information that may be used to configure decimation modes within the image sensor 241. Although also not shown, image processor 243 may be coupled to image sensor 241 through a sideband channel or other control interface to permit transmission of operating mode, configuration information, operation-triggering instructions (including image capture instructions, configuration-programming instructions, etc.) and the like to the image sensor.

Figure 9:
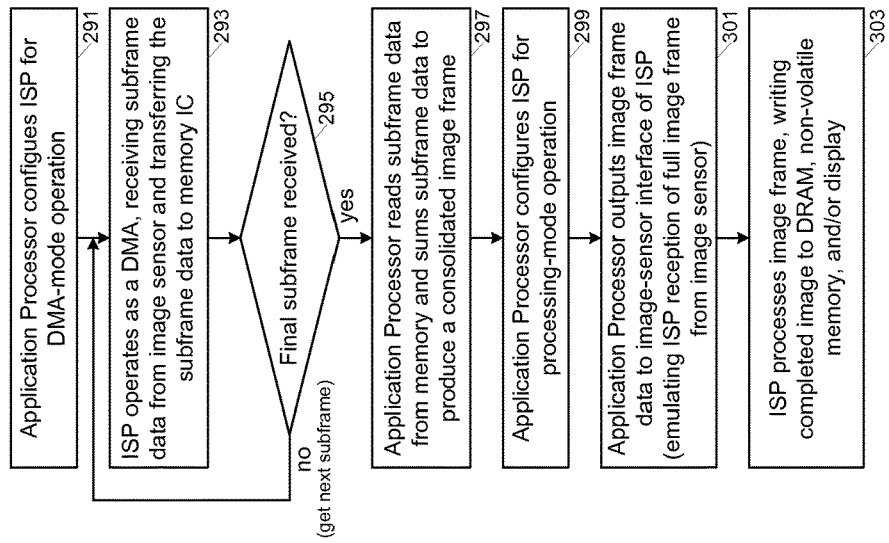
FIG. 9 illustrates an exemplary sequence of operations that may be executed within the imaging system of FIG. 8 in connection with an image processing operation.

FIG. 9 illustrates an exemplary sequence of operations that may be executed within the imaging system of FIG. 8 in connection with an image processing operation. Starting at 291, the application processor configures ISP 271 for DMA (direct-memory-access) operation with respect to memory control interface 275 and thus memory IC 245. By this arrangement, the ISP is enabled to operate as DMA controller between image sensor 241 and memory IC 245, receiving subframe data from image sensor 241 row by row (as shown at 293) and transferring the subframe data to the memory IC. Thus, the subframe data generated by temporal oversampling within image sensor 241 are, in effect, piped through the ISP directly to memory IC (e.g., a DRAM) where they may be accessed by the application processor. Note that, in the embodiment shown, subframes are loaded into the memory one after another until a final subframe has been received and stored (i.e., the frame-by-frame storage loop and its eventual termination being reflected in decision block 295). This process may be optimized in an alternative embodiment by omitting storage of the final subframe in memory IC 245 and instead delivering the final subframe data directly to application processor 273. In other embodiments, subframe readout is interleaved, such that the ISP may be receiving successive rows from different incomplete subframes and either sorting them as they are stored, or as they are retrieved at step 297. That is, as shown at 297, the application processor retrieves and combines (e.g., sums or combines in some other fashion) the stored subframes to produce a consolidated (integrated) image frame so that, instead of storing the final subframe in memory and then reading it right back out, the final subframe may be delivered directly to the application processor to serve as a starting point for subframe data consolidation. In any case, at 299 the application processor configures ISP 271 for operation in image-processing mode and, at 301, outputs the image frame data (i.e., the consolidation of the temporally oversampled image sensor data, with any preprocessing or compression applied, as applicable) to the image-sensor interface of the ISP (i.e., to the front-end of the ISP via channel 278), thereby emulating image sensor delivery of a full image frame to ISP 271. At 303, the ISP processes the image frame delivered by the application processor to produce a finalized image frame, writing the completed (processed) image frame, for example, to DRAM or non-volatile memory (i.e., one or both of memory ICs 245), and/or directly to the frame buffer within display 247 to enable the image to be displayed to the system user.

Split-Gate Architecture

Figure 10:
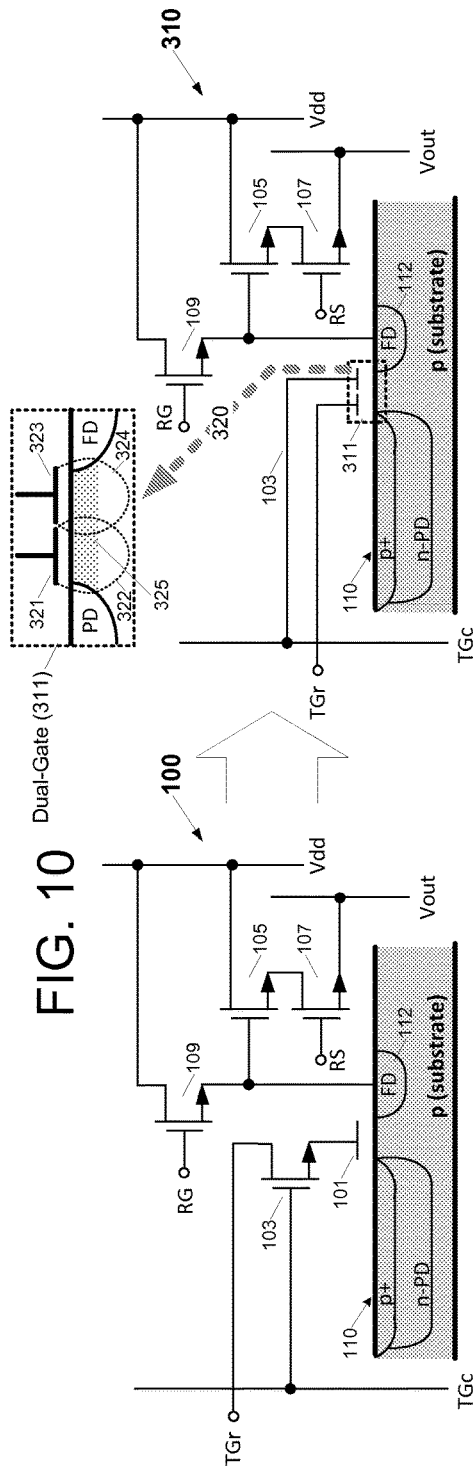
FIG. 10 contrasts embodiments of the conditional-read pixel of FIG. 1 and a "split-gate" pixel.

FIG. 10 contrasts embodiments of the conditional-read pixel 100 of FIG. 1 and a modified pixel architecture 310, referred to herein as "split-gate" conditional-read pixel or split-gate pixel. In the embodiment shown, split-gate pixel 310 includes a photodiode 110 together with the same floating diffusion 112, reset transistor 109, source-follower 105, and read-select transistor 107 as pixel 100, but omits transfer-enable transistor 103 and single-control transfer-gate 101 in favor of a split, dual-control transfer-gate 311. Referring to detail view 320, dual-control transfer gate (or "dual-gate") includes distinct (separate) row and column transfer gate elements 321 and 323 disposed adjacent one another over the substrate region between photodetector 110 (PD) and floating diffusion 112 (FD). The row and column transfer gate elements (321 and 323) are coupled to row and column control lines, respectively, to receive row and column control signals, TGr and TGc and thus are independently (separately) controlled. As discussed in further detail below, by omitting the source/drain implant ordinarily required between series-coupled transistors (and thus between adjacent gate terminals), the row and column transfer gate elements may be disposed closely enough to one another that the resulting overlapping electrostatic fields will form a continuous enhancement channel 325 when both TGr and TGc are asserted, (at a signal level to provide charge transfer), while maintaining an ability to interrupt the channel when either of TGr and TGc are deasserted, (at a signal level to prevent charge transfer). Accordingly, the logic-AND function effected by the combined operation of transfer-gate 101 and transfer-enable transistor 103 in pixel 100 may be achieved within the substantially more compact dual-control gate 311, reducing the pixel footprint (i.e., die area consumption) by a transistor or a significant portion of a transistor relative to pixel 100. In the case of a quad pixel layout, for example, the dual-gate arrangement lowers the per-pixel transistor count from 2.75T (i.e., when pixel 100 is employed) to approximately 1.75T to 2T, depending on the dual-gate implementation. In addition to the reduced non-light-gathering pixel footprint, the dual-gate design permits a negative potential to be applied to the transfer gate or transfer gates during the charge-integration (light accumulation) interval to reduce PD to FD leakage current and transfer gate dark current, a function not readily available in embodiment 100 as a negative TGr voltage may disruptively forward-bias the source/drain to substrate diodes in transfer-enable transistor 103. Further, in contrast to the floating potential that results at transfer gate 101 of pixel 100 whenever TGc is lowered, row and column transfer gate elements 321 and 323 are continuously coupled to signal driving sources and thus continuously driven to the driver output voltage (i.e., not floating), potentially reducing noise in the pixel read-out operation.

Figure 11:
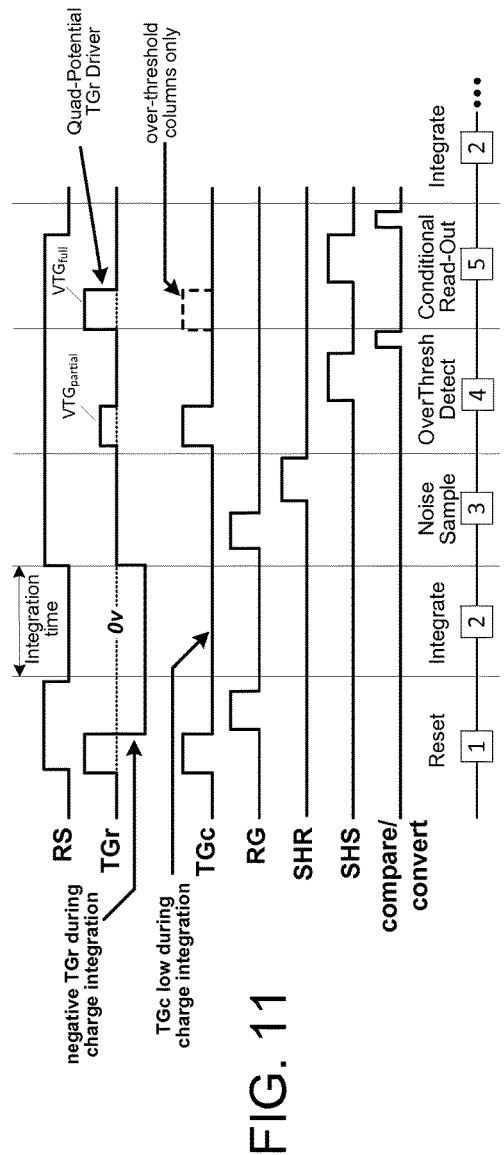
FIG. 11 is a timing diagram illustrating an exemplary pixel cycle (reset/charge integration/read-out) within the split-gate pixel of FIG. 10.

FIG. 11 is a timing diagram illustrating an exemplary pixel cycle (reset/charge integration/read-out) within the split-gate pixel of FIG. 10. As in embodiments described above, the pixel cycle is split into five intervals or phases corresponding to distinct operations carried out to yield an eventual progressive read-out in the final two phases (the pixel can also provide an unconditional readout sequence that skips phase four). Referring to both FIG. 11 and split-gate pixel 310 in FIG. 10, a reset operation is executed within the photodiode and floating diffusion in phase one by concurrently raising the TGr and TGc signals to establish a conduction channel between photodiode 110 and floating diffusion 112 (i.e., as shown at 325 in FIG. 10), and thereby reset the photodiode by enabling residual or accumulated charge within the photodiode to be transferred to the floating diffusion. After (or concurrently with) the charge transfer operation, the reset-gate signal (RG) is pulsed to switch on reset transistor 109 and thus evacuate/empty charge from the floating diffusion by switchably coupling the floating diffusion to $V_{dd}$ or other supply voltage rail. In the embodiment shown, TGr is driven to a negative potential following the photodetector reset operation (e.g., immediately after concurrent assertion with TGc or at the conclusion of the reset phase), thereby establishing a low-leakage isolation between the photodetector and floating diffusion, and reducing dark current from the region below TGr. Also, because the row and column control signals are jointly applied to adjacent transfer gate elements, TGc may be raised and lowered as necessary following the photodetector reset operation and during the ensuing integration phase (phase 2) without floating the transfer gate. Thus, TGc is lowered following pixel reset and, while shown as remaining low throughout the ensuing integration and noise sampling phases (phases 2 and 3), will toggle between high and low states during those phases to support reset and read-out operations in other pixel rows.

The noise or reset sampling operation within phase 3, overthreshold detection within phase 4 and conditional read-out (or conditional transfer) within phase 5 are carried out generally as discussed in reference to FIG. 2, except that TGc need only be raised in conjunction with the TGr pulses (i.e., to VTGpartial and VTGfull) during the partial-transfer and conditional-transfer operations. In the embodiment shown, a quad-potential TGr driver is provided within the row decoder/driver to maintain TGr at the negative potential throughout the integration phase, and then step TGr up to a pre-read potential (zero volts in the example shown) at the start of the noise sampling phase before raising TGr further to $VTG_{partial}$ and finally to $VTG_{full}$ in the overthreshold detection and conditional read-out operations, respectively. In alternative embodiments, a three-potential driver may be used to maintain TGr at the negative potential except when pulsed to $VTG_{partial}$ or $VTG_{full}$ (i.e., no pre-read potential).

FIG. 12 illustrates exemplary low-light and high-light operation of the split-gate pixel of FIG. 10, showing electrostatic potential diagrams in each case beneath schematic cross-section diagrams of the photodetector (photodiode 110 in this example), row and column transfer gate elements 321 and 323 (i.e., forming a dual-control transfer gate) and floating diffusion 112. As in preceding examples, the depicted levels of electrostatic potential are not intended to be an accurate representation of the levels produced in an actual or simulated device, but rather a general (or conceptual) representation to illustrate the operation of the pixel read-out phases. Starting with the low-light example, a relatively low level of charge is accumulated within the photodiode during the integration phase (phase 2) so that, when TGc is asserted and TGr is raised to the partial-on potential ($VTG_{partial}$) during overthreshold detection phase 4 (i.e., after noise sample acquisition in phase 3), the charge level is insufficient to be transferred via the relatively shallow channel formed between photodiode 110 and floating diffusion 112. Because the accumulated charge level does not exceed the spillover threshold established by application of $VTG_{partial}$ to the gate element coupled to the TGr line, there is no spillover from the photodiode to the floating diffusion and the accumulated charge instead remains undisturbed within the photodiode. Because no spillover is detected during the overthreshold phase, TGc is deasserted during conditional transfer (conditional read-out) phase 5. Although some charge may migrate to the well under the row gate during TGr assertion, that charge will move back to the photodiode well when TGr is deasserted, thus maintaining the charge level within the photodiode as a starting point for further charge accumulation in a subsequent integration interval. By contrast, in the high-light example, the higher level of accumulated charge does exceed the spillover threshold during overthreshold detection phase 4 so that a portion of the accumulated charge (i.e., that subset of charge carriers that are above the transfer gate partially-on electrostatic potential) spills over into floating diffusion node 112, with the residual accumulated charge remaining within the photodiode as shown at 918. Accordingly, the spilled charge is detected during the phase 4 read phase such that, during overthreshold phase 5, TGr is raised to the $VTG_{full}$ potential concurrently with assertion of TGc, thus establishing a full conduction path through the channel formed by the dual-gate structure to transfer the entirety of the accumulated charge from photodiode 110 to floating diffusion 112.

Figure 13:
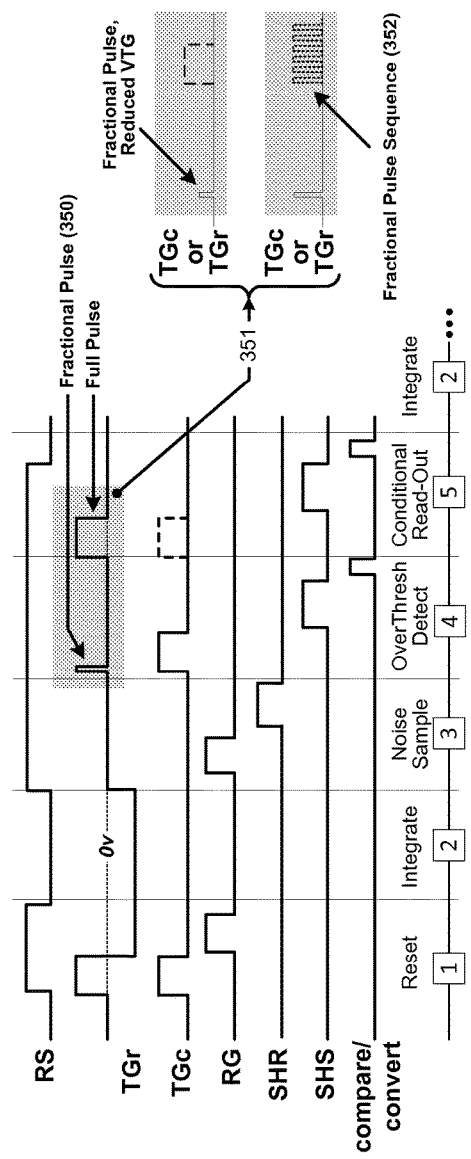
FIG. 13 illustrates an alternative overthreshold detection operation within the split-gate pixel of FIG. 10.

FIG. 13 illustrates an alternative overthreshold detection operation within the split-gate pixel of FIG. 10. As shown, instead of driving the TGr line to a partial potential (i.e., $VTG_{partial}$) for a full transfer time, a fractional (i.e., reduced-width) TGr pulse 350 is applied in conjunction with the TGc pulse (which may also have a fractional pulse width) thus limiting the time available for charge transfer between the photodetector and floating diffusion. In one embodiment, for example, fractional pulse 350 is a short-duration pulse having a time constant shorter than required to transfer all charge above the threshold defined by the voltage applied to the dual-control transfer gate and therefore transfers the charge only partially, in contrast to a full-width pulse which is long enough to transfer all of that charge. Accordingly, due to the time constant and sub-threshold characteristics of the photodetector-to-diffusion charge transfer, below-threshold charge integration within the photodetector will yield little or no charge transfer during the fractional pulse interval, while overthreshold charge integration will yield a detectable charge transfer, analogous, in effect, to application of $VTG_{partial}$ for the full pulse interval. Pulse width control may provide superior performance (i.e., relative to voltage-level control) in terms of repeatability and/or threshold precision, particularly in noisy environments (e.g., where switching noise may couple to the TGr line) or where programmable threshold trimming or calibration may be needed. As shown at 351, the partial-readout control, whether pulse-width or voltage-level controlled, alternatively (or additionally) may be applied to the TGc line, particularly where the TGc signal is used to control the gate element nearest the photodetector. Also, pulse-width control and voltage control may be combined, for example, by driving a fractional pulse having a reduced voltage onto the TGc or TGr line. Further, the full pulse applied to the TGr and/or TGc line during a conditional read-out operation (and/or during a reset operation) may be replaced by a burst of fractional pulses as shown at 352, thus establishing a uniform (fractional) width for each pulse applied. In one embodiment, the full pulse width during conditional-readout phase 5 is on the order of 200 to 1000 nanoseconds (nS), while the fractional pulse width is on the order of 2 to 200 nanoseconds, though other fractional and/or full pulse widths may apply in alternative embodiments. Although shown as operative for a split-gate embodiment, similar fractional pulse methods are applicable to embodiments having a transfer-enable transistor coupled between the transfer-gate row line (TGr) and transfer gate.

Figure 14:
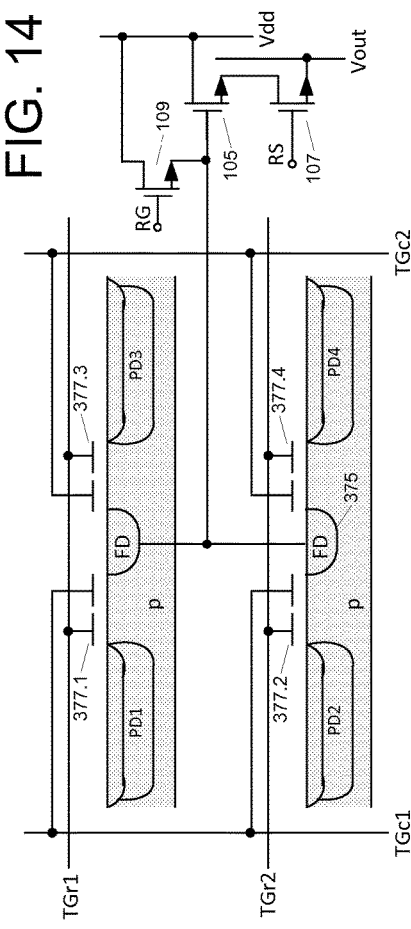
FIG. 14 illustrates a quad-pixel, shared floating diffusion image sensor architecture in which pairs of row and column transfer-gate control lines are coupled to a dual-gate structure within each of four split-gate pixels.

FIG. 14 illustrates a quad-pixel, shared floating diffusion image sensor architecture in which pairs of row and column transfer-gate control lines (TGr1/TGr2 and TGc1/TGc2) are coupled to a dual-gate structure (377.1-377.4) within each of four split-gate pixels in the manner described above. More specifically, by centralizing a shared floating diffusion 375 between four pixels (each also including a respective one of photodiodes PD1-PD4 and one of dual-control transfer gates 377.1-377.4, together with shared reset-gate transistor 109, source follower 105 and read-select transistor 107) and splitting the column transfer-gate control line TGc into separate odd and even column-enable lines (TGc1 and TGc2, each coupled to a respective column-line driver), a highly compact pixel layout may be achieved. In alternative embodiments, split-gate pixels may be disposed in a 4×1 quad pixel group similar to that shown in FIG. 5.

Figure 15:
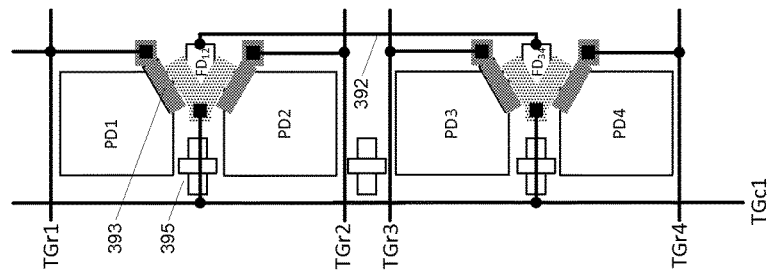
FIG. 15 illustrates a 4×1 block of split-gate pixels (a quad, split-gate pixel block) that may be operated in binned or independent-pixel modes as described above, for example, in reference to FIG. 5.

FIG. 15 illustrates a 4×1 block of split-pixels (a quad, split-pixel block) that may be operated in binned or independent-pixel modes as described above, for example, in reference to FIG. 5. As shown, floating diffusion regions $FD_{12}$ and $FD_{34}$ for upper and lower pixel pairs, respectively, are interconnected via conductor 392 (or alternatively formed by a single floating diffusion region), thus permitting, for example, the states of photodiodes PD1 and PD3 or photodiodes PD2 and PD4 to be read conjunctively (i.e., read concurrently or as one). Each photodiode in the 4×1 pixel block is switchably coupled to a floating diffusion node via a dual-control gate, with a row gate element 393 coupled to a respective one of the four row lines (i.e., TGr1-TGr4 for photodiodes PD1-PD4, respectively) and a column gate element 394 coupled to the per block column line. In the implementation shown, a shared column-line contact is coupled to each of the two column gate elements adjacent a given floating diffusion, thus halving the required number of column line interconnects. Shared transistors 395, 396 and 397 (i.e., reset-gate, source follower and read-select transistors) are disposed in regions between photodiodes PD1-PD4, though any or all of those transistors may be disposed at other positions. Also, while the row line is coupled to the dual-control gate element nearest the photodiode and column line coupled to the gate element nearest the floating diffusion, that arrangement may be reversed in alternative implementations.

Low Power, Pipelined Image Sensor

Figure 16:
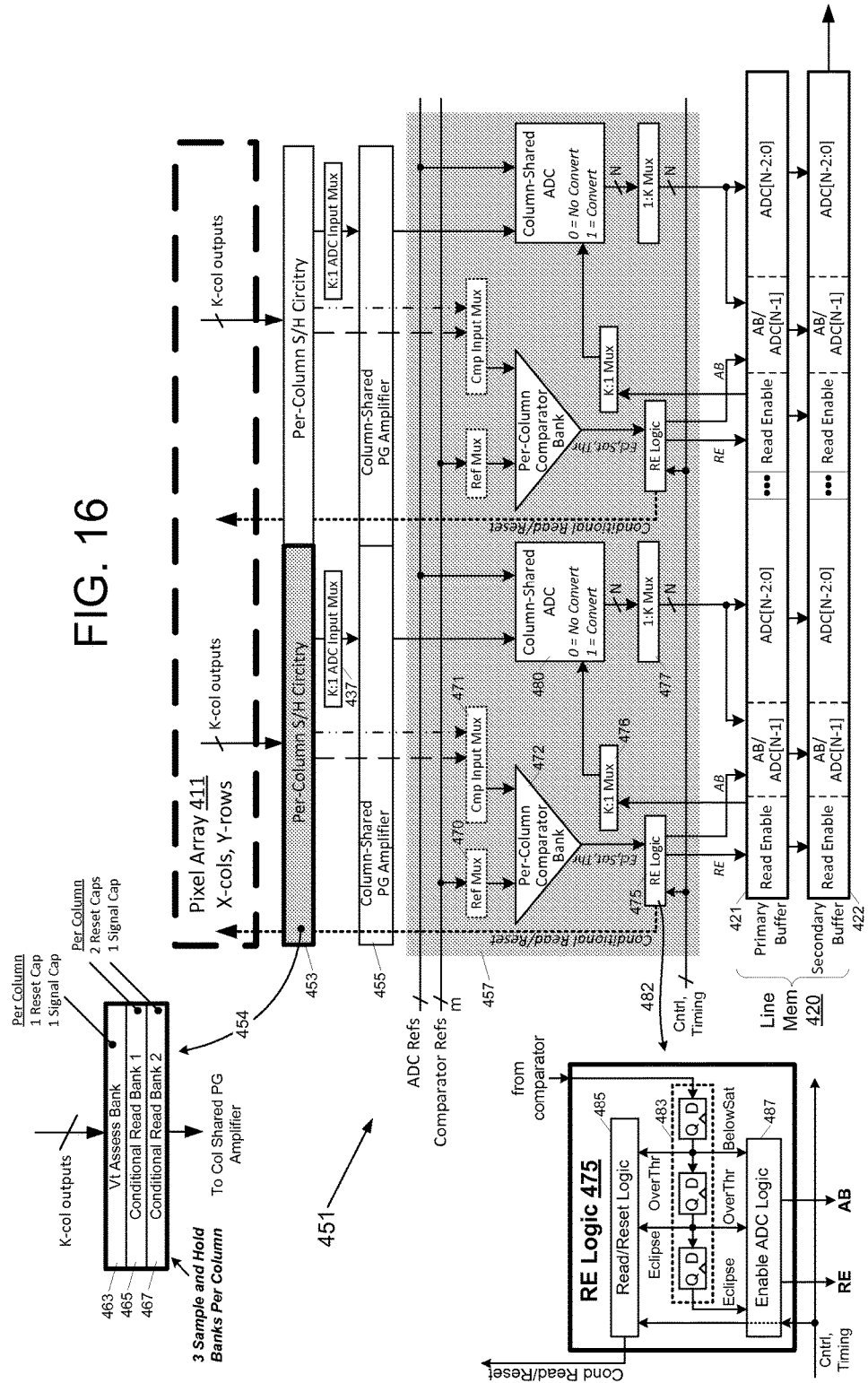
FIG. 16 illustrates an embodiment of a low power image sensor that may be used to implement component circuitry within the image sensor of FIG. 8.

FIG. 16 illustrates an embodiment of a low power image sensor that may be used to implement component circuitry within the image sensor of FIG. 8. In the example shown, image sensor 451 includes a pixel array 411, multi-bank sample-and-hold (S/H) circuitry 453, column-shared programmable-gain (PG) amplifier bank 455 (PGA), comparator/ADC circuitry 457 (including per-column comparator circuitry and column-shared ADC circuitry as discussed below), and line memory 420. Pixel array output lines convey pixel read-out signals to sample-and-hold circuitry 453, which in turn supplies analog samples of the read-out signals, with and without gain from the PGA 455, to comparator/ADC circuitry 457. To conserve die area, a single programmable gain amplifier 455 and single ADC circuit 480 are shared among K columns of the pixel array and cycled K times for each row of the pixel array (for an unconditional readout operation). By contrast, a dedicated (separate) threshold comparator 472 is provided for each column of pixels to enable pixel state (e.g., eclipse, under/over threshold, saturation) to be assessed across an entire row of pixels in parallel. In the embodiment shown, such "per-column" threshold comparators 472 are operated cyclically to perform multiple pixel state evaluations per pixel row (i.e., in parallel for each pixel in the row), including an eclipse assessment to determine, for each pixel in the row, whether the reset-state of the floating diffusion has fallen below an eclipse threshold; an underthreshold assessment to determine whether charge integration within the pixel has exceeded a conditional read/reset threshold, and a saturation assessment to determine whether the pixel charge integration level sampled in a conditional read/reset operation exceeds a saturation threshold (i.e., a threshold corresponding to a saturation point of ADC circuit 480). Thresholds corresponding to the various pixel state assessments (e.g., eclipse threshold, conditional read/reset threshold, saturation threshold) are applied one after another to the input of the per-column comparators 472 via corresponding reference multiplexers 470, and a comparator input multiplexer 471 is provided to select between multiple sample-and-hold circuit outputs as discussed below.

Comparator results for each pixel column are captured within a respective read-enable logic circuit 475 which conditionally drives a conditional read/reset signal (e.g., TGc) back to the pixel column and also outputs read-enable and above/below-range bits (RE and AB) to primary buffer 421 of line memory 420. After pixel state assessment is complete for a given pixel row, the read-enable bit for each of K columns is passed, one after another via multiplexer 476, to the enable input of column-shared ADC (analog-to-digital converter) circuit 480 and to column-shared PGA 455, thereby selectively enabling digitization of individual column read-outs (i.e., according to the logic state of the selected RE bit), suppressing signal amplification and digitization (and thus conserving power) for pixels that are eclipsed, below the conditional read/reset threshold, or saturated. Multiplexer 477 is provided to demultiplex (i.e., distribute) digitized samples from column-shared ADC circuit 480 into respective per-column storage locations within the primary line-memory buffer 421 including, in the embodiment shown, overwriting the AB bit location.

Still referring to FIG. 16, pipelined operation within the various data read-out stages (i.e., pixel state assessment, conditional ADC, and line memory read-out) is enabled, at least in part, by multi-bank sample-and-hold circuitry 453. In the embodiment shown in detail view 454, for example, three separate sample-and-hold banks are provided for sequentially executed read-out operations, including an "Eclipse/Vt" bank 463 that stores pixel samples evaluated to detect eclipse events and determine whether the conditional read/reset threshold is exceeded (the latter referred to alternately as "Vt assessment" or conditional read/reset threshold assessment); an even-row conditional read S/H bank 465 (Conditional Read Bank 1) to store pixel samples that enable saturation detection and read-out digitization (ADC operation) for even-numbered pixel rows, and an odd-row conditional read S/H bank 467 (Conditional Read Bank 2) to store pixel samples that enable saturation detection and read-out digitization for odd-numbered pixel rows. As explained in greater detail below, by providing a separate (dedicated) Eclipse/Vt bank 463, S/H for the comparator operation can be pipelined with storage into the conditional read S/H banks. Thus, by providing separate conditional read S/H banks for even and odd rows and alternately storing samples therein for eventual digitization within the column-shared ADC circuitry, it becomes possible to pipeline pixel state assessment and ADC operations from row to row.

Referring to detail view 482, an exemplary implementation of RE logic 475 includes shift register 483 to capture the output of comparator 472 following a sequence of per-row pixel assessment evaluations, latching each new assessment result (i.e., comparator output, including an eclipse flag, overthreshold flag and below-saturation flag) in response to a timing signal from the sensor control logic (e.g., element 983 of FIG. 52). Read/reset logic 485 evaluates the states of the eclipse and overthreshold (i.e., above Vt) flags when enabled by another timing signal (or state transition signal), asserting a conditional read/reset signal according to their states as discussed below. Similarly, Enable-ADC logic 487 outputs read-enable and above/below-range bits (RE) and (AB) for the pixel under evaluation in response to another control/timing signal and according to the states of the eclipse, overthreshold and below-saturation flags.

Figure 17:
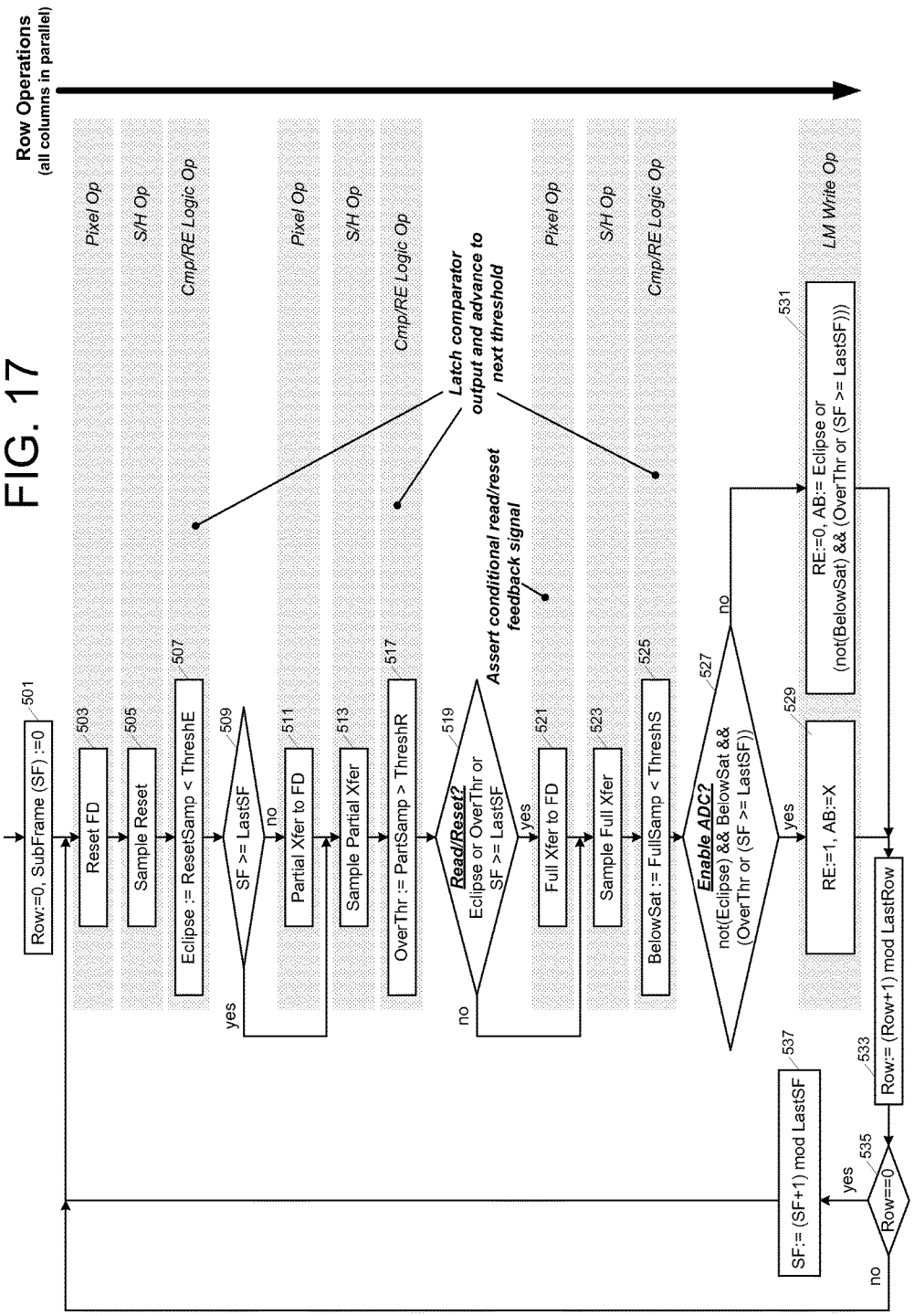
FIG. 17 illustrates a sequence of operations that may be executed within the pixel array, sample/hold banks and comparator circuitry of FIG. 16 to carry out pixel state assessment and enable subsequent ADC operation for row after row of pixels.

FIG. 17 illustrates a sequence of operations that may be executed within the pixel array, sample/hold banks and comparator circuitry of FIG. 16 to carry out pixel state assessment and enable subsequent PGA and ADC operation for row after row of pixels. In the implementation shown, each image frame is assumed to contain a sequence of conditional-read subframes that conclude with conditional read/reset operations, and a final unconditional-read subframe in which the integration states of pixels within the subject row are unconditionally read-out and, if no saturation or eclipse condition is detected, digitized to yield a subframe output. This approach of conditionally reading out pixel data during non-final subframes of a given image frame and then concluding the image frame with an unconditional read/reset operation is carried forward in a number of embodiments described below. In all cases, conditional read/reset operations may be carried out unconditionally (i.e., regardless of threshold comparison results) and unconditional read/reset operations may be replaced by conditional read/reset operations.

Starting at 501, row and subframe indices (Row, SF) are cleared to zero, followed by a three-phase pixel assessment operation involving, in order, the selected pixel row (i.e., row zero in the first loop iteration), the sample and hold circuitry, and the comparator/read-enable logic. More specifically, the floating diffusion (FD) is reset in a pixel operation at 503, a sample of the FD reset state is captured in the sample-and-hold circuitry at 505 and the reset-state sample is compared with an eclipse threshold at 507, with the result of the eclipse assessment being latched as a Boolean "Eclipse" flag (e.g., within RE shift register 483 of FIG. 16). If the subframe is not the last (final) subframe in the exposure interval (negative determination at 509), another three-phase pixel assessment operation is carried out to determine whether charge integrated within the pixel has exceeded the conditional read/reset threshold. Thus, a partial transfer from photodetector to floating diffusion is executed in a pixel operation at 511, a sample of the signal-state of the floating diffusion (enabling determination of whether a least a specified amount of charge was transferred during the partial-transfer operation) is captured within the sample and hold circuitry at 513, and the signal-state sample is compared within a conditional read/reset threshold (ThreshR) within the comparator circuitry at 517, with the result of the comparison being latched as a Boolean "OverThr" flag within the RE logic. In the embodiment shown, if the subframe is the final subframe (i.e., affirmative determination at 509), the partial transfer operation at 511 is bypassed, thus leaving the state of the photodetector undisturbed in preparation for an unconditional read operation (note that some other operating modes may have more than one unconditional read per row per frame). In one implementation, the sample and hold operation at 513 and the ThreshR comparison/OverThr latching operations at 517 are carried out regardless of whether partial transfer operation 511 is bypassed, thus simplifying control of the sample and hold circuitry and comparator/RE logic (i.e., the logic may operate the same way for each subframe so that no subframe-dependent control operation is needed with respect to the operations shown at 513 and 517). In alternative embodiments, the control logic may account for the final subframe condition and bypass the partial transfer sample operation 513 and/or comparator/read-enable logic operation 517.

Referring to the read/reset determination at 519, if either the Eclipse flag or OverThr flag is set (indicating that the subject pixel is in an eclipsed state and thus should be reset, or that sufficient charge has been integrated within the pixel to trigger conditional read and reset), or if the subframe is the final subframe in the integration interval (indicating that an unconditional read/reset is to be performed), then a full transfer from photodetector to floating diffusion is executed in the pixel operation at 521 (thus resetting the photodetector), followed by capture of the signal-state of the floating diffusion in a sample-and-hold operation at 523, and then a comparison of the signal-state sample with a saturation threshold (ThreshS) at 525, with the comparison result being latched as a Boolean "BelowSat" flag within the RE logic (a differential saturation test may be applied in alternative embodiments, comparing the difference between the signal-state sample and reset sample with the saturation threshold). Note that the floating diffusion of the pixel will be reset at 503 before further sampling so that the photodetector-to-floating diffusion charge transfer at 521 effectively resets the pixel. Thus, if the pixel is eclipsed, has integrated charge above the conditional read/reset level, or is being evaluated in the final subframe of an exposure interval (i.e., affirmative determination at 519), the pixel is reset. By contrast, if the pixel is neither eclipsed or overthreshold in a non-final subframe (negative determination at 519), the charge transfer operation at 521 is bypassed, thereby preserving charge within the photodetector to enable integration to continue into the next subframe. Note that the sampling operation at 513 and BelowSat comparison/result-latch at 517 may be omitted for eclipsed pixels in an alternative embodiment.

At 527, the OverThresh, BelowSat and Eclipse flags are evaluated together with the final-subframe indication to either enable or disable PGA and ADC operation with respect to the subject pixel, a selection effected by setting or clearing the RE bit in a line memory write operation at 529 or 531, respectively. More specifically, if the pixel state flags indicate that the pixel is not eclipsed and below the saturation threshold, and either (i) the subframe is the final subframe or the pixel state flags indicate that the partial read-out exceeded the conditional-read threshold (i.e., affirmative determination at 527), then PGA and ADC operation is enabled by setting the read-enable bit in a line memory write operation at 529. In that case, the value written to the AB bit, if any, is a don't care ('X') as the set RE bit will enable a subsequent ADC output to overwrite the AB bit. If the pixel state flags indicate that the pixel is either eclipsed or saturated, or does not exceed the conditional read/reset threshold (except in final subframe), or is not below the saturation threshold (i.e., negative determination at 527) then PGA and ADC operation is disabled by clearing the read-enable bit in a line memory write operation at 531. If ADC operation is disabled, the AB bit is written with a value that indicates whether the pixel state is saturated or eclipsed (AB:=1), or the pixel is underthreshold (AB:=0). Note that the expression shown in operation 531 reflects the particular implementation of the pixel assessment shown in FIG. 17 (i.e., OverThresh is meaningless if the pixel is eclipsed, and BelowSat is meaningless if Overthresh and Eclipse are both false in a non-final subframe) and may be different for a different pixel assessment sequence. Following the line memory write operation at 529 or 531, the row index is incremented by the scan sequencer (i.e., within control logic 983 of FIG. 52) at 533 in preparation for loop iteration with respect to the subsequent pixel row, rolling/resetting to row zero following loop iteration with respect to the final row in the sensor (for interleaved operation, row sequencing will not be sequential and the subframe index may change at each row). If a row reset occurs (i.e., affirmative determination at decision 535), the subframe index is incremented at 537 in preparation for subsequent subframe processing, rolling to zero if the just-processed subframe was the final subframe in an exposure. Note that depending on the pixel architecture and subframe exposure method, the next row may not be physically adjacent to the subsequent row.

Referring to FIGS. 16 and 17, in one embodiment, the comparator/RE logic operations shown at 507, 517 and 525, not only latch the comparator output within the RE logic (e.g., shifting the comparator result into shift register 483 of FIG. 16), but also advance the control input to reference multiplexer 470, thereby sequencing in order through the eclipse, conditional-read and saturation thresholds (ThreshE, ThreshR, ThreshS). While not specifically shown, the conditional reset and/or saturation thresholds may be changed from subframe to subframe, thus enabling subframe-specific thresholds to be applied according to subframe duration (i.e., setting a higher or lower conditional read threshold according to the subframe integration interval), programmable gain settings (i.e., aligning ThreshS with the signal level that will saturate the ADC for a given programmable gain setting), and/or any other factors.

Figure 18:
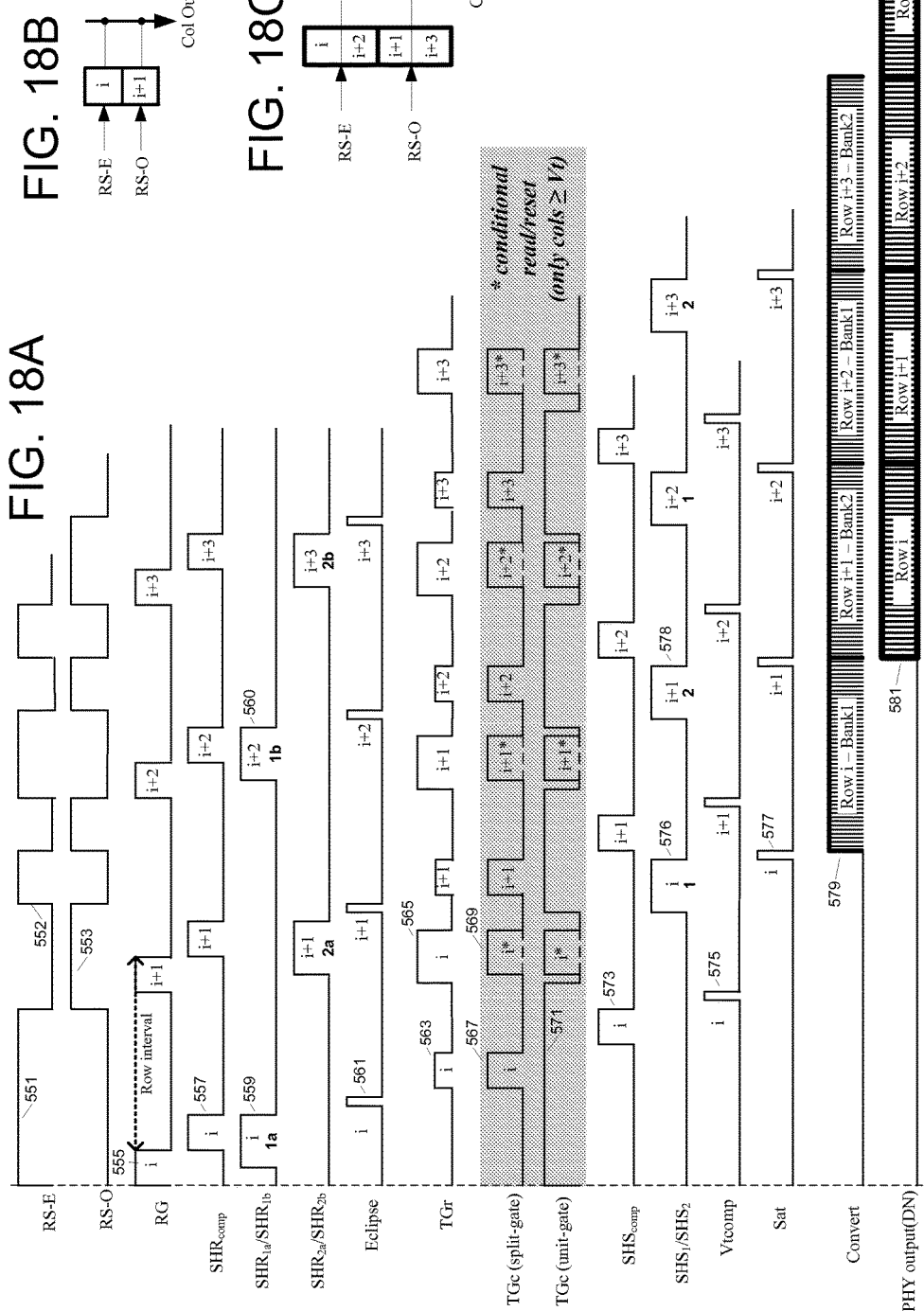
FIG. 18A illustrates an exemplary timing diagram in accordance with the sensor architecture of FIG. 16 and operational sequence of FIG. 17, including alternate TGc waveforms corresponding to split-gate and continuous-gate pixel array embodiments, respectively.
FIGS. 18B and 18C present exemplary read-out sequences that may be employed with respect to even and odd rows of pixels.

FIG. 18A illustrates an exemplary timing diagram in accordance with the sensor architecture of FIG. 16 and operational sequence of FIG. 17, including alternate TGc waveforms, "TGc (split-gate)" and "TGc (unit-gate)," corresponding to split-gate and continuous-gate pixel array embodiments, respectively. As noted above, the TGc waveforms for the two embodiments differ primarily in the TGc state during intervals of isolation between photodetector and floating diffusion. In the exemplary diagram of FIG. 18A, for instance, TGc is lowered in the split-gate embodiment to maximize the isolation between photodetector and floating diffusion, but held high in the continuous-gate embodiment for the same purpose (i.e., to ensure that the low state of the TGr line is applied to the transfer gate and thus avoid (or minimize) the floating transfer-gate condition.

FIGS. 18B and 18C present exemplary read-out sequences that may be employed with respect to even and odd rows of pixels. More specifically, FIG. 18B illustrates a non-shared pixel architecture where even and odd rows and pixels have a dedicated RS control and are read-out one after another, while FIG. 18C illustrates a shared pixel architecture in which each pair of pixels within a pixel column form a two-pixel cell (sharing a floating diffusion) and share a read-out line. In this arrangement, a first 2-row by 1-column shared pixel cell containing even-row pixels 'i' and 'i+2' and a second 2-row by 1-column shared pixel cell containing odd-row pixels 'i+1' and 'i+3' constitute a 4-row by 1-column region. A single row-select signal (RS-E) is provided for the first shared pixel cell (the even-row pixels) and another single row-select signal (RS-O) is provided for the second shared pixel cell (the odd-row pixels). The row readout order is as shown from top down (i.e., i, i+2, i+1, i+3) to avoid resource conflict with the shared floating diffusion region in the shared pixel cells. In general, the timing diagram of FIG. 18A, sample-and-hold circuitry described below in reference to FIG. 19 and sample-and-hold pipeline shown in FIG. 20 refer to the dedicated row-select embodiment of FIG. 18B. In all cases, the timing events and circuitry shown may be extended to cover the shared-read-out architecture of FIG. 18C or other shared read-out (shared floating diffusion and/or shared sample/hold circuitry) architectures, including 2×2 pixel-sharing readout architectures where each row readout may only be a half-row (even or odd columns) readout. Note also that "even" and "odd" readout refers to the use of the sample and hold registers and does not require that readout of an odd array row always follow an even array row—for interleaved readout where a row readout from one subframe is followed by a row readout from another subframe, the two row indices always may be spaced apart in the array and thus an even row could follow another even row in readout order, without causing a resource conflict.

In the timing example presented in FIG. 18A, interleaved pixel row operations are executed for even and odd pixel rows with the row operations for any single row corresponding to those shown in FIG. 17. More specifically, pixel reset, reset-state sample, eclipse assessment, partial transfer, signal-state sample and overthreshold (i.e., conditional read/reset threshold) assessment operations are executed with respect to even pixel row 'i' during an interval in which an even-row row-select signal (RS-E) is asserted as shown at 551, followed by pixel reset, reset-state sample and eclipse assessment operations with respect to odd pixel row 'i+1' during assertion of odd-row row-select signal (RS-O) at 553. Thereafter, RS-E is raised again at 552 to enable signal-state sample capture following a conditional read/reset operation in pixel i, with RS-O and RS-E thereafter being alternately enabled to permit interleaved (pipelined) reset-state and signal-state sampling operations with respect to the even and odd sample-and-hold banks. As discussed above, pixel reset is effected by assertion of a reset-gate signal (RG) as shown at 555 to couple the floating diffusions within a given row of pixels to a reset potential. Note that the pixel row index 'i' shown beneath the signal pulse in the signal RG waveform signifies a pulse on the RG signal line for row 'i', while pulse 'i+1' shown in that same waveform signifies a pulse on the RG signal line for row 'i+1' and thus the pulsing of a separate signal line—this indexed interpretation applies in a number of waveforms depicted in FIGS. 18A and 19.

Continuing with FIG. 18A, a row 'i' reset-state sample capture within the Eclipse/Vt S/H bank is triggered by assertion of $SHR_{comp}$ at 557, with $SHR_{1a}$ being simultaneously (559) asserted to capture a reset-state sample within the even row conditional read S/H bank, the latter sample to be applied during subsequent saturation assessment and, if enabled, ADC operation. An eclipse signal is pulsed at 561 to enable the $SHR_{comp}$ reset-state sample to be compared with an eclipse threshold (ThreshE) and latch the comparison result (e.g., within the RE logic as discussed above). Thereafter, at 567, TGc is pulsed (split-gate embodiment) or maintained high (continuous-gate embodiment) and TGr is concurrently raised to a partial-transfer potential (e.g., $VTG_{partial}$ as discussed above) at 563 to enable partial charge transfer from photodetector to floating diffusion, followed by an $SHS_{comp}$ pulse at 573 to capture a signal-state sample of the floating diffusion within the Eclipse/Vt sample-and-hold bank. In the case of a non-final subframe, Vtcomp is pulsed at 575 to compare the partial-transfer sample (i.e., the signal-state sample less the reset-state sample within the Eclipse/Vt sample-and-hold bank) with the conditional read/reset threshold (ThreshR) and latch the comparison result. As discussed above, the Vtcomp pulse may be suppressed in a subframe in view of a forthcoming unconditional read.

Still referring to FIG. 18A, the read-enable logic conditionally asserts the TGc signal at time 569 (i.e., if the conditional read/reset threshold is exceeded, the pixel is eclipsed or an unconditional read/reset is to be performed), concurrently with the full-transfer pulse 565 on the TGr line, thereby enabling charge integrated within the photodetector to be transferred in its entirety to the floating diffusion, resetting the photodetector in preparation for the next integration interval. $SHS_1$ is pulsed at 576 to capture the signal state of the floating diffusion within conditional read S/H bank 1, and at 577 a saturation signal is pulsed to enable the floating diffusion signal state less reset-state (the latter captured in response to the $SHR_{1a}$ pulse at 559, or alternately the floating diffusion signal state) to be compared with an appropriate saturation threshold (ThreshS). As discussed above, the combined pixel assessment results (i.e., eclipse, conditional read/reset and saturation assessments) may be recorded in line memory in the form of RE and AB bits, thus enabling column-sequential ADC operations to be carried out selectively according to the RE bit state for each individual pixel column. At 579, a convert signal is cycled K times (e.g., 48 times) per row read interval (e.g., 2.75 microseconds, though different row intervals may apply) to enable column-shared ADC operation, with the output of each individual pixel column (i.e., signal state less reset state amplified according to the gain selected within the programmable gain amplifier) being selectively/conditionally digitized according to the state of the corresponding RE bit. Digitized read-out values are stored within the line memory as described above, with the contents of the primary line memory buffer transferred to the secondary buffer and output via the PHY with a one row-interval latency as shown at 581.

The multi-bank sample-and-hold implementation shown in FIG. 17 and described in further detail below in reference to FIG. 19 becomes easier to understand in the context of FIG. 18A. More specifically, provision of separate even-row and odd-row conditional read S/H banks makes it possible to capture a signal-state sample of the full charge transfer from photodetector to floating-diffusion within the conditional read S/H bank for an odd pixel row (e.g., row i+1 as shown at $SHS_2$ pulse 578) concurrently with ADC operations with respect to prior-row pixel samples latched within the even-row conditional read S/H bank, and vice-versa. Similarly, because the reset-state sample captured within a given conditional read S/H bank is maintained for more than one row interval (i.e., to support Vt assessment as shown at 575, and ADC operation at 579, provision of two reset-state S/H elements, 'a' and 'b', per conditional read S/H bank makes it possible to pipeline those operations without resource conflict. This can be seen by the alternating assertion of signals $SHR_{1a}$ and $SHR_{1b}$ for even row reset-state samples (e.g., for samples i and i+2 as shown at 559 and 560) and, similarly, by the alternating assertion of signals $SHR_{2a}$ and $SHR_{2b}$ for odd row reset-state samples. Further, because the Eclipse/Vt assessment may be completed within a row interval, a single Eclipse/Vt S/H bank is sufficient to support operations in all rows.

Figure 19:
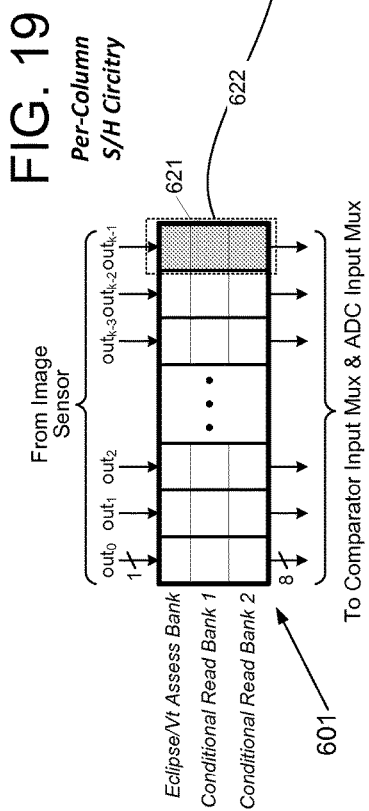
FIG. 19 illustrates an embodiment of multi-bank sample-and-hold circuit that may be used to implement the sample-and-hold (S/H) circuitry depicted in FIG. 17.

FIG. 19 illustrates an embodiment of multi-bank sample-and-hold circuit 601 that may be used to implement the sample-and-hold (S/H) circuitry depicted in FIG. 16. As shown, the column read-out line for each of K pixel columns ($out_0$, $out_1$, . . . , $out_{K-1}$) is supplied to a respective per-column S/H circuit 621, each of which includes three sets of sample-and-hold elements (switch elements and storage elements) corresponding to the three sample-and-hold storage banks shown in FIG. 17, namely, an eclipse/Vt assess bank, and separate even and odd conditional read banks (i.e., Conditional Read Bank 1 and Conditional Read Bank 2). More specifically, as shown in detail view 622, a per-column component of the eclipse/Vt assess bank 625 includes two capacitive storage elements, $Cr_{comp}$, $Cs_{comp}$, coupled via switch elements 631 and 633 to control lines $SHR_{comp}$ and $SHS_{comp}$, respectively. By this arrangement, when either of the $SHR_{comp}$ or $SHS_{comp}$ signals is pulsed (e.g., as shown in FIG. 18A), the floating diffusion state driven onto column read-out line, Out (e.g., by a source follower transistor as described above), is captured within the corresponding capacitive element.

Figure 20:
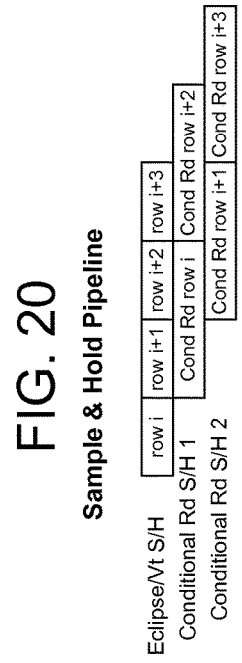
FIG. 20 illustrates an exemplary sample and hold pipeline corresponding generally to the S/H bank usage intervals within the timing arrangement of FIG. 18.

Still referring to FIG. 19, even-row conditional read S/H bank component 627 includes a pair of reset-state capacitive elements, $Cr_{1a}$ and $Cr_{1b}$, and corresponding switch elements 635, 637 (controlled by $SHR_{1a}$ and $SHR_{1b}$, respectively), and a signal-state capacitive element $Cs_1$ and corresponding switch element 639 controlled by $SHS_1$. Odd row S/H bank component 629 similarly includes reset-state capacitive elements, $Cr_{2a}$ and $Cr_{2b}$, and corresponding switch elements controlled by $SHR_{2a}$ and $SHR_{2b}$, respectively, and a signal-state capacitive element, $Cs_2$, and corresponding switch element controlled by $SHS_2$. As explained above, by providing separate reset-state capacitive elements within each conditional read S/H bank, it becomes possible to extend the interval for which a given reset-state sample is held (maintained) beyond two row intervals, and thus enabling pixel state assessment, conditional read/reset and selective ADC operations to be pipelined. FIG. 20 illustrates an exemplary sample and hold pipeline corresponding generally to the S/H bank usage intervals within the timing arrangement of FIG. 18A.

In an alternate embodiment (not illustrated) to FIG. 19, each per-column S/H bank includes a third Conditional Read Bank 3, and the three banks are alternated in a pipeline sequence similar to FIG. 20. Each of the three conditional read banks in this embodiment, however, only include one reset-state capacitive element. Thus the total number of switches and capacitive elements (6) needed for pipelined conditional read operations is the same as FIG. 19, although at least some aspects of operation may be simplified by this alternate arrangement.

FIG. 21 illustrates embodiments of a reference multiplexer 647, comparator input multiplexer 649 and comparator 651 that may be used to implement like-named components depicted in FIG. 16. In the embodiment shown, reference multiplexer 647 sequences through selection of three threshold references, including the eclipse, conditional-read and saturation thresholds discussed above (ThreshE, ThreshR, ThreshS). As mentioned, additional thresholds may be provided and selected to account for variation in programmable gain, reset threshold and so forth (e.g., from subframe to subframe and/or according to imaging settings). The comparator input multiplexer 649 includes a reset-state multiplexer 655 and signal-state multiplexer 657, as well as a single-ended/differential multiplexer 659 that enables selection between single-ended and differential outputs, the latter (i.e., difference between signal-state and reference-state selections) being generated by difference circuit 658.

In one embodiment, the eclipse evaluation is carried out by supplying $Cr_{comp}$ (i.e., the reset-state stored on capacitive element $Cr_{comp}$ within the eclipse/Vt S/H bank) in single-ended form to comparator 651 for comparison with ThreshE, and the saturation assessment can be similarly carried out by supplying $Cs_1$ or $Cs_2$ in single-ended form to comparator 651 for comparison with ThreshS. By contrast, conditional-read comparison is effected by selecting the differential between $Cs_{comp}$ and $Cr_{comp}$, and the saturation comparison by selecting the differential between $Cs_1$ and either of $Cr_{1a}$ and $Cr_{1b}$, or $Cs_2$ and either of $Cr_{2a}$ and $Cr_{2b}$. In alternative embodiments, any of the single-ended comparisons may be differential and vice-versa, in some cases simplifying the comparator input multiplexer circuitry (e.g., if no single-ended signals need be forwarded to comparator 651).

FIG. 22 illustrates embodiments of a column-shared programmable gain amplifier 685 and K:1 ADC input multiplexer 437 that may be deployed within the embodiment of FIG. 16. The ADC input mux includes a column multiplexer 669 and a set of K source-select multiplexers 667 (each including reset-state mux 671 and signal-state mux 673) that cooperate to enable column-by-column delivery of one of four signal-state/reset-state signal pairs ($Cs_1/Cr_{1a}$, $Cs_1/Cr_{1b}$, $Cs_2/Cr_{2a}$ or $Cs_2/Cr_{2b}$) to the differential input of programmable-gain amplifier 685. By this arrangement, after read-enable bits have been recorded to reflect the pixel state assessment for each of K columns, the source-select multiplexer can be set to select an even row or odd row input signal pair (e.g., alternating between $Cs_1/Cr_{1a}$ and $Cs_1/Cr_{1b}$ for every other even pixel row, and alternating between $Cs_2/Cr_{2a}$ and $Cs_2/Cr_{2b}$ for every other odd pixel row) and the K:1 column mux may be sequenced through the input sources from 0 to K−1 to support selective ADC operation.

In the embodiment shown, programmable gain amplifier 685 includes multiple stages of capacitively coupled differential amplifiers 693, each of which applies a programmable gain according to the ratio of an input capacitance 689 and feedback-coupled variable capacitance 691. In one implementation, shown in detail view 692, variable capacitance element 691 is implemented by switchably coupling a variable number of capacitive elements 699 in parallel with a minimum capacitance 697 in accordance with a program setting. In one embodiment, switchably coupled capacitive elements 699 are binary-weighted (capacitances=x, 2x, 4x, 8x, etc.) to enable $2^R$ different capacitance settings in accordance with an R-bit control value. Alternatively, capacitive elements 699 may be thermometer coded, have matching capacitances or any other arrangement that allows programmable gain amplifier to meet a desired amplification range and resolution. Also, the programmable gain amplifier may be disabled by opening gain-stage switch elements 687 in response to deassertion of a PGA enable signal (e.g., signal equivalent to or derived from the RE bits recorded within line memory 420 and supplied via multiplexing element 476 of FIG. 16). Also, any of the gain stages (only two of which are shown) may be bypassed according to programmed gain settings to further extend the amplification range of programmable gain amplifier 685. Note that various other programmable gain amplifier implementations may be used in alternative embodiments, including PGA implementations that are enabled and disabled per the RE flag bit to save power.

FIG. 23A illustrates embodiments of a read-enable multiplexer 711, ADC-enable logic 713 and ADC circuit 715 that may be used to implement the K:1 read-enable multiplexer and ADC circuitry of FIG. 16. As shown, read-enable multiplexer 711 is coupled to receive read-enable bits from each of K storage locations within primary line memory 421 (i.e., each location corresponding to a respective pixel column) and iteratively sequences through those locations to supply the read-enable bits, one after another, to the input of ADC-enable logic 713 (i.e., an AND logic gate in the embodiment shown) and also to the column-shared PGA (where they may serve as or enable generation of the PGA-enable signal described above). Referring to FIGS. 23A and 23B, a convert signal ("Convert") is cycled K times per pixel row to advance the read-enable bit selection (e.g., by incrementing a counter that controls the read-enable multiplexer selection), with the selected read-enable bit gating application of the convert signal to an enable input of ADC circuit 715. By this operation, the high-state of the convert signal either passes through or is blocked by logic gate 713 according to the state of the RE bit for that cycle of the convert signal, thereby either enabling or disabling operation of the PGA and ADC circuit according to the state of the RE bit. The ADC result for each read-enabled pixel column is stored within primary line memory buffer 421 for eventual output to the VLL circuitry and PHY. Though not specifically shown, a set of "store" strobes that enable the output of ADC 715 to be loaded into respective line memory buffer locations may be asserted in succession to enable successive (and selective) loading of ADC results into primary line memory buffer 421. Alternatively, the ADC results may be loaded into a shift register and then transferred in parallel to the line memory buffer, masking or otherwise preventing buffer load operations for those pixel columns in which the RE bit is not set.

Read-Out Dilation

When a color filter array is applied in connection with the conditional read/reset image sensors described above, image distortion may occur when a moving object triggers color-differentiated sampling operations—conditional read/reset operations in a given subframe within pixels for some colors, but not for adjacent pixels of other colors. For example, a moving object that triggers read-out operations in green pixels (i.e., pixels that receive light predominantly in the green wavelength band), but not adjacent red or blue pixels, may trigger relatively rapid read/reset operations within the green pixels while the blue and red pixels are infrequently read (or read on different subframes than the adjacent green pixels), thus producing artifacts in the finalized image. In a number of embodiments, such color artifacts are mitigated by modifying the conditional read/reset determination for a given pixel to account for the read/reset assessment for one or more neighboring pixels, in effect, expanding the number of pixels to be read/reset in response to an overthreshold determination with respect to a given pixel; an approach referred to herein as "read-out dilation" or "read dilation."

Figure 24:
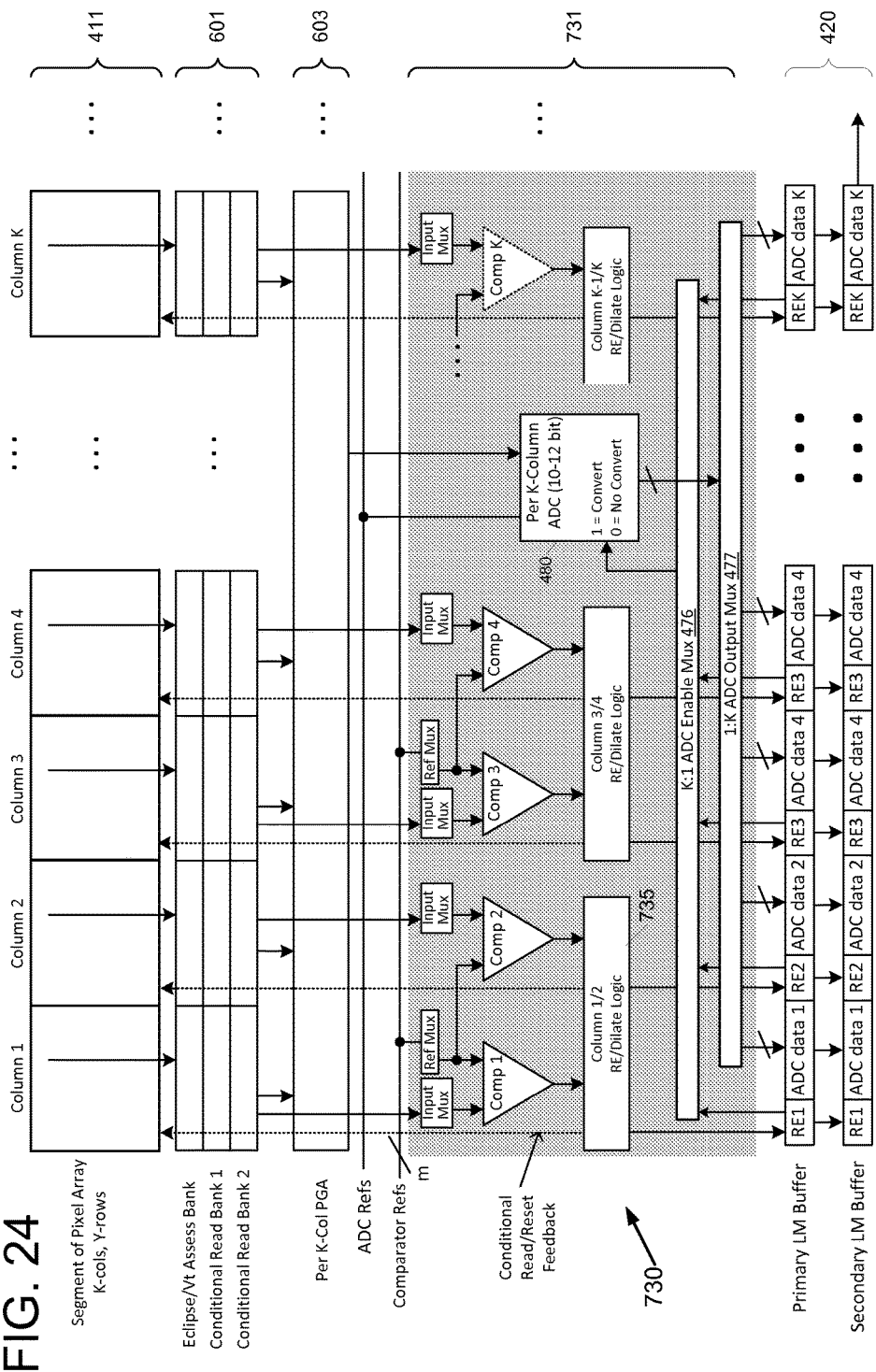
FIG. 24 illustrates an exemplary K-column section of an image sensor having logic to carry out read-dilation operations.

FIG. 24 illustrates an exemplary K-column section of an image sensor 730 having logic to carry out read-dilation operations. In the arrangement shown, the pixel array 411, multi-bank sample-and-hold circuitry 601, column-shared PGA 603, column-shared ADC circuitry 480, multiplexing circuits 476 and 477, and line memory buffers 420 are implemented generally as described in reference to FIGS. 16-23. Comparator circuitry 731 is also implemented generally as described in reference to FIGS. 52 and 57, except that the per-column read-enable logic (element 475 of FIG. 16) is replaced by multi-column read-enable/dilation logic 735 coupled to receive the output of the comparators for multiple adjacent columns corresponding to pixels within the same read kernel (two adjacent columns and thus columns 1/2, 3/4, . . . , K−1/K, in the embodiment shown). By this arrangement, the read-enable bit determination for a given pixel may be based on the pixel assessment results and corresponding row flags for multiple column-adjacent and row-adjacent pixels.

In embodiments that allow interleaved operation between two or more subexposures, RE/Dilate Logic 735 is designed to save dilation state when switching row context from one subexposure to another. For instance, if four subexposure scans are interleaved, logic 735 retains four separate dilation states. When dilation state for a row x is complete, it is retained in an indexed set of registers while, e.g., dilation state for up to three unrelated rows is accessed for the next three row operations. On the fourth successive row operation, which visits row (x+1), the row x state is referenced to determine whether dilation requires pixel reads due to overthreshold state at row x.

Dilation may be neither necessary nor desirable in all modes of operation. Thus preferably, logic 735 has at least one dilate mode and at least one non-dilate mode (where every pixel is evaluated for readout completely independent of surrounding pixels). In some embodiments, dilation can also be activated on a subframe basis. For instance, only the longest subexposure(s) may use dilation, as that is where motion artifacts would be more apparent and/or problematic. Dilation logic 735 would in such case, when interleaving is used, allow state storage for each subexposure that indicates whether or not dilation applies each time a row is visited for that subexposure.

Subframe-Interleaved Read-Out

Figure 25:
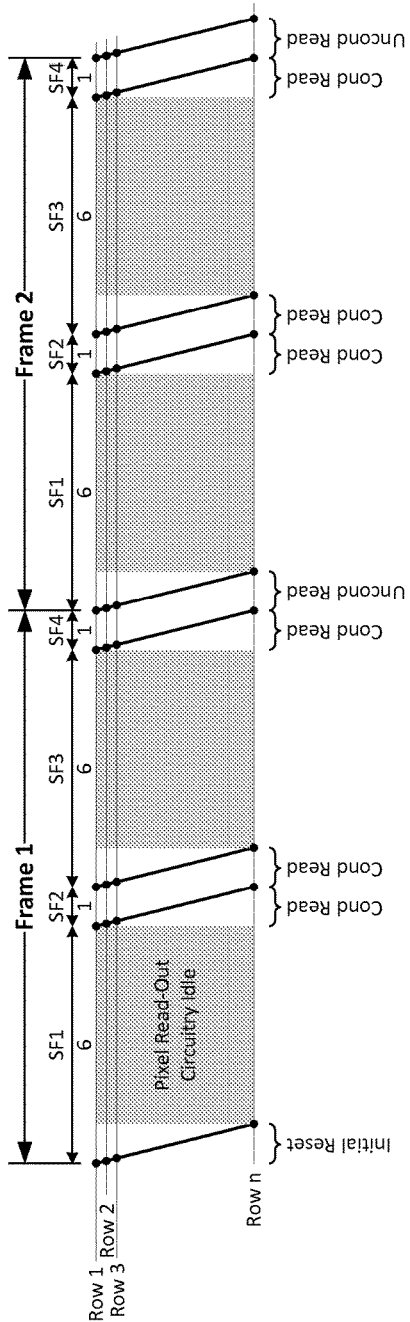
FIG. 25 illustrates an exemplary subframe read-out sequence within a conditional read/reset image sensor.

FIGS. 25-30 illustrate exemplary subframe read-out sequences envisioned for conditional-read sensors. It is noted that because such sensors are generally equipped to also perform unconditional reads, one, several, or all of the conditional reads in a given sequence may be equivalently replaced with an unconditional read. In one such mode, longer subframes can be unconditional and shorter subframes (save for a final subframe) may be conditional. FIG. 25 illustrates an exemplary subframe read-out sequence within a conditional read/reset image sensor. In the arrangement shown, four complete subframes, "SF1" through "SF4" are read-out for each complete exposure interval (i.e., four read-outs per image frame and thus an oversampling factor of four), with two of the subframes exhibiting relatively long shutter times (i.e., subframe exposure intervals—time between initial reset and first conditional read-out and thereafter between successive conditional reads or between the last conditional read-out and the unconditional read that marks the overarching frame time) and two exhibiting relatively short exposure intervals. More specifically, each of the long subframes, SF1 and SF3, is six times the duration of either short subframe (SF2 and SF4), thus establishing a 6-1-6-1 subframe duration/subframe read-out pattern.

The shortest-duration subframe in a given read-out pattern is referred to herein as a "unit subframe" or (USF) and, in the embodiment of FIG. 25 at least, establishes the rolling shutter interval—the time available for the read-out circuitry to scan through the entire pixel array before returning for a successive read-out within a given pixel row and thus the amount of time available for execution of an individual pixel row read-out (i.e., rolling shutter interval divided by number of pixel rows). As can be seen, because the read-out circuitry is designed to scan the entire pixel array within the unit-subframe interval, the read-out circuitry completes the longer 6-USF subframe read-outs with time to spare and is thus idle for a substantial period of time per image frame as shown by the shaded intervals. While the arrangement shown in FIG. 25 may be suitable for some imaging applications, as the unit subframe shrinks (i.e., ratio of long-to-short subframe durations is increased, for example, to improve dynamic range) the corresponding increase in read-out circuitry speed approaches practical limits in terms of power and clock rate, while at the same time increasing the per-frame idle time of the read-out circuitry.

Figure 26:
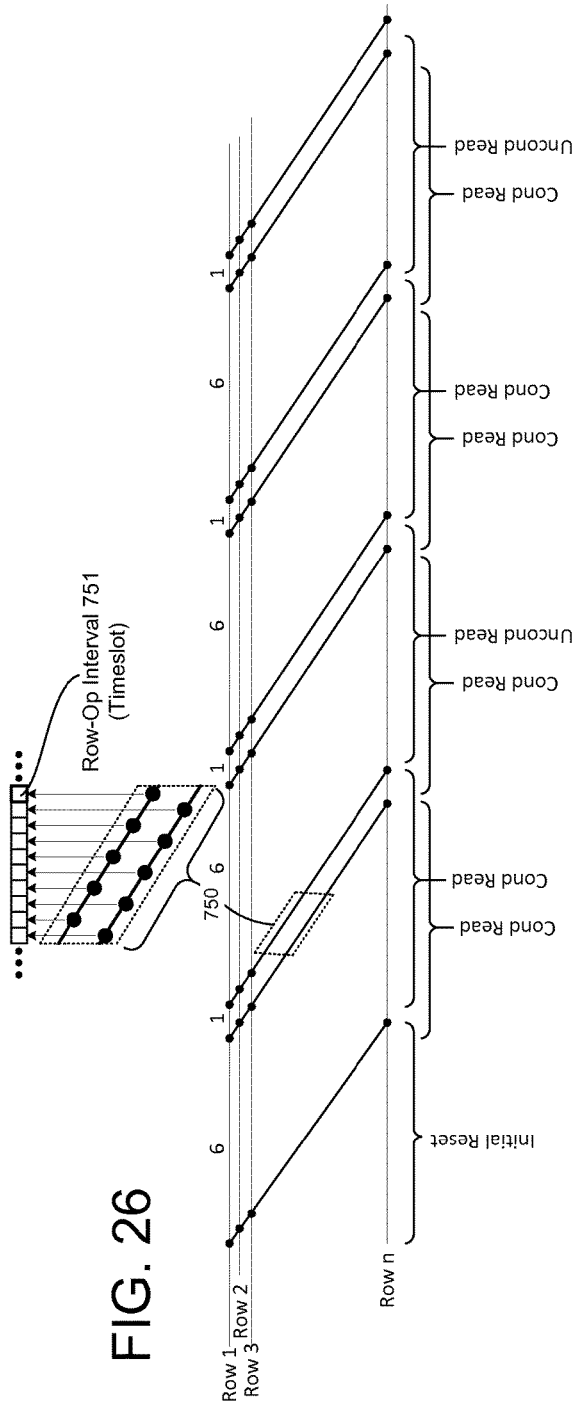
FIG. 26 illustrates an alternative read-out approach that expands the sub-frame read-out time and smoothes (balances) resource utilization across the frame interval.

FIG. 26 illustrates an alternative read-out approach that expands the sub-frame read-out time and smoothes (balances) resource utilization across the frame interval. More specifically, instead of squeezing the complete sensor read-out into a time corresponding to the shortest-duration subframe (i.e., unit subframe), the read-out interval is expanded to use one-half the frame time to perform two of the four subframe reads required per frame, thereby enabling the pixel read-out circuitry to be operated at a reduced rate (and thus with reduced power consumption and/or with higher resolution) in a continuous or near-continuous fashion, instead of the more bursty (i.e., start/stop) approach shown in FIG. 25.

Still referring to FIG. 26, because the expanded subframe read-out time may, in many cases, exceed the shortest-duration subframe, the sensor architecture is modified to permit interleaved read-out operations with respect to temporally adjacent subframes, alternately reading out pixel row data for two or more subframes so that the subframe read-out intervals overlap in time. In the 6-1-6-1 subframe sequence shown, for example, pixel read-out operations alternate between a 6-USF subframe and ensuing unit subframe as shown in detail view 750, thus effecting a concurrent read-out of a two-subframe group.

Continuing with FIG. 26, in a number of embodiments, the frame interval is subdivided into uniform row-operation intervals or row "timeslots" 751 approximately according to the total number of rows in the image sensor and the oversampling factor (i.e., number of subframes) with the timeslots allocated to subframe read-out operations in accordance with a selected subframe pattern. In one implementation, for example, row logic is provided to sequence through row addresses in accordance with a programmed or otherwise selected subframe pattern, thereby initiating a row operation in connection with a subframe read-out during each successive timeslot. As explained below, in some cases one or more timeslots may be allocated to "dummy rows" and thus unused to establish a repeating, deterministic timeslot utilization pattern across subframes and groups of concurrently read-out subframes. Also, to avoid scheduling conflicts, a subframe read-out sequence may be shifted by one or more timeslots in a manner that causes the actual subframe duration to deviate slightly from the nominal (i.e., ideal or desired) subframe duration.

Figure 27:
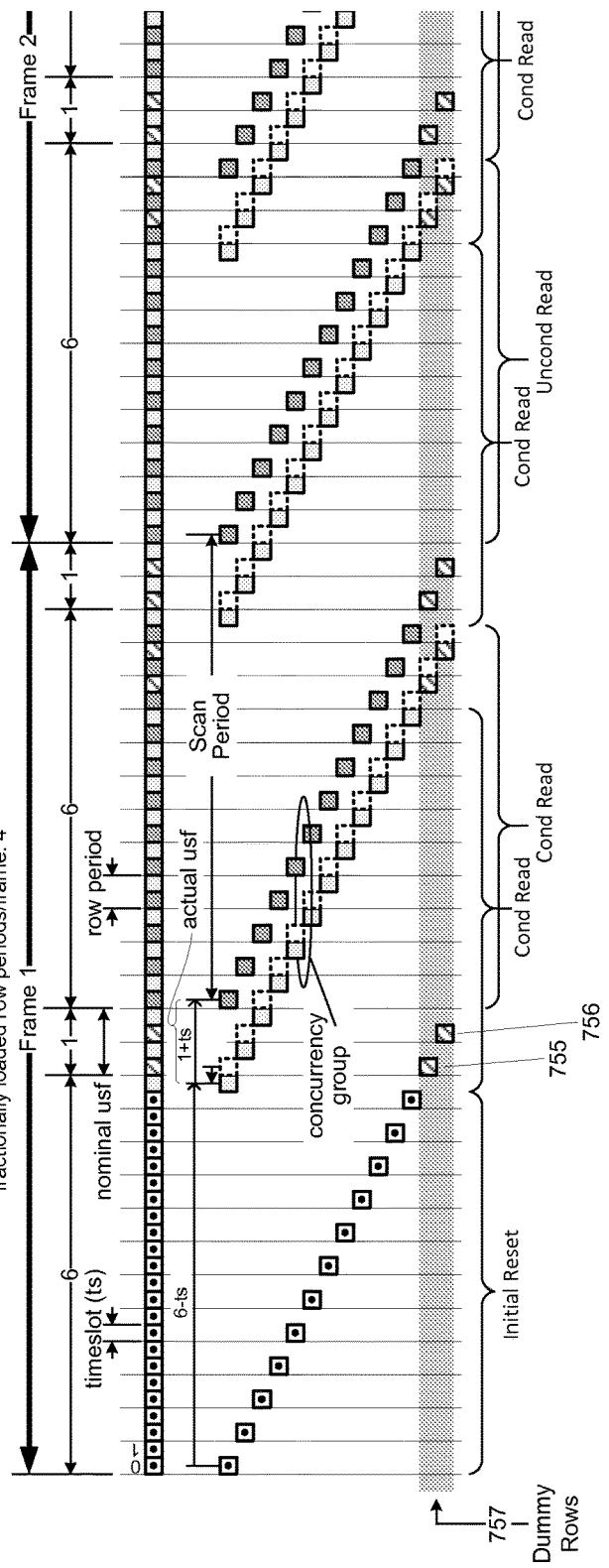
FIG. 27 illustrates an exemplary 6-1-6-1 subframe read-out in greater detail, showing timeslot utilization within an image sensor embodiment having a 12-row pixel array.

FIG. 27 illustrates an exemplary 6-1-6-1 subframe read-out in greater detail, showing timeslot utilization within an image sensor embodiment having a 12-row pixel array. In actual embodiments, the image sensor will generally have several thousand (or more) pixel rows, but will operate on similar principles. For purposes of explanation, image frame 1 ("Frame 1") is assumed to begin with an initial reset of the image sensor, while pixel reset is effected automatically for subsequent frames by an unconditional subframe read-out that concludes the preceding frame. As shown, the overall frame interval (or total exposure interval) spans a total of fourteen unit subframes (i.e., per the 6-1-6-1 subframe durations) with each long (6 USF) and short (1 USF) subframe pair being read-out concurrently over a respective half-frame interval. Thus, the total scan period (or scan duration) for a given subframe is seven unit-subframes (i.e., total USFs per frame (14) divided by number of grouped-subframe read-outs (2)), and a total of two dummy rows is assumed so that a virtual two-subframe-readout concurrency is maintained following the initial reset operation. More specifically, to maximize concurrency throughout a given frame interval (and subsequent frame intervals), the total number of row operations per scan period (i.e., timeslots) is set to the scan duration in unit subframes multiplied by the subframe interleave depth (or pipeline depth, which corresponds to the number of concurrently read-out subframes) or, in this case, 7*2=14. Unused timeslots that result when the quantity of available timeslots exceeds the number required to read-out a given subframe (i.e., as in the two such timeslots 755 and 756 shown in this example) are referred to herein as empty timeslots and be viewed from the perspective of the row sequencing logic as being allocated to dummy rows 757.

Continuing with FIG. 27, the time interval between successive read-out operations within the same subframe is referred to herein as the "row period" and the number of time slots per row period corresponds to the interleave depth or pipeline depth of the subframe read-out sequence. The product of the pipeline depth and concurrency-group count (i.e., number of instances of concurrent-subframe read-outs) defines the number of timeslots per unit subframe (2×2=4 in this example) and the read-group count also defines the number of row periods per unit subframe (i.e., 2 row periods per unit subframe in this example). Row periods in which less than all available timeslots are allocated to row operations are referred to as fractionally loaded row periods, and those in which no row operations are performed are referred to as empty row periods. In the 6-1-6-1 example shown, there are two fractionally loaded row periods per concurrent subframe read-out and thus four fractionally loaded row periods per frame. As explained below, empty row periods are generally employed to shrink the duration of a subframe below the available time for light collection and thus correspond to unused light-collection time ("dead time" within the pixel array. There is no dead time in the exemplary 6-1-6-1 subframe sequence.

Still referring to FIG. 27, assuming that a uniform exposure period is to apply for each pixel row read-out in a given subframe, the division of each row interval into two timeslots (designated '0' and '1', respectively, as shown in the first row period) dictates that the even and odd time slots will be allocated respective subframe read-out operations during a given scan period. Consequently, where the total number of timeslots per scan period is even, it is necessary to shift every other subframe read-out operation from its natural position within an even timeslot to an adjacent odd timeslot as shown by the dashed boxes within the first subframe read-out. That is, instead of conducting the first subframe read-out at the ideal time indicated by the dashed-box timeslots, the first subframe read-out is advanced by one timeslot to effect an odd-timeslot read-out and thus avoid conflict with the ensuing read-out of the second subframe during even-numbered time-slots. One consequence of this time shift is that the actual unit subframe (i.e., duration of the shortest subframe) is lengthened by one time slot relative to the nominal or ideal unit subframe duration and the counterpart long subframe is shortened by one timeslot (note that the timeslot shift may involve a one-timeslot delay of the first subframe read-out instead of the timeslot advance shown). In general this non-ideality is a negligible consequence of the finite timeslot granularity, particularly in view of the relatively large number of rows in production embodiments. For example, in a 3000 row sensor having 3 dummy rows (i.e., for reasons explained above) and a 1/30 second frame interval, 6006 time slots (3003 row periods) transpire per scan period, with 858 of those timeslots (6006*2/14) ideally allocated to the x1 (unit) subframe and 5148 (6006*12/14) allocated to the x6 subframe. In that case, shortening the actual unit subframe duration by one timeslot represents a 0.1% deviation from the nominal unit subframe duration and thus an inconsequential difference between nominal and actual unit subframe durations, particularly as the ratio of subframe exposure intervals themselves tend to be flexible design choices. In any case, it should be kept in mind that the nominal and actual unit subframe durations may vary, and more care may be needed for short frame intervals in the 100ths or 1000ths of a second in duration.

Figure 28A:
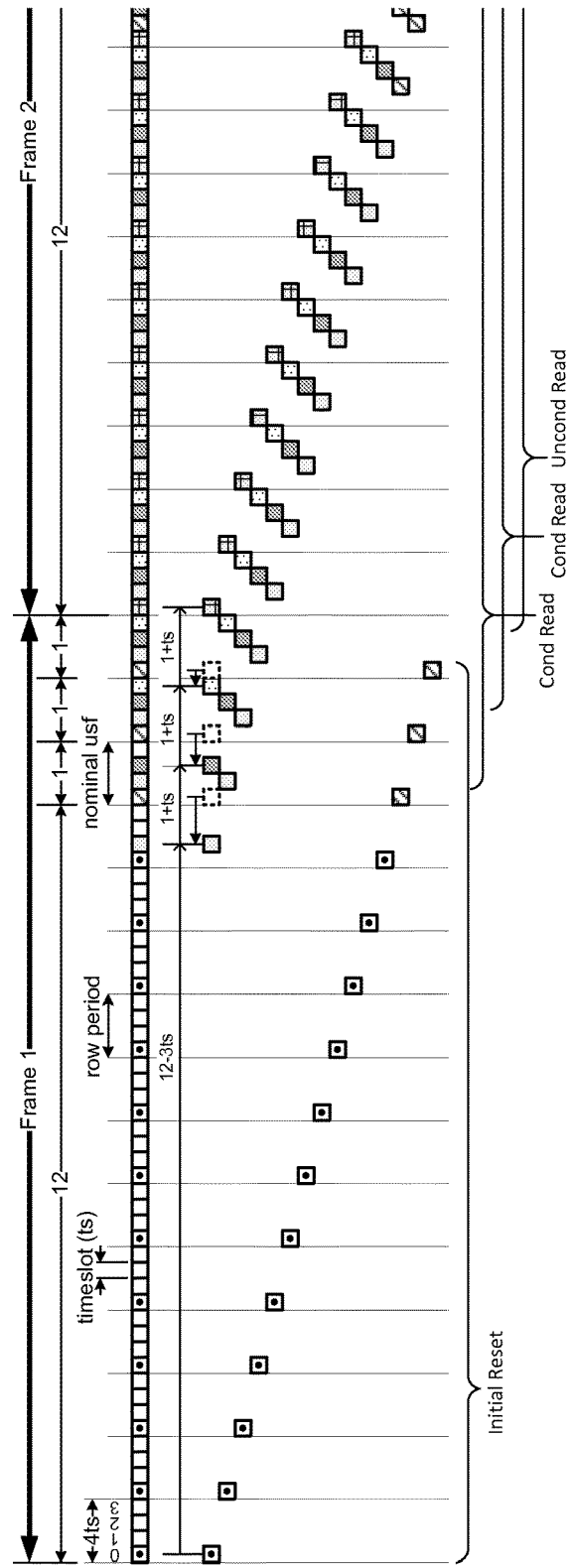
FIG. 28A illustrates an alternative subframe sequence in which a relatively long subframe is followed by a sequence of three relatively short subframes in a 12-1-1-1 pattern

FIG. 28A illustrates an alternative subframe sequence in which a relatively long (12 USF) subframe is followed by a sequence of three unit subframes in a 12-1-1-1 pattern. In this case all four subframes are read out concurrently (i.e., there is only one concurrency group which spans an entire frame interval) so that the pipeline depth and number of timeslots per unit subframe is four. The row period is coextensive with the nominal unit subframe duration by virtue of the solitary read-group. As shown, each of the sub-frame read-outs is shifted to a respective one of the four timeslots per row period, thus effecting an actual unit subframe slightly longer than ideal (1+ts) and a longer subframe slightly shorter than ideal (12−3ts). A total of three dummy rows is assumed by the row sequencing logic (i.e., to establish the number of unit subframes per scan period as an integer number of the row count and thus maximize concurrency as successive image frames are read-out) and thus three fractionally-loaded row periods per frame. There is no dead time in the 12-1-1-1 subframe sequence and thus no empty row periods.

An alternative to adding dummy rows to an interleaved frame sequence and shifting the subframe times away from nominal to remove timing conflicts is to enforce a group of timing constraints on the frame sequence, and then start each subframe in video at the same offset from each frame start. Although the mathematical constraints depend on the specific sequence and number of subframes, an example for "AB-B-B-B" frame sequencing is instructive and similar constraints can be developed for other sequencing families.

Consider the following "AB-B-B-B" timing constraints. $N_{rows}$, numbered 0 to $N_{rows}-1$, are to be sampled four times per frame each, thus a number of timeslots per frame T must be greater than or equal to 4 $N_{rows}$ for a sustained video sequence. For four subframes per frame, this method also requires that T be divisible by 4. Now select exposure parameters A and B in units of timeslots, where: T>= (A+3)*B; B is an odd positive integer (although 1 may not be possible for pipelined readout that takes more than one timeslot); A is an integer that expresses the ratio of the long subexposure duration to the short subexposure durations. Given these parameters, for any row k its assigned timeslots are:

Initial Reset, row $k$: $T-1-(A+3)*B+4k$

First conditional read, row $k$: $T-1-3B+4k$

Second conditional read, row $k$: $T-1-2B+4k$

Third conditional read, row $k$: $T-1-B+4k$

Fourth, unconditional read, row $k$: $T-1+4k$

It is also noted that for the case where T=4 $N_{rows}$= (A+3)*B, each row integrates light for an entire frame and the unconditional read of each frame also accomplishes the unconditional reset of the following frame, and thus no separate explicit resets are required for continuous video operation. If A+3 is not divisible by four, explicit resets can still remain unscheduled by selecting B to get as close to 4 $N_{rows}$ as possible without exceeding, in which case the long subframe will be a few timeslots longer than a perfect A:1 ratio would specify.

FIG. 28B illustrates an A=13, 13-1-1-1 subframe read-out sequence designed according to this methodology. For 20 rows and 80 timeslots, selecting B=5 gives a full-frame integration time for each row with timing of 65-5-5-5. For a real-world example such as a sensor with 3016 rows and 12064 timeslots/frame, selecting B=754 would give a full-frame integration time for each row with timing of 9802-754-754-754, but B is not odd and thus timeslot conflicts would arise. Thus the best "legal" full-frame integration schedule for this sensor would be 9805-753-753-753, which relates to an actual A of 13.02. Alternately, to keep A at exactly 13, one can select a 9789-753-753-753 sequence with explicit resets at timeslot 15 for the first row (and so on) of each frame.

For exposures that are shorter than a full frame time, the methodology can also give a schedule that utilizes all timeslots. FIG. 28C illustrates another A=13, 13-1-1-1 subframe read-out sequence for 20 rows and 80 timeslots. In FIG. 28C, however, B=3 is selected to give a shorter exposure, and each row has a timing of 39-3-3-3. Since a reset occurs at timeslot 31 for row 0, dead time occupies 40% of each frame. In the 3016 row sensor example, 375 possible sequences exist from the odd B values from B=753 down to B=3. For B=753 equating to an exposure time of $\frac{1}{30}^{th}$ of a second, B=3 equates to an exposure time of $\frac{1}{7530}^{th}$ of a second, thus the configurable 13-1-1-1 policies range across 9 stops of exposure range.

Using the same methodology, FIG. 28D shows another scheduling solution for 20 rows and 80 timeslots, this time for A=5 and a 5-1-1-1 policy. In this case, the longest 5-1-1-1 policy attainable within 80 timeslots is 45-9-9-9 with B=9, occupying a 72 out of 80 timeslot integration time, for 90% light collection. In the 3016 row sensor example, an equivalent policy would be 7535-1507-1507-1507, with 99.93% light collection, or 7543-1507-1507-1507, with 100% light collection and an actual A value of 5.005.

From these examples, it is apparent that other similar interleaved policy solutions are also possible, e.g., with AB-B-B policies or AB-B policies with different response curves. These examples thus show that with a large number of rows and careful selection, a large family of interleaved subexposure policies exist that fully utilize the timeslots available and allow a large range of exposure and/or dynamic range options.

Figure 29:
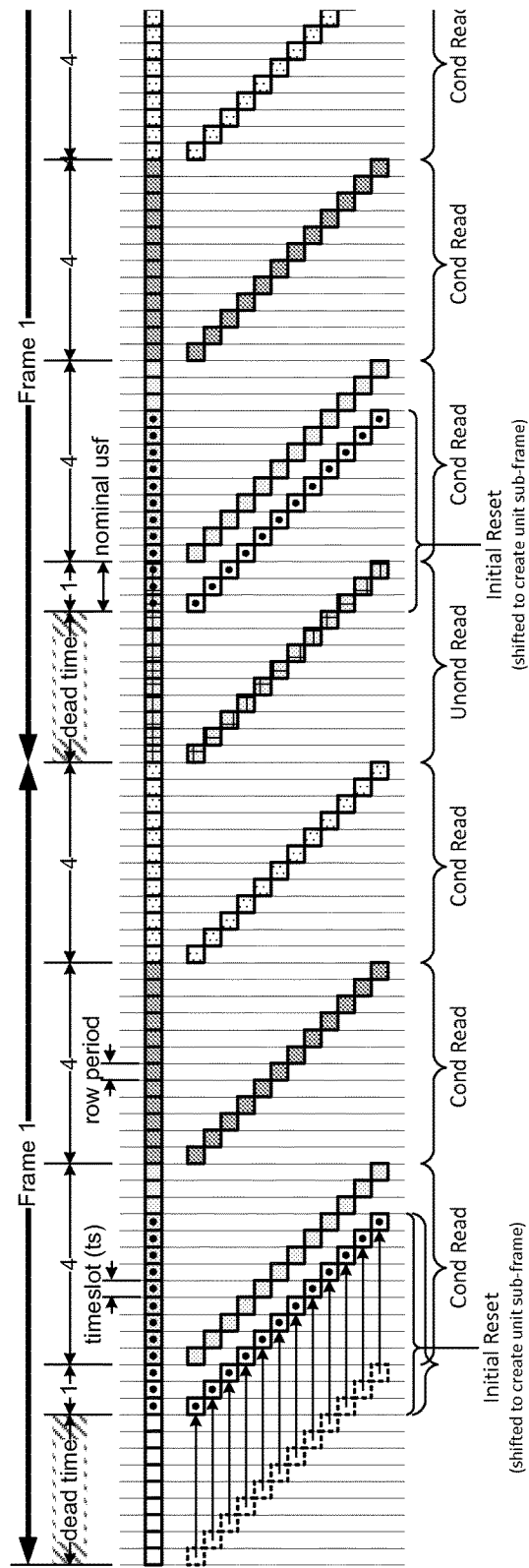
FIG. 29 illustrates a 1-4-4-4 subframe read-out sequence that, at least in terms of subframe read-out concurrency, represents the inverse of the 12-1-1-1 subframe sequence of FIG. 28A.

FIG. 29 illustrates a 1-4-4-4 subframe read-out sequence that, at least in terms of subframe read-out concurrency, represents the inverse of the 12-1-1-1 subframe sequence of FIG. 28A. More specifically, while all four subframes are read-out concurrently in the 12-1-1-1 sequence and the total subframe scan duration spans the entire frame interval, no subframe read-out concurrency occurs in the 1-4-4-4 sequence and the scan duration is one-fourth of the overall frame interval—the fastest possible scan duration in a four-subframe sequence in which the number of timeslots per frame is limited to the total number of pixel row read-out operations required (i.e., 4*12=48 timeslots in this example). As shown, no dummy rows (and thus no fractionally-loaded row periods) are required as the scan duration in unit subframes (4) is an integer multiple of the physical row count (12). Three row periods transpire per unit subframe—the ratio of the row count to the subframe scan period.

Still referring to FIG. 29, the shortest subframe (i.e., the unit subframe) is effected by creating dead time within what would otherwise be a 4-USF subframe. That is, instead of executing pixel reset operations at the start of the frame interval at the dashed-box timeslots shown, the reset operations are delayed by three of the four allocated unit subframes, thus effecting a one USF subframe interval. Note that pixel reset operations (denoted by center-dotted timeslots) are executed concurrently with read-out of the first subframe with read-out and reset operations being executed in the same timeslot with a three row lag (i.e., reading the first pixel row and resetting the third pixel row reset in the same timeslot, reading the second pixel row and resetting the fourth pixel row in the same timeslot, and so forth). In general, explicit reset operations and unconditional or conditional read-out operations within respective rows may be executed in the same timeslot without conflict as no data is transferred to the column output line (i.e., "data out" line) during reset operations. For described embodiments with a conditional read operation having an unconditional partial charge transfer operation applied to all columns, the parallel unconditional reset operation in a second row can be piggybacked on the unconditional partial charge transfer operation. Note that pixel reset operations are distinguished in this context from conditional read/reset operations with the latter outputting one or more pixel state signals onto the column output line.

Figure 30:
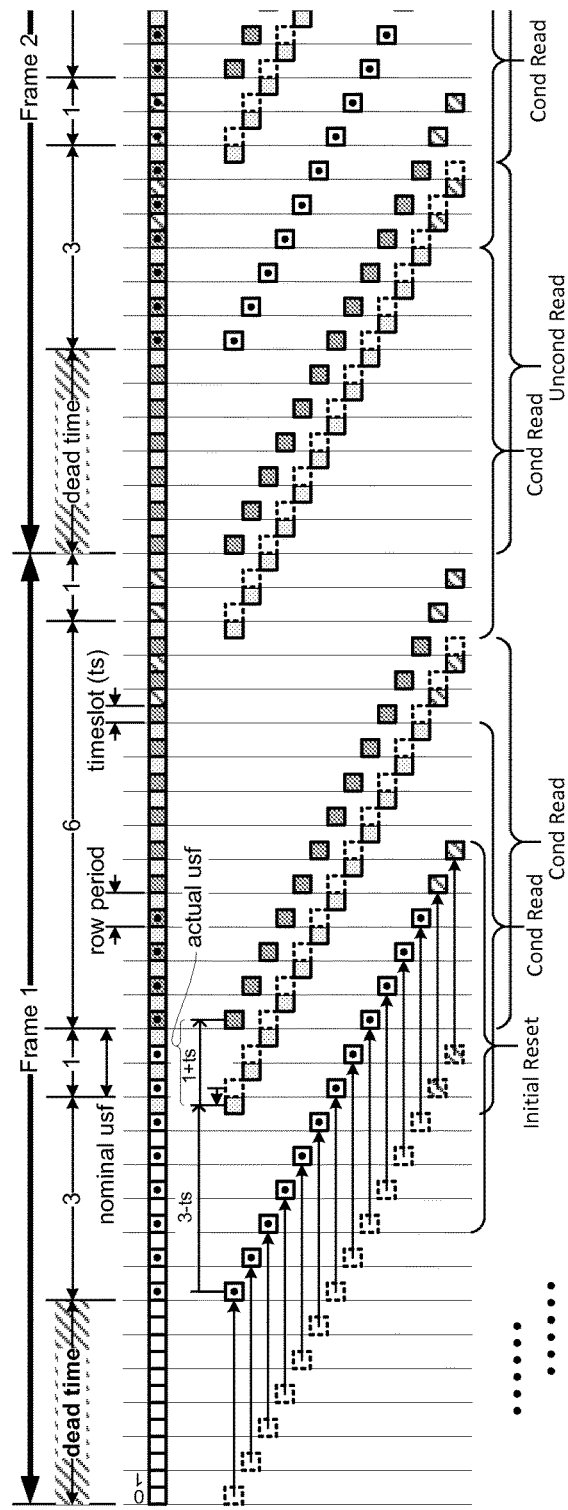
FIG. 30 illustrates another dead-time subframe read-out sequence, in this case having a 3-1-6-1 pattern.

FIG. 30 illustrates another dead-time subframe read-out sequence, in this case having a 3-1-6-1 pattern. As can be appreciated by comparing FIGS. 30 and 27, the 3-1-6-1 subframe sequence is similar to the 6-1-6-1 subframe sequence (i.e., same USF/frame count, subframe scan period, row period, pipeline depth, and fractionally loaded row periods) but with dead-time added to create the initial 3-USF subframe. That is, the initial reset operation (and reset operations that follow unconditional read-out operations thereafter) is delayed by three unit subframes (six row periods and thus 12 timeslots) to shorten the initial 6-USF interval to a 3-USF subframe.

FIG. 31A illustrates an embodiment of a row logic circuit 780 that may be used to establish a wide variety of run-time and/or production-time selectable subframe sequences including, without limitation, those depicted in FIGS. 27-30. As shown, row logic 780 includes a row sequence controller 781, read-address decoder 783, reset-address decoder 785, and a set of n row line drivers 787, one for each row of pixels or pixel groups in the pixel array. In one embodiment, row sequence controller 781 includes a sequence definition memory 790 that has been pre-loaded or programmed at run-time with address sequencing information including, for example, tabulated address values and/or information that enables algorithmic generation of addresses. Logic circuitry with the row sequence controller applies the contents of the sequence definition memory to generate, during each of a fixed or programmably controlled number of timeslots per frame interval, a read address value (Rd Addr), reset address value (Rst Addr) and read type (Rd Type). In one embodiment, for example, for each time slot in which a read-out operation is to be executed with respect to a given pixel row, row sequence controller 781 outputs a read address corresponding to that pixel row and a read-type signal that indicates whether a conditional or unconditional read is to be executed, the latter being supplied in common to read-type inputs ("rt") of individual line row line drivers 787. As shown, the read address is supplied to read address decoder 783, which performs a decoding operation to assert a read-enable signal to the read input ("rd") of the address-specified one of row line drivers 787, thereby enabling a conditional or unconditional read operation to be carried out by that row line driver (and thus with regard to a specified pixel row), in accordance with the read-type signal from the row sequence controller.

To suppress read-enable assertion (i.e., during a timeslot in which no read-out is to be performed as in the case of a timeslot corresponding to a dummy row or that occurs during a dead-time interval), the row sequence controller may output a reserved "no-op" address value, or may output a dedicated control signal to suppress/enable row read-out operations (not specifically shown). Note that in the case of bin-enabled pixel groups, each row line driver 787 may output multiple TGr signals (e.g., TGr1-TGr4 for the 4×1 quad pixel group discussed above) in which case row address decoder 783 may output multiple read-enable signals to enable any one or more of the TGr signals to be asserted, thus enabling either un-binned or binned read-outs in accordance with mode control signals from other logic circuitry within the image sensor.

Still referring to FIG. 31A, reset operations are controlled (sequenced) in generally the same manner as read-out operations, with row sequence controller 781 outputting a valid reset address to reset address decoder 785 during each timeslot in which a reset operation is to be performed (which, as discussed above, may also be a timeslot in which a read-out operation is to be performed), and either a dedicated control signal (e.g., a "reset-enable" signal, not shown) or a reserved, not-to-be-decoded reset address value to indicate timeslots in which no reset operation is to be performed. Like read address decoder 783, reset address decoder 785 decodes incoming reset address values (i.e., those other than reserved address values or those accompanied by an asserted reset-enable signal) to assert a reset signal at the input of a reset-address-specified one of row line drivers 787.

In general, each row line driver 787 responds to incoming reset-enable, read-enable and read-type signals to raise RG, RS and one or more TGr signals in accordance with the read-out and reset sequences described above. Though not specifically shown, additional control signals may be provided row line drivers 787 to enable selection between different TGr potentials (e.g., $VTG_{partial}$, $VTG_{full}$ as shown in FIGS. 2 and 18A) and/or pulse widths (e.g., as shown in FIG. 13) during the threshold-testing (partial-read) and conditional read-out phases of a conditional read/reset operation.

Though not specifically shown in FIG. 31A, row sequence controller 781 may receive a row clock signal (e.g., from read-out control circuitry or other control logic) that defines, by itself or in combination with one or more programmed settings, the above-described timeslots in which row operations are carried out. For example, in one embodiment, the row clock signal period (which itself may be programmable within other image-sensor logic circuitry) defines the timeslot duration, with each rising and/or falling clock edge marking the start of a new timeslot. In another embodiment, the row clock signal may oscillate at a sufficiently high frequency to enable a programmable-counter-defined timeslot interval, thus enabling a given frame interval (e.g., $\frac{1}{30}^{th}$ second) to be divided into a programmable number of timeslots. For example, a counter circuit may be programmed with a terminal count value (or initial starting value in a down-count implementation) that yields a terminal-count "timeslot" pulse at desired intervals (e.g., in accordance with the number of physical rows, dummy rows, frame interval, subframe count, etc.), thereby establishing a programmable timeslot according to a selected subframe sequence.

FIG. 31B illustrates another embodiment of a row logic circuit 795 that may be used to establish a wide variety of subframe sequences including, without limitation, those depicted in FIGS. 27-30. Instead of address decoders as in the embodiment of FIG. 31A, a shift register bank is used to track row operations. In the particular example shown, for instance, five shift registers, one each for subframes SF1 to SF4 (803, 804, 805 and 806) and one for unconditional row reset (807), are operated by a row sequence controller 797. Each shift register is loaded with one, or possible two (for binning) "1" logic values, which are loaded to a register location corresponding to the top (first) row of the pixel array in response to a reset signal (Reset), with all other register locations loaded with "0" logic values. Upon receiving a shift signal (Shift), a particular register's contents are shifted down by a row. Upon receiving an enable signal (Enable), a particular register drives its contents to the row drivers 787, thus enabling row operations to be carried out within the row driver(s) for the row(s) associated with the shift register "1" location(s). The subframe shift register outputs may be connected in a wired-or configuration, since the row sequence controller will only enable one at a time.

In one embodiment, row sequence controller 797 stores start/stop timestamps within a timestamp storage element 798 for each shift register 803-807 to control the operation of subframe sequencing. A bank of comparators 799 compares the output of a frame timestamp clock 801 to the stored timestamps to properly time each shift register. Additional logic (not shown) defines how many subframes are active, whether reset is active, and the exact timing of enable signal assertion according to timeslot sub-clocking.

FIGS. 32A-32C illustrate alternative parameter loading operations with respect to the sequence definition memory 790 of FIG. 31A. In the arrangement shown in FIG. 32A, an application processor 815 (e.g., corresponding to application processor 273 or image processor 243 of FIG. 8) loads a set of row-sequence generation parameters into sequence definition memory 790 to enable row sequence controller (i.e., element 781 of FIG. 31A) to synthesize reset and read-out addresses in accordance with a desired subframe read-out sequence. By contrast, in the arrangement of FIG. 32B, a tabulated set of read-out and reset addresses is loaded into sequence definition memory 790 and thereafter read-out by (and output from) the row sequence controller in a sequence of table lookup operations. The tabulated set of read-out and reset addresses may be generated by application processor 815 (e.g., using sequence generation parameters similar to those loaded into the sequence definition memory in the algorithmic address generation arrangement of FIG. 32A) or may itself be supplied from a pre-loaded source (e.g., loaded into a discrete non-volatile memory or on-processor non-volatile memory during device production or run-time docking). FIG. 32C illustrates a hybrid of the fully algorithmic and fully tabulated sequence definition approaches of FIGS. 32A and 32B. That is, application processor 815 loads a partial row-sequence tabulation into sequence definition memory 790 together with table expansion parameters that enable algorithmic expansion of the partial read-out/reset address tabulation into a complete sequence of read-out and reset addresses. For example, a sequence of read-out addresses to be output in successive time slots may be specified by tabulation of an initial address together with run-length information that indicates the number of sequential addresses to be generated thereafter.

To implement the row address sequencer as a state machine on a sensor chip or an accompanying ASIC or FPGA, it is helpful to have an algorithm that needs only to know the current row and its internal state to derive the next row address. In one embodiment such a state machine reads each row address consecutively from a memory where a pre-calculated row address sequence has been stored. This method requires however a significant amount of memory. It will also take considerable time to store a new table in the memory if the policy is changed. An alternative algorithm directly calculates each row address in sequence. Such an algorithm has an initialization part which has the more complex calculations that are executed to set up the address generation based on the policy and exposure time and a part that is stepping through the exposures. In one embodiment, the complex set-up calculations are implemented by software execution within the chip controlling the image sensor and the step-through operation are implemented in a state machine on the sensor itself.

An exemplary set of variables that are used in the address sequencing state machine are listed in the tables I-III below. The variables in Table I are generated at each row time. They are the row address to be read, the row address to be reset and the subframe of the row address to be read. The subframe is only input to the reconstruction circuit and can be omitted if that circuit is not on the sensor but implanted in downstream processing. The row addresses for read and initialization are input both to the row control circuits and the reconstruction circuit. If initialization is implemented off-sensor, the variables of Table III need to be transferred to the sensor before starting taking exposures with a given policy. If initialization is implemented on-sensor, then only the duration of the sample intervals and the ratio of the exposure time to the frame time need to be sent to the sensor. The number of groups can be sent in addition if fewer groups than the minimum necessary by the policy are going to be used.

TABLE I

Generated state machine output

| Variable | Comment |
| --- | --- |
| $a_{rd}$ | Row address for read at current row time |
| $f_{rd}$ | Subframe for read at current row time |
| $a_{init}$ | Row address for initial reset at current row time |

TABLE II

Initialization only state machine variables

| Variable | Comment |
| --- | --- |
| s | Array with sampling durations |
| $\sum_{i=1}^{N/g} d_i$ | Duration of sub-sequence ($d_i$ is the duration of an interval of the repeated subsequence, see Equation (2)) |
| g | Number of equal groups |
| $r_{vb}$ | Row times for vertical blanking |
| $\rho_{fe}$ | Ratio frame time to exposure time |

TABLE III

Runtime state machine variables

| Variable | Comment |
| --- | --- |
| N | Number of sampling intervals |
| $\delta_s = \frac{N}{g}$ | Slot offset between the same subframe of consecutive rows for interleaving |
| $\delta_r$ | Offset to next row of subframe read other than first |
| $\delta_i$ | Row to start with at first subframe read |
| $n_{rows}{}^0$ | Number of rows for which addresses need to be generated |
| $n_{rows}$ | Number of rows after adding the necessary dummy rows |
| $n_{ro} = n_{rows} \cdot \frac{N}{g}$ | Storage to avoid multiplication and division during run |

TABLE III-continued

Runtime state machine variables

| Variable | Comment |
| --- | --- |
| $n_{rN} = n_{rows} \cdot N$ | Storage to avoid multiplication during run |
| $b_i$ | Subframe of position i in slot |
| k | Counter, reset at frame start |
| $k_1$ | Counter, reset at group start |
| $k_i$ | Counter used for pixel reset, reset at frame start |
| $k_i{}^0$ | Initialization value of counter $k_i$ |
| i | Row address slot counter, reset at group start |
| r | Row address to be calculated |
| j | Current position in slot |
| $a_{rstbuf}$ | Buffer to shift address to be reset by one row time |

If an exposure time shorter than the frame time is required, then the sampling interval duration used in the following initialization steps is adjusted according to Equation (1).

$$s_1 = (\rho_{fe} - 1)\sum_{i=1}^{N} s_i + s_1 \quad (1)$$

Next the number of identical sub-sequences is determined. Equation (2) shows the sequence of sample interval durations where a group repeats itself except for the first interval of the first group which can be shorter since the initial reset can be moved closer to the first read while preserving the capability to do conditional resets throughout the frame.

$$s = \hat{d}_1, d_2, \cdots, d_{\frac{N}{g}}, d_1, d_2, \cdots, d_{\frac{N}{g}}, \cdots, d_1, d_2, \cdots, d_{\frac{N}{g}} \quad (2)$$

Then dummy rows are added so that with positive integer p $$n_{rows} = p \sum_{i=1}^{\frac{N}{g}} d_i \quad (3)$$

Dummy rows for vertical blanking are added in integer multiples of the total subsequence duration as well to not violate Equation (3). The row and initial offsets are calculated using $$\delta_{r_k} = g\left(\sum_{j=1}^{\frac{N}{g}} d_j - \sum_{j=1}^{k} d_j\right) \forall k \in \left[1 \cdots \frac{N}{g}\right] \quad (4)$$

$$\delta_i = \frac{n_{rows}(d_1 - \hat{d}_1)}{\sum_{j=1}^{\frac{N}{g}} d_j} \quad (5)$$

The list of subframe indices per slot becomes $$b = N, N - \delta_s + 1, \ldots, N - 1 \quad (6)$$

The initialization value for the reset counter is set depending on the ratio of the frame time to the exposure time $$k_i^0 = \begin{cases} 0, & \rho_{fe} = 1 \\ \dfrac{n_{rows}}{\rho_{fe}}, & \rho_{fe} > 1 \end{cases} \quad (7)$$

Finally the counters are initialized and the output variables are set to $a_{not}$ a value that flags no activity, e.g. all bits set.

$k=0$ $k_1=0$ $m=0$ $a_{rd} = a_{not}$ $a_{init} = a_{not}$ $a_{rstbuf} = a_{not}$ \hfill (8)

While the initialization routine has the complex calculations outlined above, the runtime address generation is possible using only additions, shifts and conditional decisions. The pseudo-code sequence below shows the calculations and assignments that are done at the beginning of each row time to generate the next row address and initial reset address. The code assumes valid row addresses between 0 and $n_{rows}^0 - 1$.

```
1       a_init = a_rstbuf
2       if (k_1 = 0) {i = δ_i}
3       if (j = 0) {
4           r = i
5           i = i + 1
6           if (i = n_rows) {i = 0}
7       }
8       else {
9           r = i + δ_{rj-1}
10          if (r ≥ n_rows) {r = r - n_rows}
11      }
        k = k + 1
        k_1 = k_1 + 1
        if (k_1 = n_ro) {k_1 = 0}
        f_rd = b_j
12      if (r = n_rows^0 - 1) {
13          if (b_j > N - δ_s) {
14              if (j > 0) {
15                  b_j = j - 1
16              }
17              else {
18                  b_j = δ_s - 1
19              }
20          }
21          else {
22              b_j = b_j + 1
23          }
24      }
25      if (r < n_rows^0) {
26          a_rd = r
27          if (δ_s = 1) {
                Comment: subscript is bitindex
28
29              a_rd,2 = r_0
30              a_rd,1 = r_2
31              a_rd,0 = r_1
32          }
33      }
34      else {
35          a_rd = a_not
36      }
37      if ((j = 0)&(k ≤ n_ro)) {
38          if (k_i < n_rows^0) {
39              r = k_i
40              if (δ_s = 1) {
41                  Comment: subscript is bitindex
42                  r_2 = k_{i,0}
43                  r_1 = k_{i,2}
44                  r_0 = k_{i,1}
45              }
46              a_rstbuf = r
47          }
48          else {
49              a_rstbuf = a_not
50          }
51          k_i = k_i + 1
52          if (k_i ≥ n_rows) {k_i = k_i - n_rows}
53      }
54      else {
55          a_rstbuf = a_not
56      }
        j = j + 1
57      if (j = δ_s) {j = 0}
58      if (k = n_rN) {
59          k = 0
60          k_1 = 0
61          k_i = k_i^0
62          j = 0
63      }
```

Subframe Sequence Design for Reduced Data Storage

Figure 33A:
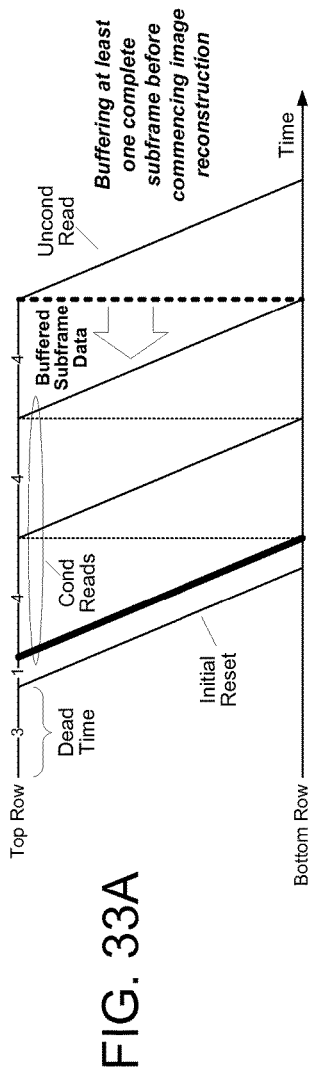
FIGS. 33A-33C contrast exemplary subframe sequences in which read-out operations are spread relatively evenly over a frame interval, front-loaded and back-loaded, respectively.
Figure 33B:
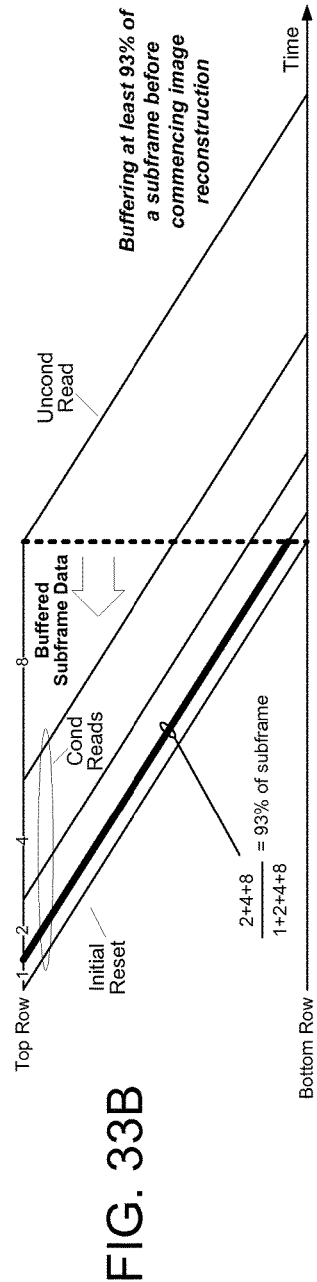
Figure 33C:
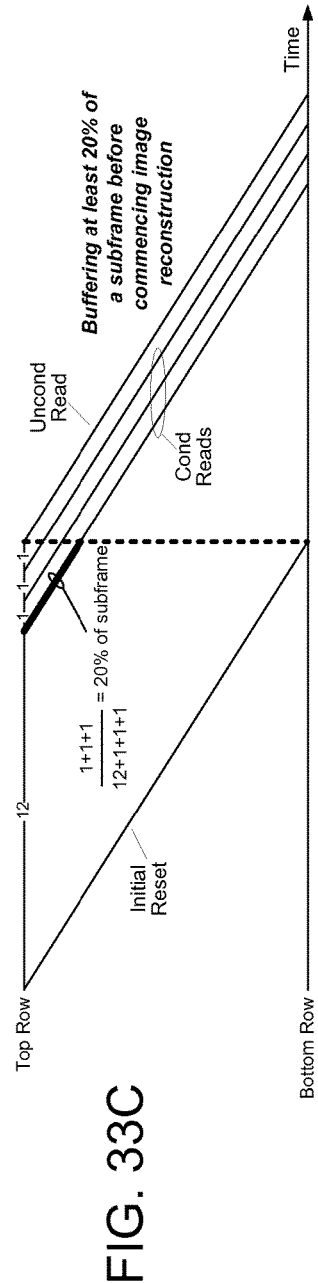

In a number of embodiments, subframe sequences are specifically tailored to reduce subframe data storage requirements and facilitate image reconstruction. More specifically, by patterning subframe intervals such that read-out operations are bunched in the latter part of the frame interval (i.e., back-loaded) and include concurrent read-out of two or more subframes having matching exposure intervals, it becomes possible to significantly reduce subframe data buffering needed for image reconstruction. FIGS. 33A-33C illustrate such sequence design considerations by contrasting exemplary subframes sequences in which read-out operations are spread relatively evenly over a frame interval, front-loaded and back-loaded, respectively. More specifically, in the 1-4-4-4 subframe sequence of FIG. 33A, conditional reads are distributed evenly over the frame interval, with three complete subframe read-outs being completed by the conclusion of the frame interval, and the fourth subframe readout extending into the subsequent frame interval. In an embodiment in which subframes having matching exposure intervals are combined on the fly (e.g., through unweighted summation into a buffer having sufficient bit-depth to contain the sum) and in which subframes having non-matching exposure intervals are separately buffered, the 1-4-4-4 sequence requires two full subframes of image data to be buffered in order to support image reconstruction when the final subframe is read-out: one buffer for the 1-USF subframe and another buffer for the two 4-USF subframes that precede final subframe read-out. In the case of an exemplary 3000 row by 4000 column pixel array in which the bit-depth for each pixel read-out is 12 bits, 144 Mb (3000*4000*12 bits) of storage are required per subframe, and thus 288 Mb of image buffering for two subframes and 300 Mb, when an additional bit is added to enable summation of the two 4-USF subframes without overflow. Even if logic is provided to merge all three of the first three frames, at least one subframe worth of data (with enhanced bit-depth to support the subframe data combination) is required—a buffer size that may be too large for integrated implementation within the sensor IC, thus necessitating a transmission of multiple subframes of data to off-chip reconstruction logic (e.g., image processor IC 243 as shown in FIG. 8).

The 1-2-4-8 subframe sequence of FIG. 33B similarly requires the predominant share of at least one subframe of image data to be buffered, as approximately 93% of the first subframe (i.e., the unit subframe) is read out completely before final subframe read-out commences. In the absence of logic for weighted combination of the first three subframes (i.e., to account for their varying light collection intervals), buffering and/or transmission of image data from the entirety first subframe, buffering of most of the second subframe and the better part of the third subframe data is needed as can be seen from the vertical dashed line that marks commencement of the final subframe read-out.

Turning now to the 12-1-1-1 subframe sequence of FIG. 33C, it can be seen that, by deferring the initial subframe read-out to a time near the end of the frame (i.e., starting with the long, 12-USF subframe), a much smaller portion of the total frame time transpires between the start of the first subframe read-out and the final subframe read-out. In the subframe sequence shown, for example, the time between initial subframe read-out and final subframe read-out amounts to 20% of the frame time (1+1+1/(12+1+1+1)), as compared to 100% and 93% of the frame time in the subframe sequences of FIGS. 33A and 33B, respectively. Where read-out operations are distributed evenly across the frame interval as in the embodiments described in reference to FIGS. 26-30, this shortened time between initial and final subframe read-out translates to correspondingly reduced buffering requirements as only 20% of the initial subframe need be buffered (a 5-fold reduction in buffer size relative to the FIG. 33A sequence). Further, because the final three unit subframe read-outs (i.e., the 1-1-1) have uniform durations (i.e., each is a unit subframe), those read-outs may be readily combined through simple, unweighted summation in a case where reconstruction at a pixel does not begin until pixel data for all subframes has been received. In such a case, only 0.33 subframes of storage is required, as compared to 2.26 subframes for the 1-2-4-8 sequence or 3 subframes for the 1-4-4-4 sequence. Note also that 0.33 subframes is a worst case where the overall integration time is matched to the rolling rate—for shorter exposures at the same rolling rate, less memory is required.

FIG. 34A illustrates an embodiment of a buffering circuit 820 that may be used to reconstruct an image frame from the 12-1-1-1 subframe sequence of FIG. 33C with only partial subframe buffering. For purposes of example, a 3000 row image sensor is assumed so that 200 rows of the initial subframe are read-out before second subframe read-out commences (i.e., 3000*USF/total USFs per scan period and thus 3000/15). Similarly, 200 rows of the second subframe are read-out before third subframe read-out commences and 200 rows of the third subframe are read-out before final subframe read-out commences. Thus, a total of 600 rows of the first subframe (20% of 3000 rows) are read-out before final subframe read-out commences so that at least 600 rows of read-out data need to be buffered before complete pixel data reconstruction (i.e., compositing data from all four subframes) begins.

Conceptually, multi-subframe data buffering may be viewed as shifting data from the initial subframe through a 600-row-element shift register formed by component 200-row-element shift registers 823, 825 and 827, with data from subsequent subframes merged with previously buffered data at respective points within the shift pipeline according to the subframe-to-subframe row offset (i.e., time lag). Thus, in the exemplary embodiment shown, data from the four concurrent sub-frame row read-outs (i.e., interleaved read-out of subframes SF1-SF4) is routed by demultiplexer 821 to one of four subframe-specific row entry points within or at the end of the shift register. More specifically, read-out data from the first sub-frame row ($Data_{SF1}$) is shifted into the front-end of the component shift register 823, while data from the second subframe row ($Data_{SF2}$) is summed with same-row, column data from the first subframe (i.e., data output from the $200^{th}$ row storage element of shift register element 823 that was initially inserted into shift register 823 two-hundred row read-out operations prior) in adder 824 and inserted into the initial row storage element of component shift register 825 (i.e., the $201^{st}$ shift register row storage element in the overall 600-row-element pipeline), thus merging the subframe data from the two read-outs. Similarly, data from the third subframe row ($Data_{SF3}$) is summed with same-row, column data from the first and second subframes (i.e., data output from the $200^{th}$ row storage element of shift register 825 and thus the $400^{th}$ row element in the overall pipeline) in adder 826, and data from the fourth and final subframe row (DataSF4) is summed with same-row, column data from the first three subframes (i.e., data output from the $200^{th}$ row storage element of shift register 827 and thus the $600^{th}$ row element in the overall pipeline) in adder 828, thus merging the subframe data from all four subframes in the buffer output. Note that the buffer elements capable of storing summed values should have sufficient bit depth to avoid overflow of the stored values. Note that the read-out values from either the first and/or second-fourth subframes may be scaled (or weighted, compressed, normalized or otherwise revised) prior to the summation operations to account for differences in subframe interval. Note also that if the exposure is shortened, such shortening can be accommodated by adjusting the summation points in the shift register accordingly.

FIG. 34B illustrates an alternative embodiment of a buffering circuit 830 that enables partial image reconstruction from the 12-1-1-1 subframe sequence of FIG. 33C. As shown, the same general data demultiplexing (821) and buffering is applied, but instead of summing same pixel data for all four subframes (which may require scaling logic as mentioned above) within a shared buffer circuit, separate shift-register-implemented buffers 833 and 834 are provided for long and short subframe rows. More specifically, a 600-stage row shift register 833 is provided to buffer the 600 rows of initial-subframe (12-USF) data read-out of the pixel array during the three unit subframes that precede the final subframe read-out, and a separate 400-stage row shift-register is provided to buffer the 400 rows of second-subframe (1-USF) data read-out of the pixel array during the two unit subframes that precede the final subframe. As shown, the two hundred rows of third-subframe data (also 1-USF) read-out of the pixel array may be summed (836) with same pixel data from the second-subframe data read-out two hundred rows earlier (i.e., the subframe data resident within the $200^{th}$ row element of component shift register 835 at the time the first row of the third subframe is read out). Similarly, as the final subframe duration is also a single unit subframe, final subframe data may be summed (838) with same pixel data from the combined second/third subframe data buffered 200 rows earlier (i.e., the subframe data resident within the $200^{th}$ row element of component shift register 837 and thus in the $400^{th}$ row element of the combined 400-stage shift register 834). Note that no weighting or scaling is required prior to the summation operations in adders 836 and 838 in view of the identical exposure intervals of the last three subframes. Thus, buffering circuit 830 buffers an amount of data corresponding to a mere one-third subframe (i.e., 1000 pixel rows within buffers 833 and 834) and yet compresses the four read-out subframes into two streamed image frames (i.e., one corresponding to the 12-USF subframe and one corresponding to the sum of the three 1-USF subframes) that may be combined in downstream reconstruction logic. Note that the subframe data may be compressed using a visually lossless lookup table (VLL) or other data compression technique prior to storage within buffers 833 and 834 (or within buffers 823, 825, 827 in the embodiment of FIG. 34A). For example, a row of subframe data may be compressed within a VLL to reduce bit depth (i.e., number of constituent bits in each pixel value) prior to being inserted within a buffer and then decompressed with an inverse VLL at buffer output. In this scenario, a 10-bit pixel value can be compressed to 8 bits, 11 and 12 bit values can be compressed to 9 bits and so on. As each pixel row of each subframe may generally include thousands (or more) pixel values, the memory savings can be substantial.

Motion Artifact Mitigation in Line Interleaved Dual Exposure

Moving objects tend to yield undesirable artifacts (distortion) in images reconstructed from non-uniform-duration subframes, artifacts that can be mitigated by reducing the difference in exposure time between light and dark subframes. More specifically, by adjusting the oversampling policy (i.e., subframe sequence) to center the short-exposure subframe within the overall frame interval, improved results are possible. For example, choosing/implementing a 4-1-3-1 subframe sequence establishes the first unit subframe at the temporal center of the 9-USF frame interval. Additionally, in sensor embodiments that permit ISO (gain) to be changed dynamically (i.e., from subframe to subframe), a short-exposure subframe can be read out with a lower gain and longer exposure subframes with higher gain to improve overall low-light performance.

The foregoing concepts may also be applied within line-interleaved dual exposure sensors. More specifically, instead of reading out the short and long exposures at the end of the longest exposure time, the short exposure may be advanced in time (i.e., commenced earlier) and thus aligned at or near the temporal center of the longer exposure, thereby reducing the above-described motion artifacts. Also, a lower gain (i.e., ISO) may be applied in conjunction with the short-exposure read-out than with the longer-exposure read-out, thus mitigating differences in exposure duration and potentially extending the dynamic range of the sensor beyond that possible with equal ISO gains and/or non-centered short-duration exposures.

As a specific example, at a reference ISO of 400, respective long and short exposure times of 1/30 second and 1/1000 second yield a 5-stop delta in exposure value, thus making motion artifacts more likely. By reducing the ISO for the short exposure from 400 to 100 (two stops) and lengthening the exposure time from 1/1000 to 1/240 second (also two stops), the difference in effective exposure time is reduced from 5 stops to 3 stops, reducing the potential for motion artifacts in the reconstructed image. Note that read-out of the short exposure pixel lines (or rows) may be arranged to avoid conflicting use of read-out resources (e.g., ADC circuitry), for example, by executing the short exposure read-outs in intervening times between long-exposure line (row) read-out times, and thus line-interleaving the short and long read-outs. Also, the sensor data read-out need not be progressive. In one embodiment, for example, short-exposure read-out will begin first, then long-exposure read-out and short-exposure read-out will be interleaved, followed by a period in which only the long-exposure read-out is performed. FIG. 35 contrasts the above-described line-interleaved read-outs, showing the artifact-prone fully-interleaved read-out approach at left (i.e., short and long exposures terminate concurrently at the end of the frame interval) and the more artifact-resistant frame-centered short-exposure approach at right (i.e., short exposure read-out at the temporal center of the frame interval such that limited interleaved short and long exposure read-out occurs in the interval designated by shading).

Partial-on Transfer-Gate Voltage Calibration

Figure 36:
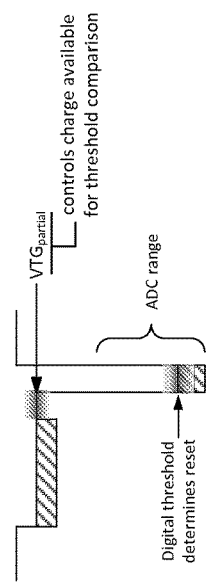
FIG. 36 illustrates the relationship between the partial-on transfer gate voltage applied to effect a partial read-out of photodiode state and the conditional read/reset threshold against which the partial-read signal is tested to determine whether to execute a full photodiode read-out and reset.

FIG. 36 illustrates the relationship between the partial-on transfer gate voltage $VTG_{partial}$ applied to effect a partial read-out of a pixel's photodiode state and the conditional read/reset threshold against which the partial read signal is tested to determine whether to execute a full photodiode read-out and reset. More specifically, the $VTG_{partial}$ controls the charge available for threshold comparison, while the conditional read/reset threshold value (or comparator threshold) may be viewed as a digital value corresponding to a desired point within the ADC range. Experimental results indicate that the range of $VTG_{partial}$ voltages that yield effective results is relatively narrow (e.g., on the order of 100 mV) and thus that a production image sensor may benefit from calibration of this voltage. While numerous calibration schemes may be applied either during device production or during run-time (i.e., at device startup and/or occasionally or periodically after initial start-up), two general approaches are described below: a circuit-based simulated-exposure scheme and an analytical approach that optionally involves a hybrid read-out mode in which ADC operations are executed with respect to both partial read-out and full read-out operations (i.e., ADC result generated regardless of whether an overthreshold or underthreshold pixel state is detected).

Figure 37:
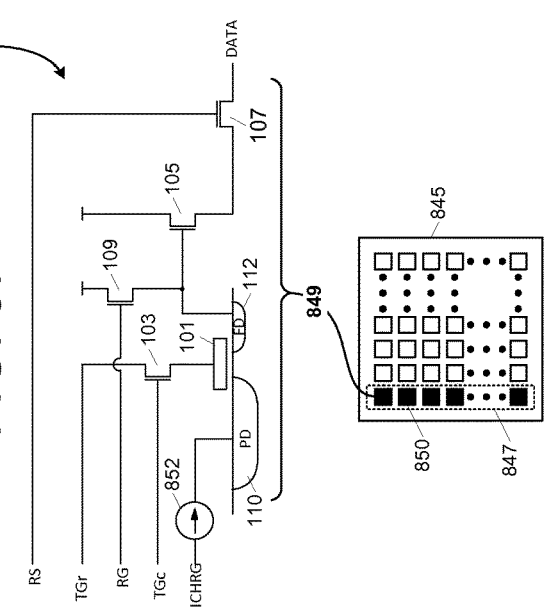
FIG. 37 illustrates an embodiment of a pixel array having a "dark" column of pixel calibration circuits disposed at a peripheral location outside the focal plane.

FIG. 37 illustrates an embodiment of a pixel array 845 having a "dark" column 847 of pixel calibration circuits 850 ("calibrators") disposed at a peripheral location outside the focal plane (i.e., not exposed to light). As shown in detail view 849, each of the calibrators 850 includes a photodiode 110, floating diffusion region 112, transfer gate 101, transfer-enable transistor 103 (which may be omitted in a split-gate embodiment), reset transistor 109, source-follower transistor 105 and read-select transistor 107 all of which are designed to match counterpart elements of light-collecting pixels (i.e., as discussed above) and thus permit simulated light-collection for purposes of calibrating the partial-on transfer gate voltage. In the embodiment shown, for example, a constant current source 852 is coupled to photodiode 110 to enable delivery of a reference level of charge that corresponds to a number of photon strikes just above the threshold that should be detectable by application of a calibrated partial-on transfer-gate potential, $VTG_{partial}$ on the TGr line. Accordingly, after establishing the reference charge level within photodiode 110, partial-transfer operations may be carried out iteratively, applying an escalating $VTG_{partial}$ potential to the TGr line in each iteration. When $VTG_{partial}$ rises to a level that yields an overthreshold detection within the column read-out circuitry, $VTG_{partial}$ may be deemed to be calibrated and applied thereafter within pixel row-read-out operations. In one embodiment, a separate calibration operation is executed with respect to a calibrator 850 for each pixel row, thereby limiting threshold disparity across the pixel array. In alternative embodiments, only one such calibration operation is performed (in which case only one calibrator 850 is needed instead of a column of calibrators) and the $VTG_{partial}$ potential calibrated therein applied across the entire pixel array.

Figure 39:
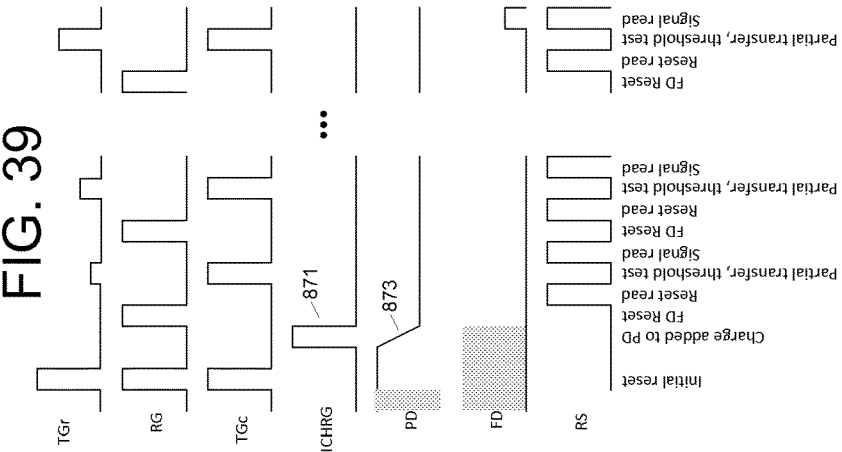
FIGS. 38 and 39 illustrates an exemplary sequence of calibration operations and corresponding signal waveforms within calibration circuit of FIG. 37.
Figure 38:
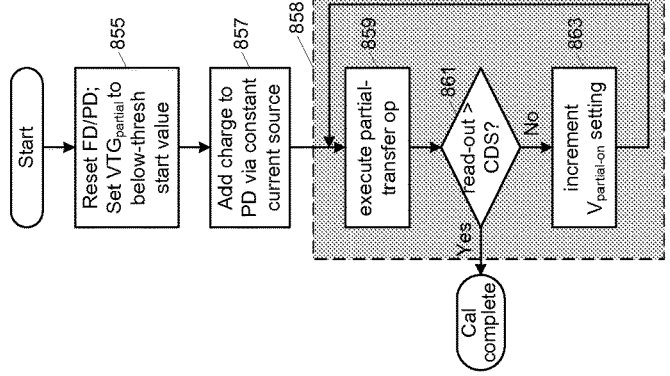

FIGS. 38 and 39 illustrates an exemplary sequence of calibration operations and corresponding signal waveforms within calibrator 850 of FIG. 37. In the embodiment shown, calibration of the partial-on transfer gate potential begins with a reset of the calibrator's floating diffusion and photodiode at 855 and also setting the $VTG_{partial}$ potential to a below-threshold start value. Referring to FIG. 39, the reset operation may be effected by raising TGr and TGc to their full potential to interconnect the photodiode and floating diffusion (i.e., via transfer gate 101), and then simultaneously pulsing the reset-gate signal (RG) to raise the potential of the photodetector and floating diffusion to the precharge voltage level (e.g., $V_{DD}$). Thereafter, at 857 a predetermined amount of charge (i.e., the above-mentioned reference charge) is transferred to the photodiode via the constant current source, an operation shown graphically in FIG. 39 by the charging pulse 871 and the ensuing drop in photodiode potential at 873.

Having established the reference photodiode charge level, an iterative sequence of partial-on voltage level adjustments is executed in the loop at 858, each iteration including a partial-transfer operation at 859, a digital comparison of the read-out signal (e.g., floating diffusion signal-state minus floating-diffusion reset-state) with the digital threshold at 861 and, if an underthreshold determination results (negative determination at 861), an increment in the $VTG_{partial}$ voltage level at 863. As shown in FIG. 39, each partial transfer operation is carried out generally as described above and includes a floating diffusion reset ("FD reset"), a reset-state read-out ("Reset read"), application of the present value of $VTG_{partial}$ to the row transfer gate (i.e., as signal TGr) to enable putative charge transfer from photodiode to floating diode ("Partial transfer/threshold test"), and a signal-state read-out ("Signal read").

Figure 40:
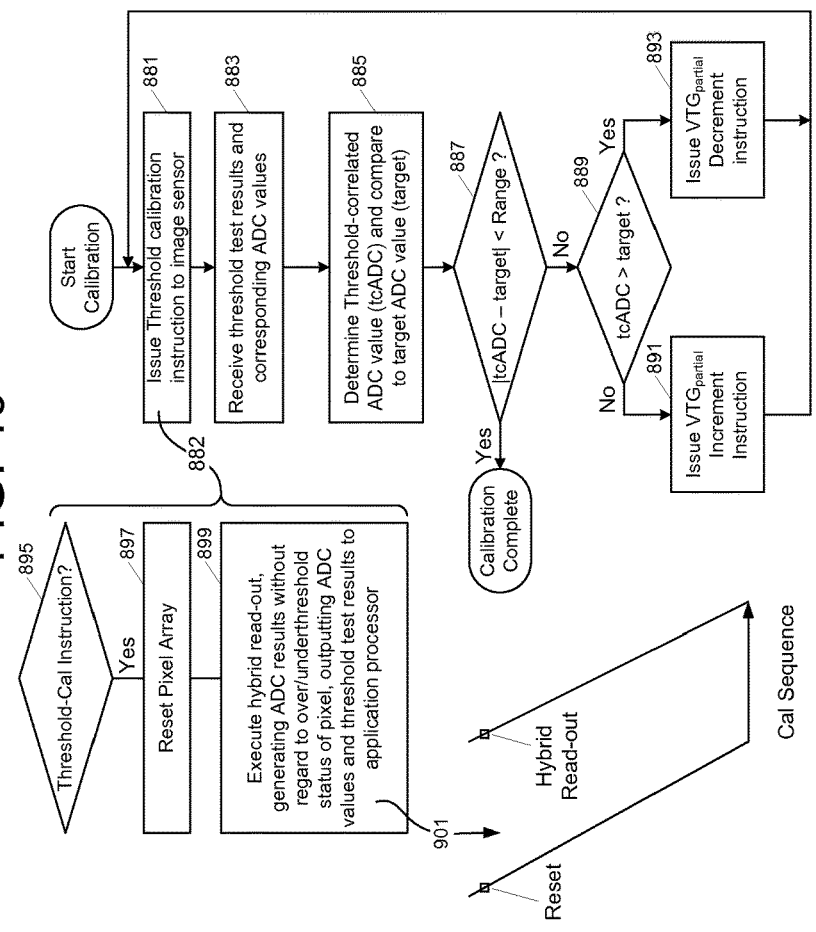
FIG. 40 illustrates operations carried out within an application processor and image sensor to effect an alternative, analytically-driven calibration of the partial-on transfer gate voltage.

FIG. 40 illustrates operations carried out within an application processor and image sensor to effect an alternative, analytically-driven calibration of the partial-on transfer gate voltage ($VTG_{partial}$). Starting at 881, the application processor issues a threshold calibration instruction to the image sensor, triggering image-sensor execution of the calibration sequence shown in detail view 882. That is, upon receiving the threshold-calibration instruction (affirmative determination at 895), the image sensor resets the pixel array (897) and, after a predetermined exposure interval designed to expose a significant fraction of pixels (e.g., 1% or more) to a light range similar to the desired threshold, executes a hybrid data read-out at 899. More specifically, in contrast to read-out modes in which ADC operations are executed only in response to overthreshold determination and thus as part of conditional read operations, control circuitry within the image sensor enables ADC operation during each read-out interval without regard to whether an overthreshold condition exists, thus generating an ADC value corresponding to the partial-charge-transfer (i.e., after $VTG_{partial}$ is applied to the transfer gate) in the case of an underthreshold pixel, or an ADC value corresponding to full charge transfer (i.e., after $VTG_{full}$ is applied to empty the photodiode).

Figure 41:
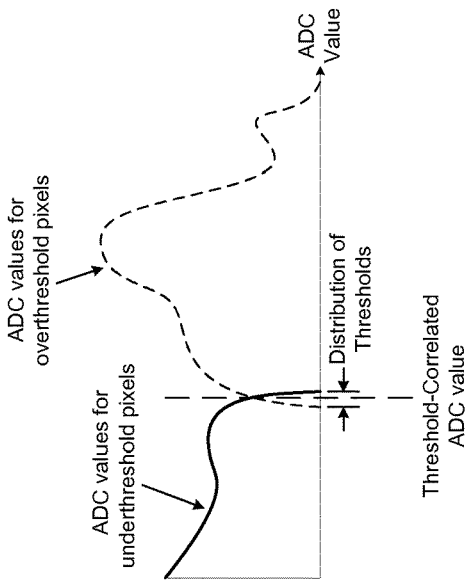
FIG. 41 illustrates, graphically, a determination of a threshold-correlated ADC value based on a collection of ADC values for underthreshold and overthreshold pixels.

In one embodiment, the image sensor outputs the ADC values together with respective threshold test results to the application processor, which upon receiving such calibration data (883), determines a threshold-correlated ADC value (tcADC) and compares that value to a desired ADC "target" value as shown at 885. More specifically, as shown in FIG. 41, the application processor evaluates the ADC values for underthreshold and overthreshold pixels, and identifies, as the threshold-correlated ADC value, a statistical midpoint (e.g., mean, median, or like statistical center) between overlapping edges of those value sets. If the threshold-correlated ADC value is outside a range of values centered about the target ADC value (negative determination at 887), the application processor issues either a $VTG_{partial}$ increment or decrement instruction to the image sensor at 891 or 893 per the determination at 889 whether the threshold-correlated ADC value is below or above the target ADC value, respectively, thus causing the image sensor to raise or lower the $VTG_{partial}$ potential. Thereafter, the application processor repeats the calibration sequence, starting with reissuing the threshold calibration instruction at 881.

Returning to decision 887, when the threshold-calibrated ADC value is determined to be within a predetermined range of the target ADC value (e.g., a target value and/or range programmed within the imaging system), the calibration is deemed complete and the image sensor ready for image acquisition. As discussed above, the calibration procedure may be repeated periodically or occasionally (e.g., in response to selected events, including, without limitation, user input indicating a request to calibrate the image sensor).

Figure 42:
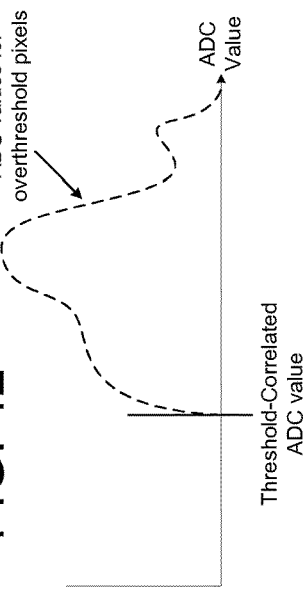
FIG. 42 illustrates an alternative analytical calibration technique that may be applied within image sensors that lack the above-described hybrid read-out mode or for which such mode has been disabled.

FIG. 42 illustrates an alternative analytical calibration technique that may be applied within image sensors that lack the above-described hybrid read-out mode or for which such mode has been disabled. In general, calibration operations are carried out within the application processor and image sensor as shown in FIG. 40 except that the image sensor responds to an incoming threshold calibration instruction by carrying out non-hybrid read-out operations—that is, read-out operations as described above in which ADC values are generated only for overthreshold pixels. As a result, instead of the two overlapping ADC output curves shown in FIG. 41 (i.e., one for underthreshold pixels and one for overthreshold pixels), only a single ADC output profile is obtained. A statistical cut-off point may nonetheless be determined based on the solitary ADC output profile and, if desirable, the status flags indicating the number of underthreshold events, thus enabling determination of a threshold-correlated ADC value as shown. Once determined, the threshold-correlated ADC value may be tested against a target ADC value, incrementing or decrementing $VTG_{partial}$ based on the test result as described in reference to FIG. 40.

Partial Binning to Improve Low-Light SNR

As discussed above in reference to 4×1 and 2×2 quad pixel groups, individual pixels within an image sensor may share a floating diffusion and/or one or more sample-and-hold storage elements in a manner that enables charge from two or more photodiodes and/or read-out voltages corresponding to two or more photodiodes to be combined (e.g., added, averaged, aggregated, etc.) in a binned read-out. Such charge/voltage-based binning increases the effective pixel size and thus improves low-light sensitivity (i.e., in view of the increased light collection) at the cost of reduced spatial resolution. In a number of embodiments, an oversampled image sensor is read-out in both binned (reduced-resolution) and unbinned (full-resolution) modes in respective subframes of an image frame to enable improved low-light sensitivity without significant loss of spatial resolution. In one embodiment, for example, the subframe read-out results themselves are evaluated to decide between two or more reconstruction techniques, selecting a reconstruction that relies more heavily on the binned read-out if read-out results indicate a low-light condition and, conversely, selecting a reconstruction that omits the binned read-out (or generates and applies an estimate of full-resolution pixel contributions to the binned read-out) if read-out results indicate a nominal "bright-light" condition.

Figure 43:
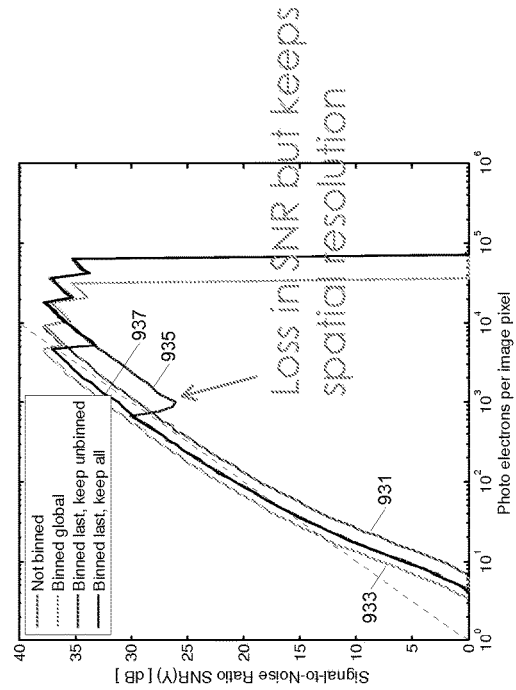
FIGS. 43 and 44 illustrate an exemplary "partial binning" imaging approach in which a pixel array is conditionally read/reset in an unbinned, full-resolution mode for all but the final subframe of a given image frame, and then unconditionally read/reset in a binned, reduced-resolution mode for the final subframe.
Figure 44:
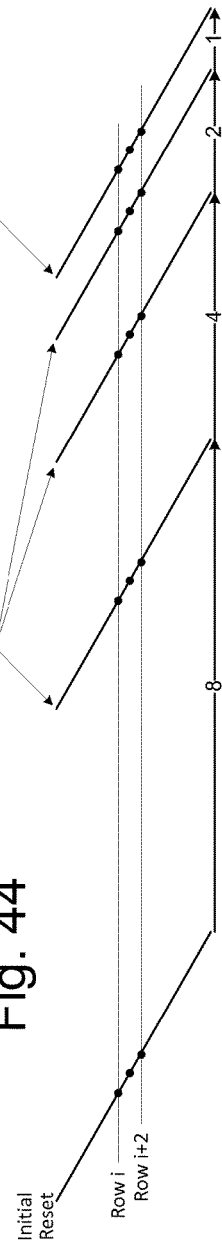

FIGS. 43 and 44 illustrate an exemplary "partial binning" imaging approach (or "hybrid subframe read-out") in which the pixel array is conditionally read/reset in an unbinned, full-resolution mode for all but the final subframe of a given image frame (i.e., operations 911 and 913) and then unconditionally read/reset in a binned, reduced-resolution mode for the final subframe 915. Referring specifically to the embodiment of FIG. 43, the binned and unbinned read-out results may be evaluated as shown at 917 to determine whether a low-light condition exists. If a low-light condition is detected, then a pixel value is generated at 919 for each full-resolution pixel based on values obtained for each binned group of pixels and, optionally, values obtained for neighboring binned groups of pixels. If a low-light condition does not exist (i.e., a bright-light condition exists), then a pixel value is generated for each full-resolution pixel at 921 based on unbinned read-out results and, optionally, values extracted from binned read-out results.

Figure 45:
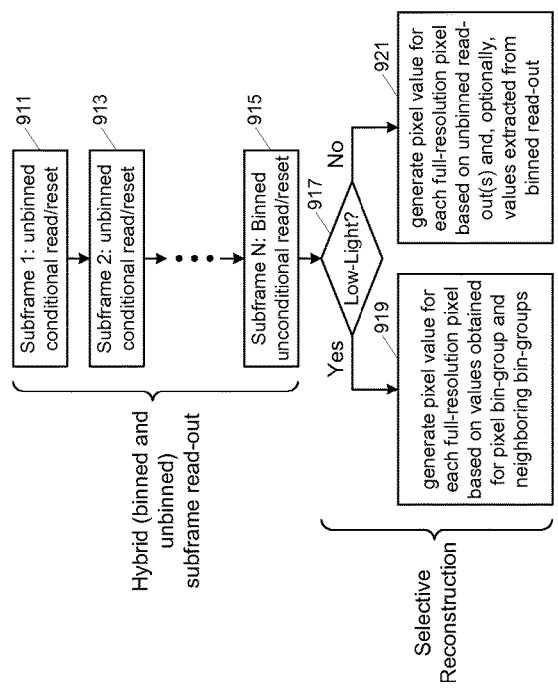
FIG. 45 illustrates qualitative differences between varying image frame read-out/reconstruction modes within a pixel array.

FIG. 45 illustrates qualitative differences between varying image frame read-out/reconstruction modes within a pixel array. As shown, in an unbinned frame read-out mode 931 (i.e., all subframes read out in unbinned mode), full resolution is maintained by definition, but low-light sensitivity is limited as indicated by the SNR (signal-to-noise ratio) below 10 until approximately 70 photon strikes per subframe interval. At the opposite end of the spectrum, in binned frame read-out mode 933 (i.e., all subframes read out in binned mode), spatial resolution is compromised (again, by definition), but the low-light sensitivity is significantly improved, as can be seen by the SNR exceeding 10 starting at approximately 22 photon strikes per image pixel.

In contrast to the fully binned and fully-unbinned image frame read-out modes, the partially-binned modes (935, 937) exhibit improved low-light sensitivity without significant loss of spatial resolution. As shown, SNR drops somewhat as light intensity reaches a crossover between low-light and bright-light conditions in a partial binning mode 935 in which only unbinned subframe read-outs are used for image reconstruction of bright-light scenes (i.e., as there is one fewer subframe worth of image data), while the SNR is maintained at a relatively steady trajectory in a partial binning mode 937 in which all subframe data is used for image reconstruction. Accordingly, while binned image data may be omitted from the reconstruction data set in some embodiments, a number of techniques discussed below seek to estimate full resolution pixel contributions to binned read-out results and apply those estimations in image reconstruction.

FIG. 46 illustrates an exemplary segment of a bin-enabled pixel array together with corresponding color filter array (CFA) elements—collectively, a "CFA fragment 170." In the embodiment shown, individual "full-resolution" pixels are implemented within 4-row by 1-column (4×1) groups of four pixels, with each such quad pixel group having a shared floating diffusion and every other column of quad pixel groups having a switchably shared set of sample and hold elements as generally described above in reference to FIGS. 5 and 6. For ease of reference, same-color pixels within CFA fragment 170 (and the larger pixel array) are referred to as belonging to the same color plane, with green pixels disposed in the same row as red pixels (i.e., green pixels "Gr") being distinguished from green pixels in the same row as blue pixels (i.e., green pixels "Gb") for purposes of binning and image reconstruction. That is, same-color-plane pixels in a given quad pixel group may be charge-binned by executing simultaneous row operations with respect to those pixels, and same-color-plane pixels in neighboring columns (i.e., two columns over in the example shown) may be voltage-binned by switchably coupling their above-mentioned column-shared sample and hold elements after voltage sampling each charge-binned pair to a respective sample and hold element. Altogether, the four charge/voltage bin-capable pixels form a pixel bin group 930 or "bin group" as shown at 927, with the individual pixels of the bin group being referred to as component or full-resolution pixels as shown at 925. A charge/voltage-binned read-out of a given bin group may be viewed as a read-out of a virtual pixel (or virtual binned pixel) centered between the component pixels of the bin group (i.e., "V-Bin Pixel" as shown at the center of bin group 930). Also, in a number of embodiments, each of four neighboring bin-groups 930 (16 full-resolution pixels) form a low-light decision kernel 932 that is evaluated to distinguish between low-light and bright-light conditions, with the interior four pixels of the low-light decision kernel forming a bin-group-bounded pixel set 933. Further, depending on the location of a given full-resolution pixel within the overall pixel array (i.e., at the edge of the array or within the interior of the array) the "color-plane neighbors" of the full-resolution pixel may include pixels within the same bin group and pixels from adjacent bin groups as shown at 928.

As mentioned above, final pixel values within a reconstructed image may be generated according to one of multiple reconstruction techniques, with the selection between different techniques being determined dynamically according to subframe read-out results. FIG. 47 illustrates an example of such selective image reconstruction with respect to a pixel bin group. Starting at 941, subframe read-out results for the full-resolution pixels within a low-light decision kernel (e.g., as shown at 932 in FIG. 46) are evaluated to distinguish between low-light and bright-light conditions. In the specific embodiment shown, for example, an over-threshold determination in a non-final subframe for any pixel within the low-light decision kernel yields a bright-light determination while, conversely, consistent under-threshold determination across all non-final subframe read-outs within the pixels of the low-light decision kernel yields a low-light determination. As shown, in the low-light case (negative determination at 941), the image sensor (or application processor) generates a pixel value for each full-resolution pixel through bi-linear interpolation between surrounding binned pixel values as shown at 943—an operation explained in greater detail in reference to FIG. 51. In the bright-light case, by contrast (i.e., affirmative determination at 941), at 945 the image sensor and/or application processor generates a pixel value for each full-resolution pixel based on unbinned read-out results and an estimated contribution from the subject full-resolution pixel to the corresponding binned read-out (i.e., read-out of bin group of which full-resolution pixel is a component). Note that this exemplary bright-light approach involves combining binned and unbinned read-out results as discussed briefly in reference to FIG. 45. In alternative embodiments or configurations (e.g., established by programmed settings), binned read-out results may be omitted from full-resolution pixel reconstruction.

FIG. 48 illustrates an exemplary approach to combining binned and unbinned read-out results in bright-light reconstruction of full-resolution pixel values. Starting at 951, a predicted (i.e., preliminary estimate) last-frame read-out for each full-resolution pixel in a bin group is generated based on subframe read-out results. In one embodiment, explained below in reference to FIGS. 49 and 50, such predicted values may be generated by determining or estimating a charge accumulation rate within the subject full-resolution pixel and then using that estimate to extrapolate an end-of-frame charge accumulation level. For example, if an overthreshold condition is detected with respect to a subject pixel in one or more subframes, the read-out values obtained for those subframes may be used to determine a charge accumulation rate and thus enable prediction (projection/forecasting) of the charge accumulation level that would have been reached within that pixel at the conclusion of the non-final subframe assuming that the charge accumulation rate remained constant (i.e., linear charge accumulation).

Still referring to FIG. 48, after generating predictions (preliminary estimates) of final-frame read-out values for each of the full-resolution pixels within the bin group, a pro-rata portion of the binned read-out may be allocated to each such full-resolution pixel according to its predicted value (i.e., as shown at 953) to yield an estimated full-resolution final-frame read-out value. That is, designating bin group pixels as A, B, C and D, then estimates of full-resolution final-frame read-outs (EstA-EstD) for those pixels may be determined from their predicted values (PredA-PredD) and the binned read-out value as follows:

EstA=Binned Read-Out*PredA/(PredA+PredB+ PredC+PredD)

EstB=Binned Read-Out*PredB/(PredA+PredB+ PredC+PredD)

EstC=Binned Read-Out*PredC/(PredA+PredB+ PredC+PredD)

EstD=Binned Read-Out*PredD/(PredA+PredB+ PredC+PredD)

Other approaches to estimating full-resolution final-frame read-outs may be applied in alternative embodiments.

FIGS. 49 and 50 illustrate a more detailed example of predicting end-of-frame charge accumulation states within bin group pixels for purposes of estimating full-resolution pixel contributions to binned read-outs. Referring to the exemplary per-pixel charge-accumulation profiles shown in the 8-4-2-1 subframe sequence of FIG. 49, for instance, the solitary pixel reset (overthreshold) event that occurs following the second (4-USF) subframe in profile 956 may be used to determine a charge-accumulation rate and thus extrapolate (predict) the charge-accumulation level that would have been reached over the final two subframes (i.e., 2-USF and 1-USF subframes and thus a net 3-USF exposure interval). Similarly, in the case of profile 955, either or both of the two overthreshold detections at the conclusions of the first and third subframes may be used to determine a charge-accumulation rate and thus a predicted charge accumulation over the final subframe. In one embodiment, for example, the charge accumulation rates indicated by the first and third subframe read-outs may be statistically combined (e.g., weighted averaged) to yield a blended charge accumulation rate for purposes of extrapolating the level of charge accumulated during the final subframe. Alternatively, all but the last of the conditional read-out results may be discarded in determining the charge accumulation rate for final charge prediction purposes (i.e., in this case, determining a charge accumulation rate solely on the basis of the third subframe read-out and the 6-USF interval over which that read-out value was accumulated). Still referring to FIG. 49, in the case of a pixel charge accumulation profile in which no overthreshold condition is detected, a number of different assumptions may be applied to establish a charge-accumulation rate for predicting end-of-frame charge accumulation. In an embodiment in which a bright-light determination requires at least one overthreshold detection within a given pixel set (e.g., low-light decision kernel as described above), it may be useful to assume that the full-resolution pixel for which an estimated final-subframe value is being estimated was at the brink of the conditional read/reset threshold at the conclusion of the penultimate subframe—that is, just below the threshold at the conclusion of the 2-USF subframe as shown by profile 957. In that case, a charge accumulation rate may be estimated based on the read-out value corresponding to the conditional read/reset threshold and collective duration of the non-final subframes and thereafter used to project a final subframe read-out that would have occurred, but for the binned read-out. In alternative embodiments, charge accumulation rates may be estimated based on other assumptions (e.g., charge accumulation has reached only 50% of the threshold level at the conclusion of the penultimate subframe).

FIG. 50 illustrates an exemplary sequence of operations carried out to predict end-of-frame charge accumulation states within the component pixels of a bin group. As shown at 961, if an overthreshold condition was detected during a conditional read/reset subframe (i.e., a non-final subframe in cases where all but the final subframe are subject to conditional read/reset), then at 963 a charge accumulation rate (CAR) is determined from the conditional read-out value or values and intervals over which those values were accumulated. Thereafter, at 967, predictions of full-resolution final-subframe read-out values may be generated by multiplying the charge accumulation rate and a charge accumulation interval that transpired between the read/reset operation and the binned read-out.

Still referring to the embodiment of FIG. 50, if no overthreshold condition was detected with respect to a subject full-resolution pixel during a conditional read/reset subframe (i.e., negative determination at 961), then the charge accumulation rate is estimated based on an assumed charge level at the conclusion of the penultimate subframe. As discussed above, this assumed charge level may be at the threshold (i.e., infinitesimally below the level needed to trigger a conditional read/reset), at 50% of the threshold or any other useful level. At 967, the estimated charge accumulation rate is applied to predict a full-resolution final-subframe readout value, for example by multiplying the charge accumulation rate by the time since the most recent pixel reset operation and thus by the frame interval (or a truncated version of the frame interval if dead-time exists within the subframe sequence).

FIG. 51 illustrates a bi-linear interpolation that may be applied to generate final full-resolution pixel values for the pixels of a bin-group-bounded pixel set following determination of a low-light condition (e.g., where no conditional reset occurred within the pixels of a low-light decision kernel as described in reference to FIG. 47). In the embodiment shown, the four virtual pixels (i.e., v0-v3, which represent binned read-outs for respective bin groups as shown in FIG. 46) that bound pixels $R_0$-$R_3$ of the bin-group-bounded pixel set may be viewed as contributing to each individual bounded pixel (e.g., $R_0$) according to their respective physical distances from that bounded pixel. In one embodiment, for example, virtual pixel v0 is offset from bounded pixel R0 by a unit-less distance {1,1} in each of the X and Y dimensions shown, while, virtual pixels V1 and V2 are offset from is offset R0 by distances {1,3}, and {3,1}, respectively, and virtual pixel v3 is offset from R0 by distance {3,3}. Applying each distance as a product of its vector components (i.e., R0 offset from v0=1, from v1=3, from v2=3 and from v3=9), and then weighting the contribution of each virtual pixel to an estimated full-resolution value of $R_0$ in accordance with the inverse of the distance between the virtual pixel and $R_0$ (and normalizing to the smallest weighting) yields a bi-linear interpolation expression for $R_0$ as follows:

$$R_0 = (9v0 + 3v1 + 3v2 + 1v3)/(9+3+3+1)$$

Bi-linear interpolation values for pixels $R_1$-$R_3$ may be expressed similarly as shown. Note that, in the embodiment shown in FIG. 51, charge binning is assumed to be additive with respect to binned read-out (while voltage-binning is assumed to effect an averaging of the two charge-binned column read-outs), so that the bi-linear interpolation result is divided by 2 to yield a final value of for a given full-resolution pixel.

Still referring to FIG. 51, in one embodiment, the bi-linear interpolation result is effected by dedicated logic circuitry within the data output path of the image sensor IC. For example, multiplication by three may be effected by a single-bit-left-shift-and-add logic circuit (i.e., effecting the operation (v1<<1)+v1), multiplication by nine may be effected by a two-bit-left-shift-and-add logic circuit (i.e., (v0<<2)+v2) and division by sixteen by a right-shift-by-four logic circuit. In alternative embodiments, a digital signal processor or general-purpose processor (e.g., within the application processor) may perform the bi-linear interpolation upon receiving the virtual pixel values from the image sensor.

Figure 52:
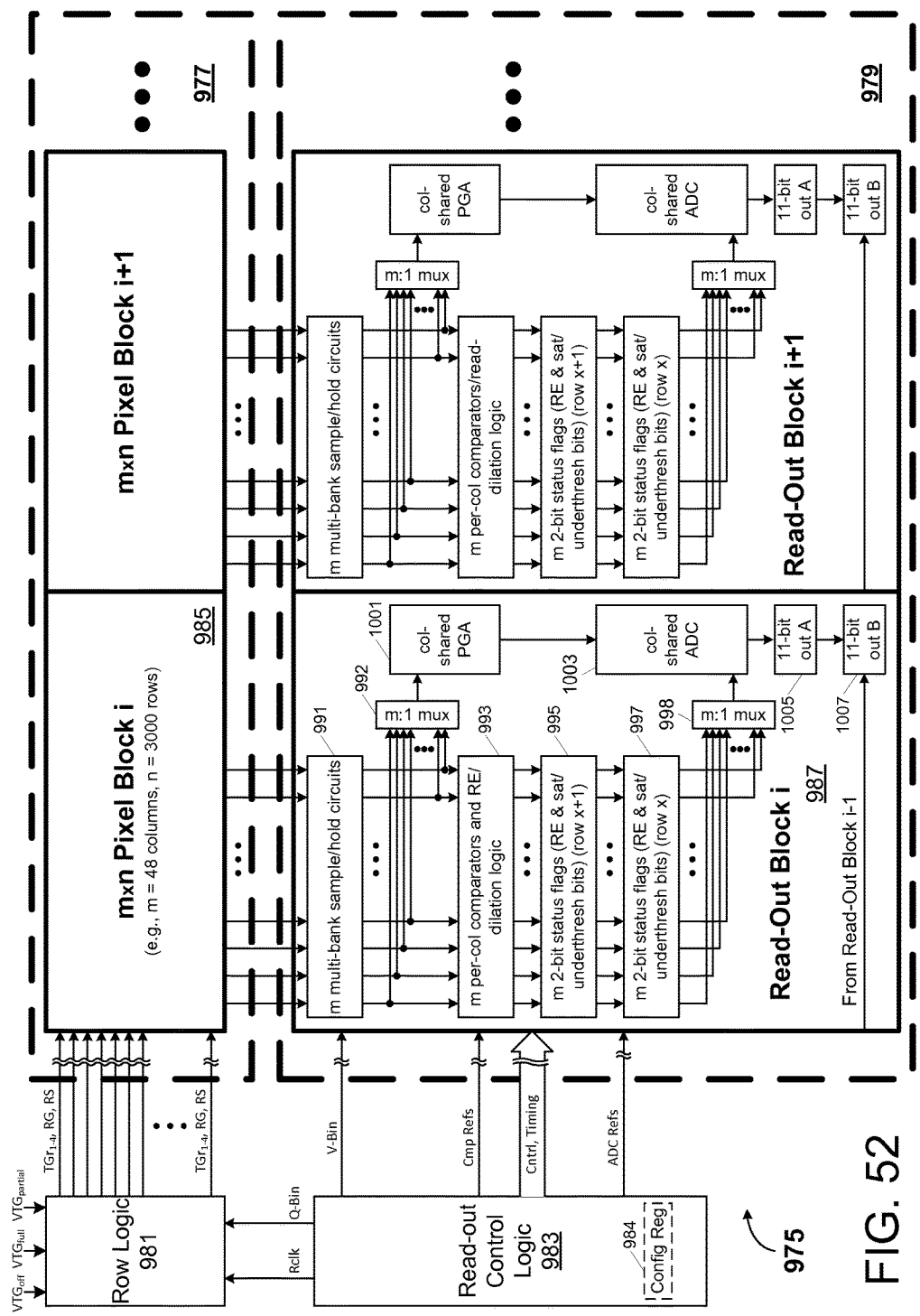
FIG. 52 illustrates an embodiment of an image sensor having a conditional read/reset pixel array, column read-out circuitry, row logic and read-out control logic.

FIG. 52 illustrates an embodiment of an image sensor 975 having a conditional read/reset pixel array 977, column read-out circuitry 979, row logic 981 and read-out control logic 983. In the example shown, pixel array 977 is organized in a number of pixel blocks 985, only two of which are depicted (i.e., pixel block 'i' and pixel block 'i+1'), with each pixel block containing m columns and n rows of pixels (e.g., m=48, n=3000, though other row/column dimensions may apply). Column read-out circuitry 979 is similarly organized in a number of read-out blocks 987 (only two of which are shown), each coupled to receive output signal lines (i.e., data lines) from a respective pixel block 985.

Though not specifically shown, each column of pixel array 977 is populated by shared-element pixels in which every four pixels form a quad pixel cell as described above, for example, in reference to FIGS. 5 and 6. Similarly, though not shown, sample and hold circuitry within each read-out block includes switching elements to enable voltage-binning of same-color-plane pixels in different pixel columns as described in reference to FIGS. 5 and 6. Thus, pixel array 977 may be selectively operated in charge-binned and/or voltage-binned read-out modes during all or selected sub-frames of an image frame interval in accordance with one or more binning control signals (e.g., "Q-Bin" and "V-Bin") from read-out control logic 983, thereby enabling partial binning operations as described above. In alternative embodiments, the disposition of shared floating diffusion and/or switchably shared sample and hold elements within the pixel and read-out blocks may be different from those shown in FIGS. 5 and 6 (e.g., 2×2 instead of 4×1 quad pixel groups).

Still referring to FIG. 52, row logic 981 outputs a shared row-select signal (RS) and reset-gate signal (RG) to each row of quad-pixel cells, and outputs independent row transfer-gate control signals ($TGr_1$-$TGr_4$) to drain terminals of respective transfer-enable transistors (or directly to transfer-gate terminals in a split-gate embodiment) within individual pixels. Thus, row logic 981 may be implemented generally as described in reference to FIG. 31 (i.e., with one row-select and reset-gate signal per each group of four rows per the bin-capable option described above). In an implementation in which row decoder/driver 305 sequences incrementally through the rows of pixel array 977 (e.g., pipelining reset, integration and progressive read-out operations with respect to the rows of pixel array 977 such that one row is read-out after another), row logic 981 may include circuitry to assert the RG, RS and TGr signals at the appropriate time for each row, for example, synthesizing those signals with respect to a row clock (Rclk) from read-out control logic 983. Alternatively, row logic 981 may receive individual timing signals corresponding to each or any of the RG, RS and TGr signals, multiplexing any individual enable pulse onto the corresponding RG, RS, or TGr lines of a selected row at the appropriate time.

In one embodiment, row logic 981 receives transfer-gate control voltages corresponding to the off, partially-on and fully-on states shown in FIGS. 2, 3 and 4 (i.e., $VTG_{off}$, $VTG_{partial}$, $VTG_{full}$) from an on-chip or off-chip programmable voltage source, switchably coupling each of the different control voltages to a given transfer-gate row line at a deterministic time, for example, as shown in FIGS. 2, 7, 11, 13 and 18A. The $VTG_{partial}$ voltage may be calibrated according to techniques described above in reference to FIGS. 36-42 (with a dark column of reference circuits as shown in FIG. 37 included within pixel array 977 in one implementation) thus compensating for control-voltage and/or performance variations (i.e., non-uniformity) across the pixel array.

Continuing with FIG. 52, each read-out block 987 includes a set of m (per-column) multi-bank sample and hold circuits 991, a corresponding set of m comparators and read-enable/dilation logic circuits 993, m:1 multiplexers 992 and 998, column-shared programmable gain amplifier 1001 and column-shared ADC circuit 1003, all of which operate generally as described above in reference to FIG. 16. In contrast to the double-buffered, column-parallel line memory shown in FIG. 16, however, separate pairs of buffers are provided to store read-out status flags and ADC output values. More specifically, a pair of flag buffers 995 and 997 are provided to double-buffer per-column read-out status flags (i.e., a read-enable bit and an above/below range bit, RE and AB, for each of m pixel columns), with flag buffer 995 storing the status flags for row x+1, and flag buffer 997 storing status flags for row x, thus enabling status flag generation (i.e., threshold-comparison operations) with respect a given row (x+1) while the status flags for the prior row (x) are delivered one after another (via multiplexer 998) to column-shared ADC 1003 to support selective ADC operations as discussed above. Read-out control logic 983 (which may include a configuration register 984 to enable programmable selection of configuration options) outputs comparator references (Cmp Refs), control and timing signals (Cntrl, Timing) and ADC refs (ADC Refs) to the read-out blocks 987, together with the voltage-bin mode signal (V-Bin) mentioned above. Read-out control logic 983 may also output the above-described row clock (Rclk), as well as a charge-bin mode signal (Q-Bin) to row logic 981, thus enabling the sequencing logic therein to assert TGr signals in parallel or staggered fashion according to the specified charge binning mode.

Instead of storing m column ADC outputs in respective storage locations within a line memory (i.e., as in the embodiment of FIG. 16), and then shifting out a sequence of ADC values corresponding to an entire pixel row, a single-column ADC output storage buffer pair 1005/1007 (i.e., an 11-bit storage element in this case to permit storage of a 10-bit ADC value and logic '1' read-enable flag or a logic '0' read-enable flag together with an AB flag) is provided to enable double-buffering of ADC values generated in succession for respective pixel columns. More specifically, output-stage buffer 1007 is provided to store the ADC value for a given pixel column and deliver that ADC value to downstream logic (including the PHY), concurrently with generation of the ADC value for a subsequent pixel column and storage of that subsequent-column ADC value in input-stage buffer 1005. In the embodiment shown, the output-stage buffers 1007 for respective read-out blocks 987 are coupled in an output shift register to enable sequential output of per-block ADC output values (e.g., at a rate of PB times the per-column ADC output rate, where PB is the number of pixel blocks in the pixel array) to downstream logic. Consequently, the stream of ADC output values delivered to downstream logic (including circuitry within an off-chip image processor) are column interleaved, with each set of K ADC output values including single value from each of K pixel blocks (with m sets of K ADC output values being output in sequence). In alternative embodiments, the output-stage buffers or any number of groups of output buffers may deliver output values in parallel to downstream logic instead of delivering one pixel column read-out result at a time.

Figure 53:
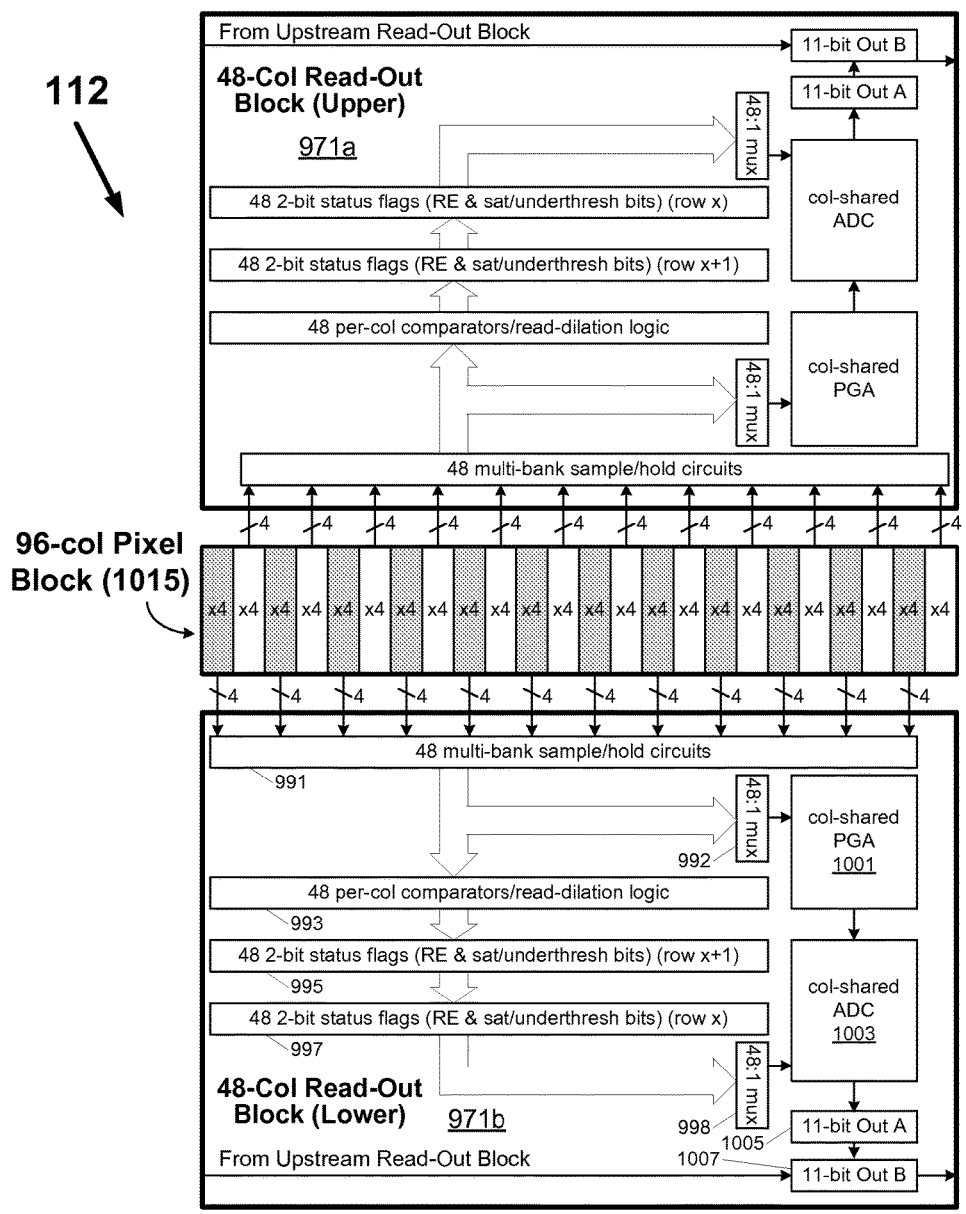
FIG. 53 illustrates an exemplary image sensor architecture in which each pixel block of a pixel array is sandwiched between upper and lower read-out blocks.

FIG. 53 illustrates an exemplary image sensor architecture 112 in which each pixel block 1015 of a pixel array is sandwiched between upper and lower read-out blocks 971*a* and 971*b*. In the embodiment shown, pixel block 1015 includes 96 pixel columns, alternately connected to upper and lower read-out blocks every four pixel columns (i.e., four-up, four-down) so that 48 pixel columns are coupled to each of the upper and lower read-out blocks 971*a*/971*b*. The four-up, four-down implementation is advantageous for at least some of the disclosed embodiments as it provides a relatively straightforward way to move from column read-outs at the pixel pitch to sample-and-hold elements, etc., laid out at twice the pixel pitch. Other implementations are possible, depending on binning layout, ADC sharing, etc. Each of the upper and lower read-out blocks 971*a*/971*b* is implemented generally as described in reference to FIG. 52, thus doubling the net data output rate (i.e., by virtue of the parallel operation of the read-out blocks) and also enabling disposition of PHY (physical interface circuitry) at opposite edges of an integrated circuit. Alternatively, the output buffer stages 1007 of the upper and lower read-out blocks may feed a shared physical output driver (PHY), for example, disposed to the left or right of the pixel array and coupled to receive data in parallel from each of the digital line memories. Additional circuitry (e.g., compression circuitry, reconstruction circuitry, etc.) may be disposed between the output buffer stages and shared or respective PHYs as generally described above. Also, while the upper and lower read-out blocks may be implemented on the same physical die as pixel block 1015 (e.g., at the periphery of the die (sandwiching the pixel block) or in the center of the die between respective halves of the pixel array, the read-out blocks may alternatively be located on another die (e.g., coupled to the pixel array die in a stacked configuration that may additionally include other imaging-related dies).

Dynamically Selected Subframe Sequencing

As discussed above, different subframe sequences may be selected to improve reconstructed image characteristics according to conditions at hand, including enhanced dynamic range for high-luminance scenes. In a number of embodiments, a conditional-read image sensor automatically transitions between subframe sequence profiles (also referred to herein as "scan profiles") having different oversampling rates in response to imaging conditions, increasing the oversampling rate (i.e., number of subframes per frame) for scenes that require high dynamic range, and reducing the oversampling factor to save power in lower dynamic range scenes.

FIG. 54 illustrates an exemplary imaging sensor embodiment in which the oversampling factor is varied incrementally between a minimum of unity (i.e., "1×," and thus no oversampling) and a maximum of four (4×), though higher oversampling factors may apply. In a number of embodiments, subframe read-out data is evaluated, potentially with other factors (e.g., user input and/or inputs from other sensors, including light-meter, accelerometer, and power-level sensors, including battery-level status, power-source indication), to determine whether to increase or decrease the dynamic range for a given image capture and thus whether to increase or decrease the oversampling factor. In one implementation, for example, an exposure/dynamic-range controller constructs a luminance histogram or per-color histograms using the pixel data acquired for one or more subframes, with a selected number of the most significant bits (MSBs) of the pixel data used to generate a count of the numbers of pixel values at respective luminance/color levels. Thereafter, the histogram(s) is/are compared with selected (e.g., programmably specified) thresholds to determine whether to increase the oversampling factor for higher dynamic range or decrease the oversampling factor to conserve power.

In a conditional-read image sensor, the charge integration interval (or light accumulation period) corresponding to a given pixel value is independent of the subframe in which the pixel value is read-out for any subframe after the initial subframe. Accordingly, determining the net rate of charge accumulation (and thus the luminance) within the subexposure interval corresponding to a given subframe generally involves evaluation of the pixel state assessment for preceding subframes to determine if a read-out occurred and, if not, whether the subject pixel was reset due to saturation (with the eclipse state indicating a form of saturation)—information that may not be readily available at all points within the image capture/reconstruction process. Thus, each value read out of the pixel array during a given frame may be characterized by (i) the point in time at which the read-out event occurs ("read-out point"), generally denominated herein by the subframe in which (or at the conclusion of which) the pixel value is read-out, and (ii) the charge-integration interval for the read-out value. These two characterizing values are generally applied in image reconstruction to determine interpolated pixel values at points in time at which no read-out occurred and/or composite pixel values from multiple read-out events. In some cases, a single event deterministically marks both the read-out point and integration interval, as when a read-out occurs at the conclusion of the first subframe (i.e., integration interval is the subexposure interval accorded to the first subframe and read-out point is the point in time offset from the initial reset by that same subexposure interval), while in other cases determination of the integration interval for a given read-out event involves consideration of pixel state assessed in prior subframes.

FIG. 55A illustrates an exemplary set of pixel charge integration profiles that occur at various luminance levels and the corresponding read-out/reset events given an N:1:1:1 scan sequence (i.e., one long subexposure that spans N unit subframes (N-USF) and three single-USF subexposures). For purposes of explanation in this instance and various embodiments discussed below, the final (or last) subframe read-out in a given scan sequence is assumed to be unconditional, while all non-final subframe read-outs in the sequence are conditioned on read-threshold exceedance. The scan sequence will generally repeat in video or preview modes. In other embodiments, one or more non-final subframe read-outs may be unconditional and/or the last subframe read-out may be conditional (for video applications that can tolerate missing final subframe data on some frames). It should also be noted that these curves represent noiseless and constant luminance and are thus informative as to average behavior. In many actual scenarios, subject motion, operator handshake, and changes in scene illumination (strobes, moving lights, etc.) can cause underthreshold, readout, and saturation to be possible for all subframes for a given pixel, independent of any previous subframe's status.

Continuing with FIG. 55A, the exemplary saturation and conditional-read thresholds shown ("Sat" and "Thresh," respectively) yield a total of eight luminance ranges, only the lowest seven of which are depicted. At the lowest luminance range (1), no threshold exceedance occurs prior to the final subframe so that only a single read-out is executed. More specifically, the read-out point occurs at the conclusion of the final subframe and the integration interval spans the net exposure time of the complete frame (i.e., the sum of the sub-frame integration intervals) and thus an interval of N+3 unit subframes (N+3 USF). Note that imaging results at this low luminance level remain unchanged as the oversampling factor drops from 4× to 3× to 2× to 1× as read-out data is captured in the final subframe only.

In a very narrow range of luminances (2), just above the lowest range, an exceedance occurs during the penultimate (third) subframe, thus yielding two read-out events during the image frame period: a conditional read at the conclusion of the third subframe for which the integration period is N+2 USF, and then an unconditional read at the conclusion of the final subframe, for which the integration period is 1 USF. A similar narrow range of luminances (3) occurs just above range (2) in which over-threshold detection during the second subframe yields a conditional read-out at the conclusion of that subframe (integration period=N+1 USF) and an unconditional read at the conclusion of the final subframe (integration period=2 USF). As discussed below, the brief charge integration intervals prior to the unconditional final-subframe read-out tend to yield noisy pixel values in the low-light conditions represented by ranges (2) and (3) (i.e., as the charge accumulation may be under or barely above the noise floor), so that, in some embodiments or configurations, it may be advantageous to temporarily raise the conditional-read threshold (e.g., either by changing a partial-read transfer gate voltage or shortening the duration of the partial-read pulse) during the pixel state assessments at the conclusions of the second and third subframes and thus eliminate ranges (2) and (3) in favor of an expanded range (1).

At the luminance range above range (3) or expanded range (1), a threshold exceedance occurs during the long sub exposure, thus yielding a conditional read-out at the conclusion of the first subframe (integration interval=N USF) as well as an unconditional read at the conclusion of the final subframe. In general, this range (4) represents midtone luminance values that predominate in reasonably bright but low dynamic range scenes, as well as many high dynamic range scenes. Note that, even as the luminance approaches the upper end of midtone range (4) (i.e., approaches saturation prior to conclusion of the initial N-USF subframe), exceedance within the next two short charge accumulation intervals is unlikely (i.e., unless the ratio of the saturation and conditional-read thresholds is significantly higher than that shown) so that power expended to conditionally read-out the second and third subframes yields little meaningful image data. Thus, if luminance values in this range predominate the imaging result, the oversampling factor may be reduced (gearing down) to conserve power without significantly impacting the resulting image.

As can be seen by the charge integration profile that occurs at the upper end of range (4), extensions of luminance beyond pixel reset points are represented by dashed lines to illustrate their extrapolated end-of-frame values and thus enable an appreciation of the ascending luminances encompassed by each range. Also, where pixel resets occur, initial-subframe charge integrations corresponding to specific luminances are, in some cases, adjoined to corresponding charge integrations during the subsequent short subexposures to identify the continuation of those profiles within the final short-subexposure subframes. Thus, the exemplary saturation and threshold levels shown enable a relatively narrow band of luminances (5) that yield pixel saturation during the first subframe, but no exceedance during the ensuing two short subframes. Thus, the only read-out for luminances in range (5) occurs at the conclusion of the final subframe (i.e., an unconditional read) following a 3-USF integration interval. It is instructive to note the distinction between ranges (5) and (1) at this point. Both ranges yield a single read-out at the same read point (i.e., conclusion of final subframe), but their integration intervals are significantly different, with range (1) yielding a full-frame (N+3 USF) integration interval and range (5) yielding fractional (3 USF) integration interval.

Luminance range (6) is characterized by pixel saturation during the initial subframe (i.e., no valid read-out at the conclusion of the N-USF subframe) and then a threshold exceedance during the penultimate (third) subframe, and thus encompasses luminance levels that yield threshold exceedance in charge-integration intervals of less than two (but not less than one) unit subframes. Accordingly, luminance range (6) yields a read-out at the conclusion of the third subframe following a 2 USF charge integration interval, as well as an unconditional read-out at the conclusion of the final subframe. Luminance range (7) is similarly characterized by saturation during the initial subframe and encompasses luminance levels that yield threshold exceedance (but do not saturate) in a single-USF charge integration interval. Thus, luminance range (7) yields read-outs at the conclusion of each of the final three (single-USF) subframes. Finally, though not specifically shown in FIG. 55A, luminances above range (7) (i.e., range (8)) yield pixel saturation within a single-USF charge integration interval and thus no valid read-out events.

FIG. 55B is a table illustrating exemplary pixel state assessment results and read-out events for each of the four subframes and eight luminance levels discussed in reference to FIG. 55A (note that other normally unlikely patterns may be possible with scene or camera motion/appearance of bright spots during the capture period). As shown, multiple read-out events occur for each luminance range in which a conditional-read threshold exceedance occurs without pixel saturation during a non-final subframe. Of particular note, are the shaded pixel-state-assessment/read-out events that occur during low-luminance ranges (1)-(3). In the lowest luminance range (1), the conditional-read operations for the initial three subframes yield no pixel values so that the image sensor may be transitioned to a 1× sampling mode without loss of image quality, at least from the standpoint of dynamic range. Similarly, as explained above, the read-out events at the conclusions of the second and third subframes in luminance ranges (3) and (2), respectively, may be suppressed in favor of a consolidated final-subframe readout (i.e., in effect merging the charge accumulation intervals corresponding to the non-final and final subframe read-out events) to increase the overall low-light charge integration interval and at the same time avoid what would otherwise be a noisy final-subframe read-out. Thus, shifting from 4× to 1× oversampling (i.e., no oversampling) for luminance ranges (2) and (3) not only conserves power, but may improve overall low-light image quality.

Still referring to FIG. 55B, the shaded regions (i.e., mid sub-frame read-out events) during midtone luminance range (4) indicate that mid-subframe readouts may also be omitted without loss of image quality (i.e., shifting from 4× to 2× oversampling), as no pixel read-outs occur at the conclusion of those intervals. Additionally, as can be seen in FIG. 55A, luminance range (5) may be avoided altogether by increasing the relative ratio of the saturation and conditional-read threshold until a luminance that yields saturation during the N-USF subframe is ensured to yield a threshold crossing during a two-USF interval (i.e., collapsing range (5) into range (6)). Further, as the first short subframe yields no read-out in range (6), at least one short subframe read-out may be omitted (i.e., shifting from 4× to 3× oversampling) without loss of image quality. As discussed below, all these considerations are taken into account in an exemplary image sensor embodiment that dynamically shifts between different oversampling factors based on pixel state assessment and image luminance.

FIG. 55C illustrates the various charge integration periods corresponding to valid read-out events within the exemplary luminance ranges of FIG. 55A. As explained above, multiple read-out events occur in luminance ranges other than ranges (1) and (5), with the integration intervals for such ranges shaded (i.e., shown in gray) to emphasize that an additional read-out occurs at the end of the final subframe or, in the case of luminance range (7), at the end of each of the final two single-USF subframes. Also, as shown with respect to luminance range (4), an additional conditional read may occur following the penultimate subframe (following a 2-USF charge integration interval), or even after the first short subframe (following a 1-USF charge interval) in the case of a sufficiently low ratio of saturation to conditional-read threshold.

Figure 56A:
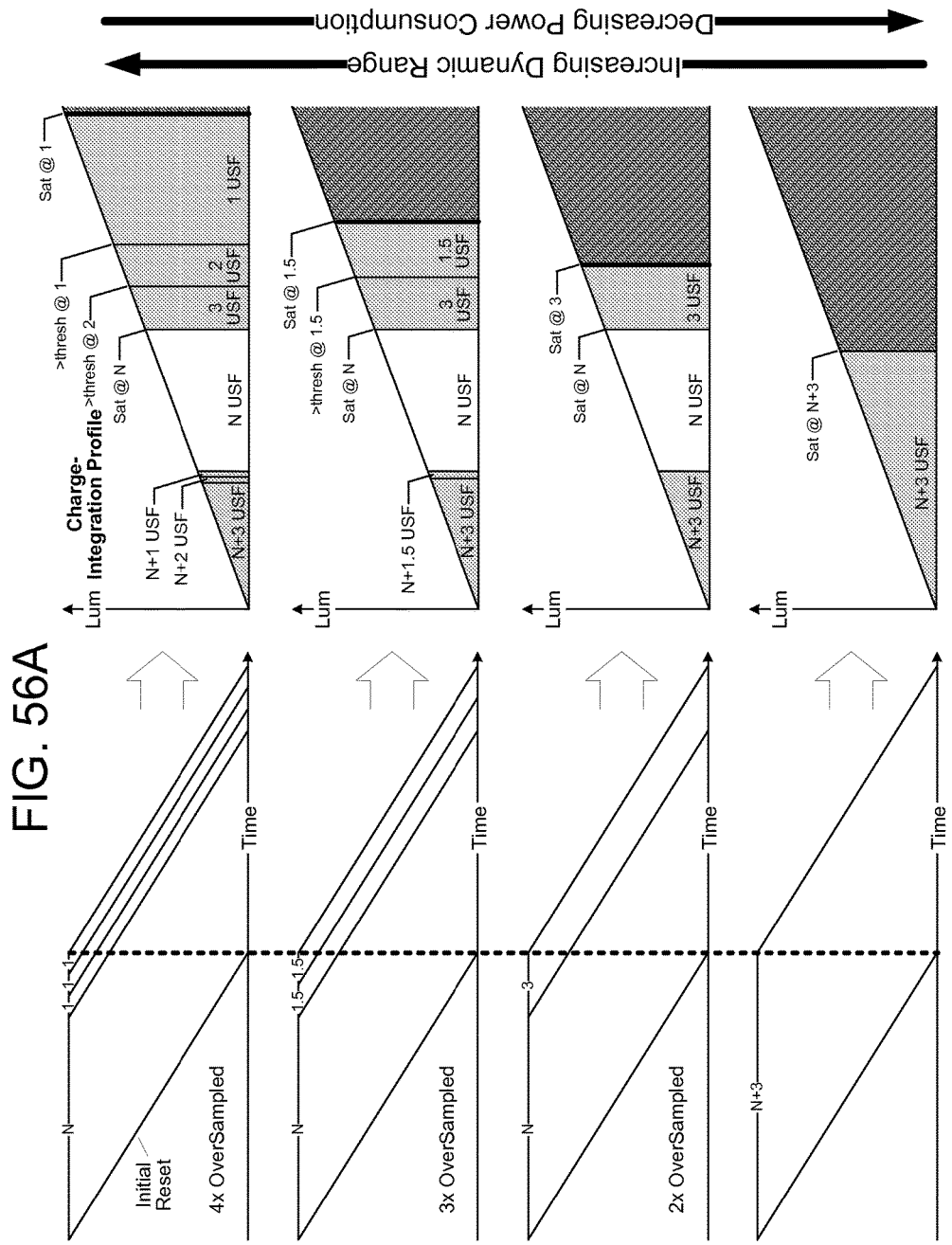
FIG. 56A illustrates the exemplary charge-integration profile of FIG. 55C adjacent an N:1:1:1 scan sequence together with corresponding charge-integration profiles that result as the oversampling factor is dropped from 4× to 1×, while maintaining the same long subframe duration and evenly splitting the remaining frame interval among one or more short subframes for each oversampled scan sequence.

FIG. 56A illustrates the exemplary charge-integration profile of FIG. 55C adjacent an N:1:1:1 scan sequence together with corresponding charge-integration profiles that result as the oversampling factor is changed between 4× and 1×, while maintaining the same long subframe duration and evenly splitting the remaining frame interval (i.e., total frame interval minus N-USF) among one or more short subframes for each oversampled scan sequence (i.e., 4×, 3× and 2× scan sequences). A set of scan sequences that observe these principles (i.e., oversampled sequences having a single-duration long subframe exposure with the remaining exposure interval distributed evenly among a varying number of short-duration subexposures) are referred to herein as a scan family or exposure family and have a number of useful properties including, for example and without limitation:

adjustable number of short subframes to capture highlights;

midtone luminance range that yields a long subexposure read-out (i.e., after N-USF charge integration interval) remains constant across oversampled scan sequences, simplifying image reconstruction;

uniform subframe intervals (i.e., 1:1:1 or 1.5:1.5) permit simple, unscaled summation of short subframe read-out values, further simplifying reconstruction; and ratio of long exposure duration to sum of short subexposure durations remains constant across oversampled scan sequences (N:3 in this example), simplifying image reconstruction by enabling similar time-based exposure balancing to be applied for each oversampled scan sequence.

Moreover, as can be seen by viewing the scan sequences in order of descending oversampling factor and thus reduced power consumption, low-end luminance ranges fall consistently within the same or similar integration intervals, with loss of sensitivity only at the upper luminance range. Conversely, dynamic range increases (i.e., valid read-out values obtained for wider range of luminances) with escalating oversampling factor and thus higher power consumption. Accordingly, by sliding back and forth along the oversampling scale (i.e., raising and lowering the oversampling factor) according to the dynamic range needed to capture the scene at hand, power consumption can be scaled without significant loss of image quality. This scene-adaptive dynamic range adjustment tends to be particularly beneficial for multi-frame or continuous-frame imaging modes (e.g., video capture, still image preview mode, rapid-sequence still image capture, etc.) as overall power consumption can be substantially reduced without compromising the high-dynamic-range capabilities of the image sensor.

Figure 56B:
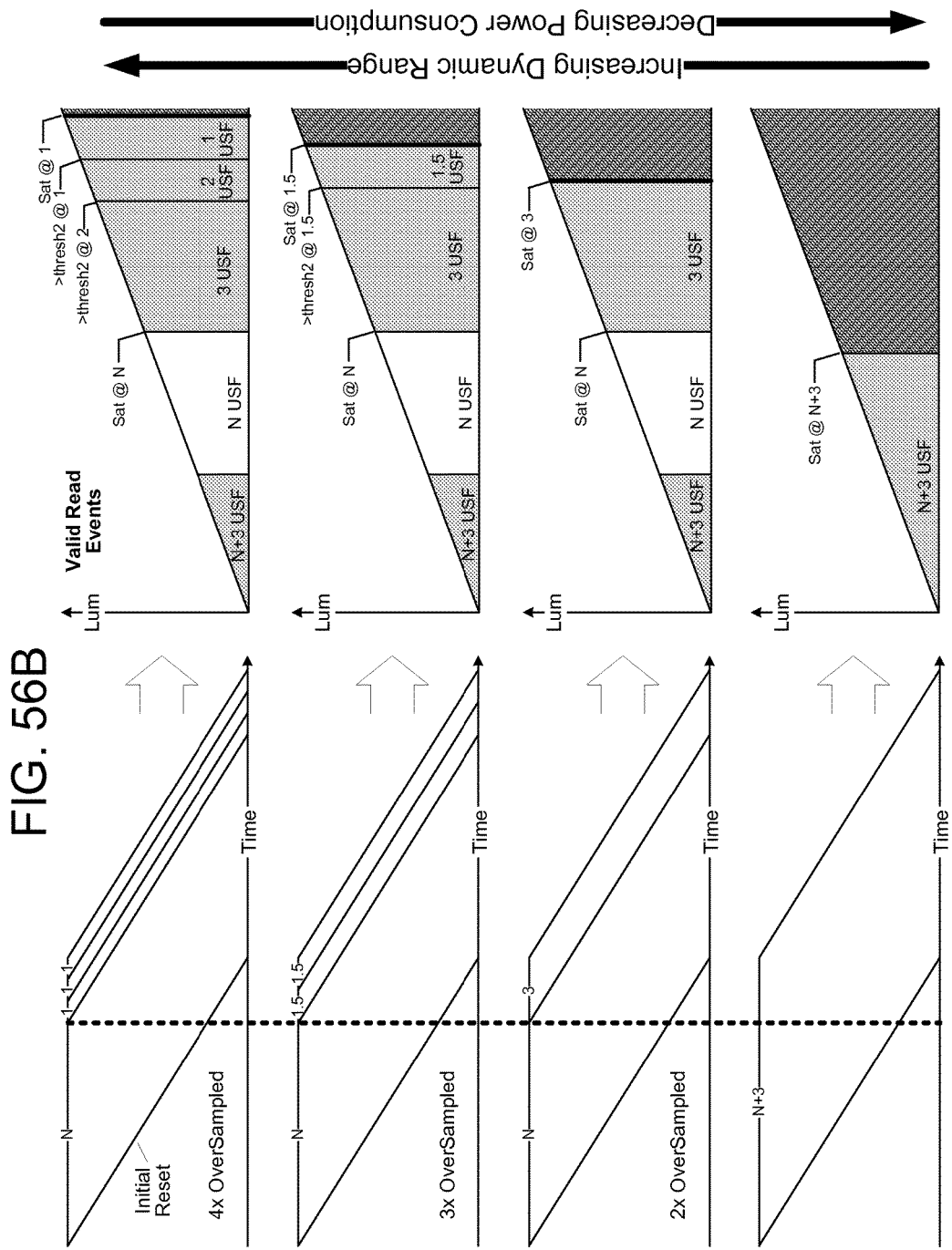
FIG. 56B illustrates charge integration profiles for the same scan sequence family shown in FIG. 56A, but with raised conditional-read thresholds applied at the conclusion of short subframes to avoid low-light conditional-read events.

FIG. 56B illustrates charge integration profiles for the same scan sequence family shown in FIG. 56A, but with higher conditional-read thresholds applied at the conclusion of short subframes (i.e., the second and third subframes in the 4× oversampled scan sequence, and the second subframe in the 3× oversampled scan sequence) to avoid low-collected-charge conditional-read events. By this arrangement luminances falling within ranges (2) and (3) of FIG. 55C are subsumed into range (1), thus avoiding a noisy end-of-frame (unconditional) read-out and extending the low-light integration interval to the full frame. From the perspective of image reconstruction, this arrangement provides the further benefit of homogenizing the low-light integration interval (i.e., to N+3) and read-out point (end of frame) across the oversampled scan sequences, thereby obviating any time-scaling that may otherwise be needed to compensate for read-outs that follow N+2, N+1 and N+1.5 charge integration intervals. As shown in the 4× charge integration profile, the increased conditional-read threshold applied during the second and third subframes extends the luminance ranges corresponding to the 3-USF and 2-USF integration intervals, which may further reduce noise relative to read-outs for single-USF charge-integration intervals, and reduce power by reducing conditional read events. Similarly, in the 3× charge integration profile, the increased conditional-read threshold applied during the second subframe extends the luminance range corresponding to the 3-USF interval which may reduce noise relative to read-outs for 1.5-USF integration intervals, and reduce power by reducing conditional read events.

FIG. 57 illustrates a set of operations that may be executed within a conditional-read image sensor or associated integrated circuit (e.g., reconstruction logic within an image processor or other integrated circuit device coupled to the image sensor) to dynamically scale the sensor's dynamic range and power consumption based, at least in part, on the scene being imaged. Starting at 1201, long and short subframe statistics are gathered in the form of a scene histogram (which can include in-range statistics as well as one or more of saturated, eclipsed, and below-threshold statistics). The histogram statistics are then applied by an exposure controller at 1203 to set the overall integration time (i.e., frame interval), ISO (or gain) and effective lens aperture (if adjustable) to achieve an optimized or otherwise superlative low-light (shadow) exposure. The exposure controller may also specify or define an exposure family (i.e., family of scan sequences) that may be parametrically or explicitly loaded into a register set (or table). Thereafter, at 1205, a scan-sequence controller dynamically switches between scan sequences of the exposure family according to dynamic range requirements and motion (including relative motion caused by camera shake) of the scene at hand, as indicated by the histogram statistics gathered at 1201, and possibly a 1/shutter speed program for motion-stopping ability of the long subframe, camera motion feedback from an accelerometer, the reconstruction processor, user inputs, battery status, etc. FIG. 58 presents an example of this final operation, with the scan-sequence controller increasing the oversampling factor from 1× to 2× (or possibly higher) upon detecting possible motion/shake or as needed to capture luminance values yielding saturation or near saturation in the solitary exposure interval, and decreasing the oversampling factor from 2× (or higher) to 1× upon detection of converse conditions—that is, no motion/shake concerns and determining that, in the shortest subframe, no or a negligible number of luminance values have been detected that would be beyond the dynamic range of the non-oversampled (single-scan) configuration. The scan-sequence controller similarly shifts the oversampling factor up or down between 2×, 3× and 4× oversampled scan sequences, for example, shifting to the next higher oversampling factor in response to luminance values that yield eclipsed or saturation or near saturation of a sufficient number of pixels (i.e., a number that exceeds a programmable setting) in the shortest subexposure, and shifting to the next lower oversampling factor (i.e., from Mx to (M−1)x) upon determining that no or a negligible number of pixels would saturate and/or nearly saturate (which number may also be established by a programmed setting) in the lower dynamic-range scan profile. It should be noted that other systems may split the responsibilities of AE and ADR, e.g., a controlling system may determine AE settings and convey these to the image sensor. The image sensor may then, within the bounds of the commanded AE settings, automatically select ADR settings according to criteria such as how well the current dynamic range matches the scene dynamic range, motion, power, etc.

FIG. 59 illustrates an image sensor embodiment that carries out both the exposure-setting and dynamic range scaling operations as described in reference to FIGS. 57 and 58. As shown, the image sensor includes a conditional-read pixel array together with column-read-out logic, row-drivers (and/or sub-frame shift registers) and row sequencing control logic all of which generally operate as described above to enable oversampled (multiple subframe) read-out of pixel values and corresponding status flags. The image sensor additionally includes an auto-exposure/auto-dynamic-range (AE/ADR) controller to carry out exposure control and dynamic range scaling operations based, at least in part, on the pixel values and/or status flags (including eclipsed, saturated, and below threshold) generated by the column read-out logic. In the embodiment shown, the AE/ADR controller includes a control logic circuit that, among other things, outputs a set of scan family parameters to a scan-family register set. In one implementation, individual scan sequence registers within the scan family register set store parameters that, when supplied via multiplexer 1231 to a row sequence controller, enabling the row sequence controller to generate row control signals corresponding to respective scan sequences with escalating oversampling factors (i.e., ranging from 1× (no oversampling) to 4× in the example shown). Thereafter, the control logic generates histogram/status flag statistics that are used to auto-adjust the dynamic range, outputting a dynamic range-select signal to multiplexer 1231 to switch between scan sequences of the family as generally described in reference to FIGS. 57 and 58.

FIG. 60 illustrates an embodiment of a control logic circuit that may be used to implement the control logic of FIG. 59. As shown, pixel readout status flags ("Flags") and pixel values are supplied to a histogram constructor, which in turn supplies histogram statistics to an auto-exposure (AE) controller and to an auto-dynamic-range (ADR) controller. The AE controller generates control signals based at least in part on the incoming histogram statistics to set the overall exposure time, aperture (i.e., for camera's that have a controllable aperture) and ISO gain, and outputs a corresponding set of scan family parameters to be loaded into the scan family register set. The ADR controller similarly evaluates the incoming histogram statistics (which may include the same and/or different sets of statistics than those relied upon by the AE controller) to generate the dynamic range selection signal (DR Sel) and thus enable run-time, scene-responsive scaling of the dynamic range, switching to lower oversampling-factor scan sequences when the histogram statistics indicate relatively low-light scenes (thus conserving power) and to higher over-sampling scan sequences when the histogram statistics indicate higher luminance conditions and thus a need for higher dynamic range. The rules for adjusting AE/ADR can be controlled by programmable parameters such as threshold levels for defined comparison operation, e.g., as can be stored in a register set accessible to the control logic.

Figure 61:
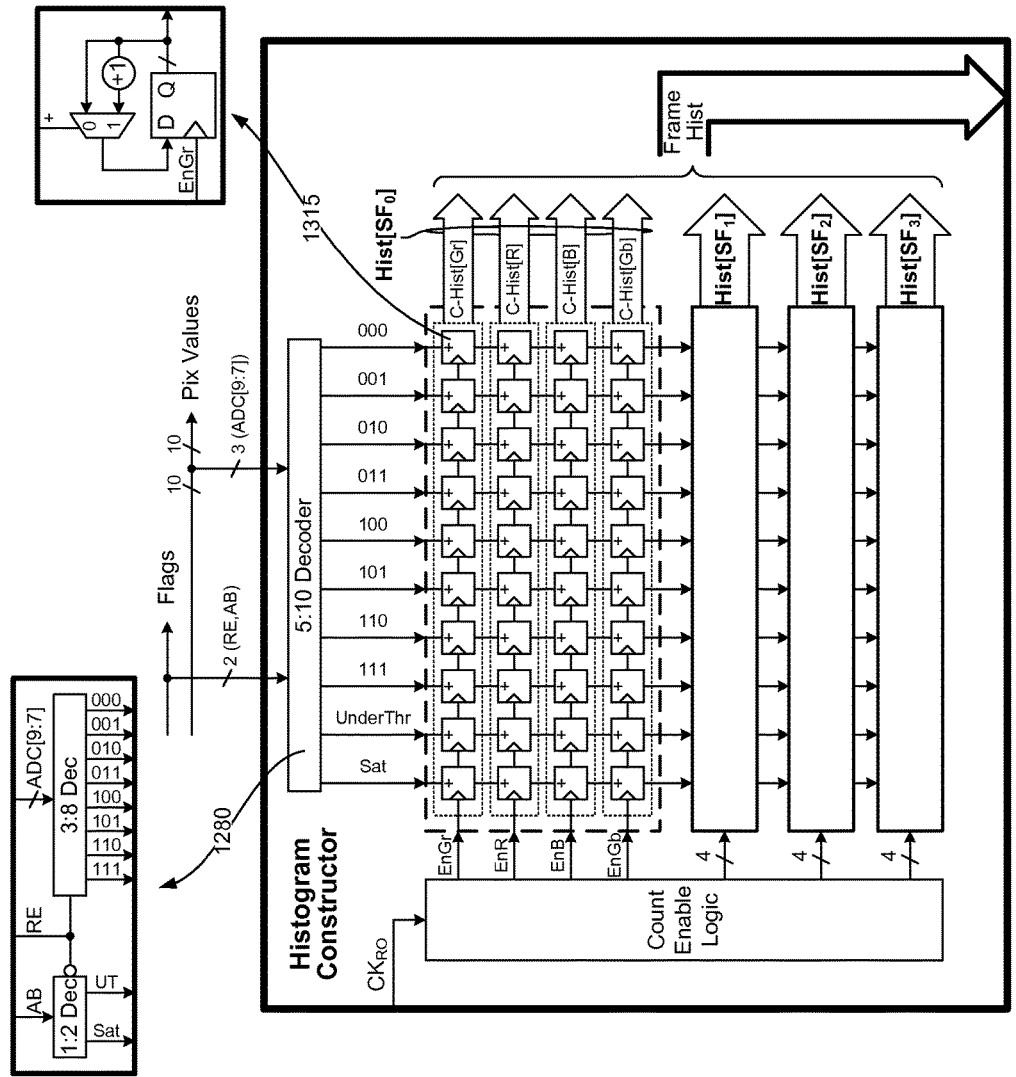
FIG. 61 illustrates an embodiment of a histogram constructor that may be used to implement the histogram constructor of FIG. 60.

FIG. 61 illustrates an embodiment of a histogram constructor that may be used to implement the histogram constructor of FIG. 60. In the implementation shown, the histogram constructor receives a number of the most significant bits (MSBs) of each pixel value (i.e., ADC[9:7] and thus the three most significant bits of a 10-bit pixel value in this example), together with a corresponding pair of pixel-state flags, including a read-enable bit (RE) and above/below-range bit (AB) having the meanings discussed above. The histogram constructor also receives a read-out clock signal ($CK_{RO}$) that marks the delivery of each new pixel value (i.e., the MSBs thereof) and status flag pair, thus enabling deterministic association of each incoming pixel value and flag pair with a given pixel row and column (and thus with a given color plane) and subframe.

Still referring to FIG. 61, each incoming 3-bit pixel value and status flag pair collectively form a 5-bit tuple which is provided to a 5:10 decoder. In one embodiment, the 5:10 decoder is implemented by a 1:2 AB-bit decoder and 3:8 pixel value decoder as shown in detail view 1280. As shown, if the incoming RE bit indicates a valid pixel read-out (i.e., RE=1 in the example depicted), then the 3:8 decoder is enabled to raise one of eight count-enable outputs according to the luminance level indicated by the three-bit pixel value. Conversely, if the RE bit indicates that the pixel read-out is invalid (i.e., RE=0), the 1:2 decoder asserts either an under-threshold count-enable signal (UT or UnderThr) or saturation count-enable signal according to the state of the AB bit. Thus, for each incoming 5-bit tuple, 5:10 decoder asserts one of ten count-enable outputs to enable the specified luminance level, saturation event or underthreshold event to be counted within an appropriate event counter within color-plane and subframe distinguished histogram counter banks. Note that more or fewer MSBs of the sensor-generated pixel values may be supplied to the histogram constructor in alternative embodiments to effect finer or coarser statistics gathering. Also, the saturation and/or underthreshold counts may be omitted in alternative embodiments, or supplemented with a dedicated eclipse-event counter.

In the embodiment shown, count-enable logic enables a selected histogram counter bank according to the subframe and color plane association indicated by a read-out clock count. For example, if a row of alternating green and red pixel values is streaming into the histogram constructor, the count enable logic alternately asserts the EnGr and EnR signals to increment the appropriate event counter (i.e., as selected by the one-hot one of the ten count-enable signals) within the Gr (green/red) and red histogram counter banks. When the read-out clock count indicates that the end of the Gr/R row has been reached for a given subframe, the count enable logic begins alternately asserting the EnB and EnGb signals to increment the appropriate event counter within the blue and green/blue histogram counter banks the next time that subframe is revisited. Similarly, when the read-out clock count indicates that the end of a subframe row has been reached, the count-enable logic begins asserting the select signals for the histogram counter banks of the subsequent subframe for the next row's worth of pixel values. At the conclusion of an image frame, the histogram results may be transferred to an output buffer to free the histogram counter banks to generate statistics for a subsequent frame. Individual event counter elements within a given histogram counter bank may be implemented as shown in detail view 1315, though other implementations may also be used, including implementations in which a shared incrementing element is used for event counters within two or more histogram counter banks. Also, while not specifically shown, the output buffer may include accumulation circuitry to add frame statistics to those from one or more preceding frames, or to add selected bins together for threshold comparisons.

Motion Detection and Blur Mitigation

FIG. 62 illustrates a photoelectric charge-integration range in log scale, showing an exemplary noise floor (a data number of 4, representing a total noise figure due to shot noise, read noise, ADC noise, etc.), conditional-read threshold (80 data number), and saturation threshold (1000 data number). In terms of motion in a scene, image blur becomes more pronounced as the charge-integration interval (i.e., net exposure interval) increases, so that the maximum blur occurs in low-light conditions that yield valid read-out values only after the entire frame interval has transpired (e.g., luminance level (1) in diagram 55A, though luminance levels (2) and (3) may yield even worse results due to the unconditional read near the noise floor). Conversely, the minimum blur occurs when the long subframe saturates (i.e., pixels saturate during the N-USF subexposure), as the only available image data is drawn from relatively short subexposures which mitigate blur by definition relative to the blur of the long subexposure. While the image blur within the extreme low-light conditions could be mitigated through introduction of forced shorter-exposure reads, the image quality enhancement may be limited, as such forced short-exposure reads will generally involve sacrifice of already limited charge accumulation data. Similarly, except for further shortening the short-exposure subframes (which is an option through scan family definition as described above), blur mitigation options are limited with respect to the bright-light conditions that saturate the long-exposure subframe. For the midtone luminance range, however, both long and short subframe read-out values are available, thus making it possible to detect object motion (including relative motion caused by camera movement) that occurs during the frame interval and to mitigate blur that would otherwise be caused by that motion in a single-capture (single-shot) image.

Building on the exposure family (scan family) principles described above, in a number of embodiments, pixel values read-out during two or more uniform short subexposure intervals are summed to yield a composite short-exposure, with the composite short exposure combined in turn with pixel values from a long subexposure in a two-subframe (or two-frame) reconstruction. This approach is shown generally in FIG. 63 in the context of a family of scan sequences each of which includes, respectively, a single 3-USF subexposure, two 1.5-USF subexposures or three 1-USF subexposures such that the net fraction of the frame interval devoted to short subexposures remains constant (i.e., 3/(N+3)) across the exemplary set of scan sequences shown. As shown, a summation logic circuit sums the pixel values read-out following each of the three 1-USF subframes when the N:1:1:1 scan sequence is selected, and sums the pixel values read-out following each of the two 1.5-USF subframes when the N:1.5:1.5 scan sequence is selected. No summation is required when the N:3 scan sequence is selected, with the pixel-values read-out following the 3-USF subframe being passed directly to the two-frame reconstruction module. As explained, the net duration of the short-exposure subframe output from the summation block is 3-USF or N+3-USF regardless of the specific scan-sequence selected. In the case of a non-oversampled scan sequence, the two-frame reconstruction may be bypassed altogether.

Still referring to FIG. 63, one challenge presented within the two-frame reconstruction block stems from the variability of the time interval over which pixel values sampled at the end of the incoming short exposure subframe (i.e., the composite output from the summing logic) were accumulated. That is, as explained above, the read-out point and charge integration interval within the conditional-read image sensor are independent of one another for all but the initial subframe, so that combining the long exposure and short exposure images based on fixed exposure time ratios may lead to erroneous results in the finalized output image, in other than static image regions. On the other hand, the presence of both long and short exposure values and/or associated status flags, may be used to guide reconstruction of the finalized image and also to detect and compensate for motion in the scene. In the embodiment of FIG. 63, for example, the two-frame reconstruction module balances the incoming long and short exposure values, and then merges the balanced exposure values in accordance with a luminance-indexed difference (or closeness) parameter to mitigate blur within the finalized output image.

FIG. 64 illustrates an embodiment of a blur-mitigating image reconstructor that may be used to implement the two-frame reconstruction module of FIG. 63. As shown, the image reconstructor receives pixel values corresponding to a long exposure (e.g., values read-out and accumulated after an initial N-USF subexposure) and a "short" exposure (e.g., values read-out after one, two or three relatively brief subexposures and, in the case of plural subexposures, summed to yield a composite short exposure value) and thus constitutes a "two-frame" reconstruction module as the pixel values from each of the long and short exposures may be viewed as individual frames, despite their acquisition within respective subframes of a single frame interval. As discussed previously, with an N:3 conditional subexposure sequence (with the 3 USF interval spanning, for example, a single subexposure of 3 USF duration, two subexposures of 1.5 USF duration or three subexposures of 1 USF duration), the summed short exposure potentially contains pixels integrated for a net N+3 USF duration (i.e., the entire frame interval) as well as pixels integrated for only a 3 USF duration, whereas the long exposure only has valid pixels integrated for an N duration.

Initially pixel values and status flags for the long and short exposures (or other information from which valid, under-threshold, and saturated pixel status may be determined) are supplied to an exposure balancing unit which, in turn, outputs balanced pixel values for the long and short exposures (i.e., "balanced long exposure" and "balanced short exposure") to downstream logic components, including a short-exposure noise filter, a minimum-difference lookup unit, an actual-difference lookup unit and exposure merging logic. The functions of each of these components are described in further detail below with respect to FIGS. 65-69.

Figures 65, 66, 67:
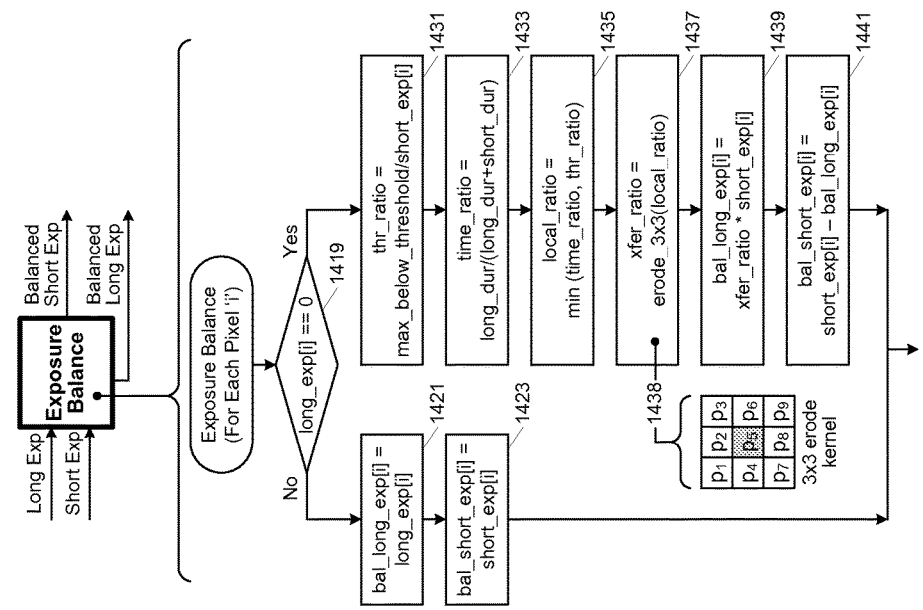
FIG. 65 illustrates an exemplary exposure balancing operation carried out within the exposure balancing unit of FIG. 64.
FIG. 66 illustrates an exemplary embodiment of the noise filter applied to the balanced short exposure within the two-frame reconstruction logic of FIG. 64.
FIG. 67 illustrates an embodiment of the minimum difference lookup of FIG. 64.

FIG. 65 illustrates an exemplary exposure balancing operation carried out within the exposure balancing unit of FIG. 64. In the embodiment shown, the exposure balancing logic identifies long exposure pixels for which no read-out value was obtained (i.e., RE=0 or pixel value is zero) and shifts a portion of the corresponding short-exposure pixel value from the short exposure pixel value to the long-exposure pixel value, thus estimating the values that would have occurred within the long and short exposures if an unconditional read-out had been executed following the long (N-USF) subexposure. Thus, for each pixel T, the pixel value from the long exposure ("long_exp[i]") is evaluated at 1419 to determine if an under-threshold condition was detected at the conclusion of the long subexposure. In the example shown, zero-valued pixel values are assumed to indicate under-threshold determination, though underthreshold status can also be determined by evaluating the RE and AB flag bits, if available. If a valid or saturated pixel value was obtained for the long-exposure (i.e., negative determination at 1419), then no estimation of the long-exposure pixel value is necessary (actual data is available) so that the incoming long and short exposure values are output as the balanced long and short exposure values, respectively (i.e., as indicated by the assignments in operations 1421 and 1423). By contrast, if no valid pixel value was obtained for the long-exposure value (affirmative determination at 1419), then a transfer ratio ("xfer_ratio") indicative of the proportion of the pixel value to be transferred from the short exposure pixel value to the long exposure pixel value (i.e., the transfer ratio indicating the desired ratio between the long and short pixel values) is determined in operations 1431, 1433, 1435 and 1437, and then multiplied with the short exposure pixel value at 1439 to yield the balanced long exposure. The proportion of short exposure pixel value allocated to the balanced long exposure is then subtracted from the short exposure pixel value at 1441 to yield a balanced short exposure pixel value and complete the transfer for that pixel.

Still referring to FIG. 65, in the absence of motion, non-constant lighting, or other distortion effect, the proportion of the short exposure pixel value to be transferred to the long exposure pixel value may be determined as a ratio of the long exposure duration to the overall frame time—a time ratio determined as shown in operation 1433 (note that this value may be constant for a given scan family and thus may be available as a fixed parameter instead of being repeatedly calculated). Where motion occurs, however, it is possible that the luminance level has increased at some point during the frame so that applying the time ratio will yield an estimated long exposure pixel value greater than the conditional-read threshold; an unduly high estimate in view of the fact that no conditional read took place in fact. Thus, in the embodiment of FIG. 65, if the time ratio is greater than a threshold ratio that would yield the conditional-read threshold (i.e., greater than thr_ratio, which is the conditional-read maximum-below-threshold value divided by the short exposure pixel value as shown at 1431), then the threshold ratio is selected as a local transfer ratio in operation 1435 (i.e., the minimum of the two ratios is selected as shown). Thereafter, at 1437, the finalized transfer ratio is determined as the minimum of the local ratios for a 3×3 neighborhood of adjacent pixels centered about the subject pixel (i.e., subject pixel at location $p_5$ within the 9-pixel neighborhood as shown at 1438), a function referred to herein as an "erode" as it serves to smooth the pixel values within a locale. Note that in an exposure program that forces an unconditional read at the end of a long subexposure, exposure balancing is unnecessary. Also, in such a case it may be possible to reduce the minimum blur ratio to zero and forego the minimum merge ratio lookup as well.

FIG. 66 illustrates an exemplary embodiment of the noise filter applied to the balanced short exposure within the two-frame reconstruction logic of FIG. 64. As shown, balanced short-exposure values corresponding to a same-color-plane neighborhood of nine pixels (which span a 5×5 multi-color-plane pixel region, as opposed to the immediate nine pixel neighborhood shown in FIG. 65 element 1438 and FIG. 67 element 1472) are applied as the filter input, with all input pixel values except those that differ from the subject pixel by more than a predetermined (or dynamically calculated) sigma value being averaged to produce a final filtered pixel output. More specifically, as shown in exemplary pseudocode listing 1460, count and sum values (each of which is initialized to zero in line 10) are incremented and accumulated at lines 40 and 50, respectively, for each pixel value that differs from the subject pixel (p5) by not more than sigma (a determination established by 'if' statement 30), thus producing a sum of all pixel values within sigma of the subject pixel and a count of the number of such pixels. As shown at line 80, the sum is divided by the count to produce the sigma-filtered average. In one embodiment, sigma is determined as a function of the value of the subject pixel, though sigma may alternatively be determined without regard to the value of the subject pixel or based on values of one or more neighboring pixels in addition to or instead of the value of the subject pixel.

FIG. 67 illustrates an embodiment of the minimum merge ratio lookup of FIG. 64. This lookup operation is also referred to herein as a luminance-indexed lookup as the luminance indicated by the balanced long exposure value for the subject pixel and possibly for neighboring pixels is used to determine a minimum expected merge ratio between balanced long and short exposure values. Thus, in the particular embodiment shown, luminance is approximated for a 3×3 neighborhood of balanced long-exposure pixel values at 1471 using the following luminance calculation:

$$\text{Approximated Luminance} = 0.5*G + 0.25*R + 0.25*B = Gr/4 + Gb/4 + R/4 + B/4$$

The spatial application of the foregoing calculation is illustrated at 1472 and applies for each position within a Bayer pattern. As shown at 1473 and 1474, the approximated luminance value is applied to a minimum merge ratio table to lookup a minimum merge ratio value for the subject pixel.

FIG. 68 illustrates an exemplary actual-difference lookup operation carried out using the balanced short and long exposure values and the luminance-indexed minimum merge ratio value output from the minimum merge ratio lookup unit. As shown, for each subject pixel 'i', a local merge ratio value is initialized to zero at 1801. If the balanced long exposure pixel value exceeds the saturation threshold (as may be indicated by an encoding of the pixel value itself and/or from the AB status flag), then the local merge ratio value remains zero and is applied within a 3×3 erode function at 1815 (i.e., a local minimum determination as discussed in reference to FIG. 65) to yield a final, output merge ratio value (thus saturated long exposure pixels result in a 3×3 surround where only short exposure values will contribute to the final image). Otherwise, at 1805, the long exposure value is scaled by the ratio of long and short exposure durations to yield a scaled long exposure value (sc_long_exp). At 1807, an actual difference table is indexed with the balanced short exposure to retrieve an allowed difference value for that pixel intensity and, at 1809, the absolute value of the difference (i.e., difference magnitude) between the balanced short exposure and scaled long exposure is determined. Preferably, noise filtering is performed on both the balanced short exposure and scaled long exposure values prior to calculation in order to better the comparison. For instance, a local 3×3 neighborhood of like-color pixels in each image can have a blur filter applied (with similar weights as those shown in FIG. 67) prior to calculation. At 1811, a raw difference value is generated based on the ratio of the difference magnitude and the allowed difference value, and at 1813, the raw difference value is clipped to a range between unity (1) and the minimum difference value to yield a finalized local difference value. Thereafter, at 1815, the 3×3 erode function is applied as described above to yield the output difference value.

FIG. 69 illustrates an exemplary exposure merge operation carried out using the filtered short exposure value, balanced long exposure value and merge ratio value output from the actual merge ratio lookup unit. As shown, the exposure merge sums the filtered short exposure value with the balanced long exposure scaled by the incoming merge ratio value, with the exposure value sum being further scaled by the ratio of the frame duration (i.e., sum of short and long exposure durations) and a sum of the short exposure duration and a difference-scaled long exposure duration. Various other exposure merging functions may be implemented in alternative embodiments. The conceptual result of this merging approach is to rely more heavily on the long exposure when the short exposure is noisy, while relying less on the long exposure when the difference in scaled intensity between the two exposures is more than would be expected for random noise effects.

FIG. 70 illustrates an alternative scan sequence family in which the long subexposure may be split into medium-duration subexposures, in this case transitioning from a relatively long 10-USF subexposure to two 5-USF subexposure durations. As shown, the two 5-USF subexposures may be summed in a summing module (e.g., in generally the same manner as described for short subexposures in reference to FIG. 63) thus enabling the two-frame reconstruction logic to remain intact.

In an alternative embodiment, the summing block for the medium-duration subexposures is omitted (or bypassed) and two separate sets of merge tables (i.e., to enable minimum merge ratio and actual merge ratio lookups for purposes of blur mitigation) are provided, one set for the last-captured 5-USF subframe (i.e., subframe 2 in the 5:5:1:1 and 5:5:2 cases) and another set for the first-captured 5-USF subframe. The two-frame reconstruction module may then merge the short-subexposure data and last-captured medium-subexposure data as generally described above if the corresponding merge ratio lookups indicate sufficiently close image values and then repeat the merging operation for the first-captured medium subexposure based on the merge ratio lookups in the tables for that subframe. Alternatively, each of the merges may be carried out with respect to the short subframe (or sum of short subframes), either sequentially or in parallel. As in embodiments described above, the final subframe read-out in each of the scan family members shown in FIG. 70 is assumed to be unconditional, while all non-final subframe read-outs are conditional. As in all embodiments described herein, any or all of the conditional read-outs may be unconditional in alternative implementations or selected operating modes.

Figure 71:
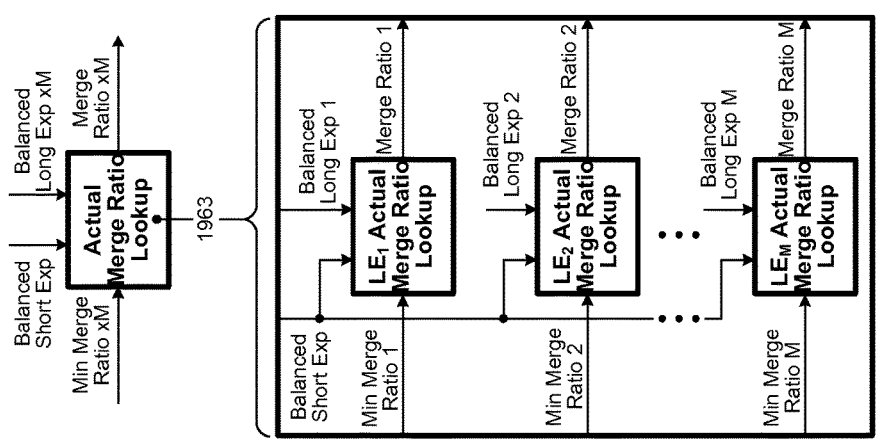
FIG. 71 illustrates an alternative implementation of the actual merge ratio lookup function in an embodiment or configuration that includes multiple long or medium exposure subframes.

FIG. 71 illustrates an alternative implementation of the actual merge ratio lookup function in an embodiment or configuration that includes multiple long or medium exposure subframes (e.g., 5:5:1:1 as discussed above, or 1:4:4:4, 6:6:1:1, etc., in which the individual subframes may be conditionally or unconditionally read). As shown, the actual merge ratio lookup module receives the balanced short exposure as in the embodiment of FIG. 68, but receives multiple (M) balanced long exposures (i.e., the pixel values therefor) and a corresponding number (M) of minimum merge ratio values, each of which may be generated as shown in FIG. 67 for a respective one of the M balanced long exposures. As shown in detail view 1963, the actual merge ratio lookup includes a set of component merge ratio lookups, each to carry out an actual merge ratio lookup with respect to the balanced short exposure based on a respective balanced long exposure/minimum merge ratio pair. Each component lookup operation may be performed generally as shown in FIG. 68, though a different actual-merge-ratio lookup table may be applied with respect to each balanced long exposure (i.e., a first lookup table $LE_1$ for balanced long exposure 1, a second and different lookup table $LE_2$ for balanced long exposure 2 and so forth). Though depicted as being carried out in parallel, the component merge ratio lookup operations or any subgroup thereof may be instead executed sequentially in alternative embodiments or configurations.

Figure 72:
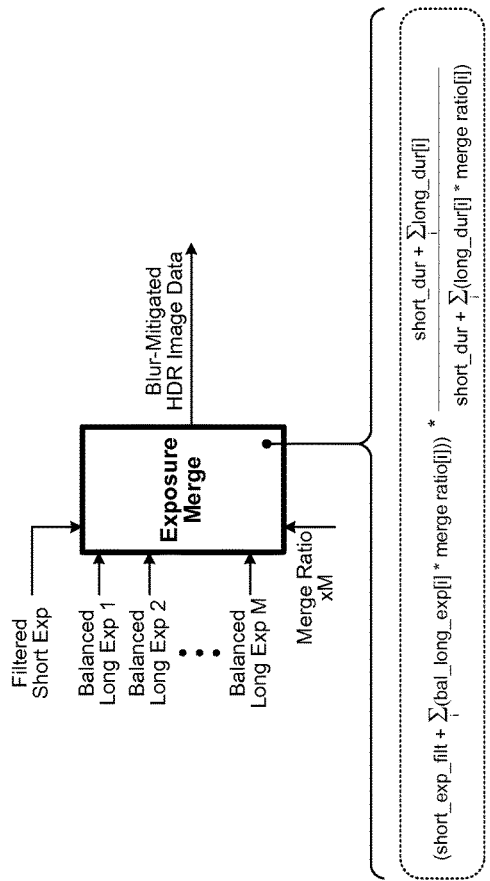
FIG. 72 illustrates an embodiment of an exposure merge function to be applied in combination with the multi-component actual merge ratio lookup of FIG. 71

FIG. 72 illustrates an embodiment of an exposure merge function to be applied in combination with the multi-component actual merge ratio lookup of FIG. 71. The exposure merge function receives pixel values for the filtered short exposure and the M balanced long exposures, and also receives M merge ratio values, one for each of the balanced long exposures. In the embodiment shown, the exposure merge function generates a sum of the products of the balanced long exposures and their respective merge ratios (e.g., a multiply-and-accumulate operation carried out for each balanced long exposure and corresponding merge ratio) and adds that sum of products to the pixel values for the filtered short exposure to produce a net pixel value sum. The exposure merge function scales the net pixel value sum according to the ratio of the overall frame time (i.e., the short duration (which itself may be a sum of short durations) added to the sum of the long durations divided by the sum of the short duration and a merge-ratio-scaled sum of long durations. Other merge functions may be applied in alternative embodiments.

Use of Unused Pixels for Dynamic Range Calculation

FIG. 73 illustrates an exemplary sensor-decimation mode that may be employed within the various sensor embodiments presented herein to enable generation of a reduced resolution preview image (e.g., to be presented to a user prior to capturing a full-resolution still image (or set of still images) or before recording video frames). In the particular configuration, a 9:1 decimation takes place within the sensor by omitting (i.e., refraining from or suppressing) pixel read-out with respect to four out of every six pixel rows and similarly with respect to four out of every six pixel columns. As a matter of terminology, the pixel rows for which image data is read-out and rendered in a preview image are referred to herein as "preview rows," and, similarly, pixel columns read-out and rendered in the preview image as "preview columns," in contradistinction to non-preview rows and non-preview columns. In the exemplary read-out sequence shown, Bayer color patterns are maintained within the decimated read-out, by capturing data from adjacent rows and adjacent columns before skipping over the two pairs of rows and/or two pairs of columns to the next pair of preview-rows and preview columns.

In the one basic decimated read-out mode, row-to-row read-out timing is maintained as it would be in the case of a full-frame read-out, with four in every six read-out time intervals going unused (note that the unused time slots may instead be applied to read the next set of preview rows, thus increasing the net scan rate by a factor of three given the exemplary decimation factor shown). In an alternative decimated read-out mode, at least some of the non-preview pixel rows are used to capture short sub-exposure data for purposes of characterizing the dynamic range and/or motion characteristics of the scene being previewed. FIG. 74A illustrates one embodiment of this decimation approach. Assuming that all pixels are reset at 2015 (e.g., an initial hard reset within the pixel array, or reset executed as part of the read-out of the prior frame), then charge will begin to integrate within the pixels of the array up until an eventual end-of frame preview read-out. At 2017, a predetermined time before the end-of-frame preview read-out, reset operations are repeated within the non-preview rows, thus restarting the charge integration within those rows so that, when the end-of-frame read-out is executed at 2019, the non-preview pixel rows have been exposed for a short subexposure and thus can be used to detect high dynamic range conditions (e.g., luminances that cause pixel saturation in longer subexposures). FIG. 74B contrasts the basic and short-exposure-data-gathering decimation readout modes described above, showing the skipped pixel row read-out operations during basic decimation read-out mode, and the edge-of-frame reset operation with respect to non-preview rows in the data gathering decimation mode. In the particular example shown, the edge-of-frame reset occurs 3 USF before the end-of-frame read-out scan, but longer or shorter durations may be applied in different embodiments or programmed configurations. Further, the edge of frame reset point may be progressively advanced toward the end of frame (i.e., shortening the subexposure) for some or all non-preview pixel rows if luminance conditions yield saturation in an initially selected short exposure interval (and conversely, the edge-of-frame reset point moved in the opposite direction to lengthen the subexposure if the initially selected short exposure interval indicates a lower luminance level).

Dark-Pixel Emulation

There a number of reasons to expect a much larger RC delay of signal lines in the pixel array in the near future. For one, 3D stacking technology will allow a large increase in the active pixel array area creating unique opportunities to use larger optical formats by pushing the analog and digital section beneath the footprint of the pixel array. Also, the pace of pixel pitch reduction is expected to slow, as the pixel pitch approaches the diffraction limit, putting greater pressure on increased optical formats to provide the generational improvements in image resolution. Further, continuing improvement in ISP processing power allows use of larger resolutions.

At least one problem with increased RC delay in image sensors is that the propagation delay across the imaging array begins to enter the transfer function bandwidth of the correlated-double-sampling (CDS) period, and the CDS period is not expected to improve significantly because source follower widths and transistor bias widths, along with column loading, makes CDS time improvement static at best. Consider that an RC time constant of 33 ns could enter a CDS transfer function of 33 Mhz, with 3 sigma settling stressing a 10 Mhz transfer function. A CDS transfer function may be from 100 khz to 1 MHz (for example and without limitation to such range), so it is easy to expect a feasibility challenge of signal uniformity in the near future. In addition, because row-wise signals are approximate square waves, dispersion due to line inductances is a factor. In practical terms, it has been observed that an 18 Megapixel sensor with 1.25 micron pitch, if driven from one side of the array, achieves visible left to right row noise, due to the RC propagation delay. Even a measured row temporal noise ratio of, for example, 14× is unacceptable in many applications, with designers opting for a differential video mode requiring nearly twice the power consumption.

There are at least two fundamental problems with the conventional row noise correction (RNC) approaches. First, the pixels in dark correction blocks, covered with a light shield or other light block material (e.g., as shown by shaded regions in FIG. 75), have different capacitive loads than the active pixels (i.e., pixels in the light sensitive portion of the array). This can cause a miscorrelation in dark signal performance between active and dark arrays. Second, the RC propagation delay across the array tends to produce a mismatch in both voltage and pulse shape that enters the pixel. As a result, the row noise correction reference pixels are fundamentally inadequate to represent the distribution of pixel behaviors across the array, and there are fundamental limits to the effectiveness of conventional RNC approaches.

Fortunately, the various conditional-read/reset pixel architectures disclosed herein, and specifically the two-dimensional control of the transfer gate between photodiode and floating diffusion, allows for a practical distributed sampling of dark level behavior, solving the fundamental problem at its root source.

Consider the exemplary 2× column-skipping (i.e., 2× decimation) video capture mode depicted in FIG. 76A. As shown by the shaded regions, half the pixels are discarded (i.e., not read-out or read-out values discarded) to achieve 2:1 column decimation. Instead of discarding these pixels, however, a unique pixel timing can be used for all or some portion of these pixels (constituting half of the array) to calculate the local black level sampled during that row. More specifically, a local "dark level" read is performed in the otherwise unused pixels, to obtain an emulated dark-pixel value. Because these active pixels are not covered by metal or other shielding and are light-sensitive, a special control sequence is applied to discard charge from the pixels before executing a CDS read-out, thus emulating the dark read within conventional shielded pixels. This operation is shown as a dark-column emulation in FIG. 76A, with every other pair of columns (i.e., a Bayer-pattern width) being applied to emulate a dark-column read. FIG. 76B illustrates an exemplary dark-emulation with respect to a full-resolution temporally-oversampled pixel array. In the example shown, each row of pixels is logically organized in groups of N pixels (e.g., 48 pixels sharing an ADC circuit as discussed above) and in which a random or pseudo-random or otherwise deterministic one (or more) of the pixels within each N-pixel group is "dark-sampled" each subframe—read-out using a dark-column emulation protocol as discussed below. In the particular arrangement shown, the pixel(s) selected for dark-emulation read-out is dynamically varied for each N-pixel group within a given row and subframe, and with the dynamic selection repeated for each successive row to disperse the dark-emulation read-out in a preferably invisible sequence, but with controlled density, throughout the pixel array. Note that, in one embodiment, a pixel used for dark-pixel emulation in one subframe of a frame may be used as a light-gathering pixel in one or more other subframes of the same frame. Also, in various embodiments, dark-emulation read-out is applied exclusively with respect to green pixels (i.e., pixels covered by or otherwise associated with a green color filter element) in view of the larger proportion of those pixels within the array (e.g., 2× in a Bayer-pattern CFA).

FIG. 77 illustrates exemplary timing diagrams for a number of pixel read-out modes within a conditional-read image sensor, including the conditional and unconditional read-out modes described above as well as a dark-emulation read-out mode. In the timing diagrams shown, the row and column transfer gate control signals (TGr and TGc) are shown in a combined, logically-ANDed form as "transfer-enable" signal, "TxEn"). As shown, both the conditional and unconditional read-out operations commence with a floating diffusion reset operation (pulsing the RG signal as discussed above), followed by a reset-state sampling operation at 2101 (pulsing the SHR signal). In the conditional read operation, the partial read operation and threshold evaluation are omitted for ease of understanding, but are carried out as previously described. TxEn is raised only in columns for which an over-threshold pixel state is detected (i.e., conditionally asserting TGc as discussed above, thus enabling full transfer of integrated charge from photodiode to floating diffusion pursuant to pixel read-out), while TGc and thus TxEn is asserted unconditionally. SHS is asserted in both conditional and unconditional instances to trigger signal-state sampling.

Still referring to FIG. 77, dark-emulation read-out begins with assertion of TxEn at 2117 for selected columns on a row to transfer integrated charge from photodiode to floating diffusion and thus empty (reset) the photodiode. As discussed below, this operation is controlled through assertion of TGc within pattern-selected pixel columns, with the selection pattern being dynamically varied from row to row and/or from subframe to subframe. After the photodiode reset at 2117, the remaining operations are the same as unconditional read mode and thus include the floating diffusion reset (RG pulse, which may overlap the TxEn pulse), reset-state sample (SHR pulse), and signal-state read-out (TxEn pulse followed by SHS pulse), with the signal-state read-out capturing the empty state of the photodiode and thus an emulation of a dark pixel read-out. It is noted that such pixels are not truly "dark" in that they gather light between the two TxEn pulses. Generally, however, these two operations are only a few microseconds apart and vanishingly little to no light will be gathered, compared to the surrounding light-gathering operations that gather light for hundreds of microseconds to hundreds of milliseconds, depending on exposure. In a given embodiment, various techniques can be used to compensate for or reject a "dark" pixel that has received too much actual light or is faulty, including: rejecting a dark value based on eclipse detection; rejecting a dark value based on its variation from other dark values gathered for that row and subframe; rejecting a dark value based on the amount of light gathered by surrounding pixels; or compensating for light gathered by such a pixel by subtracting from its value a proportional fraction of light gathered by surrounding light-gathering pixels.

Figure 78:
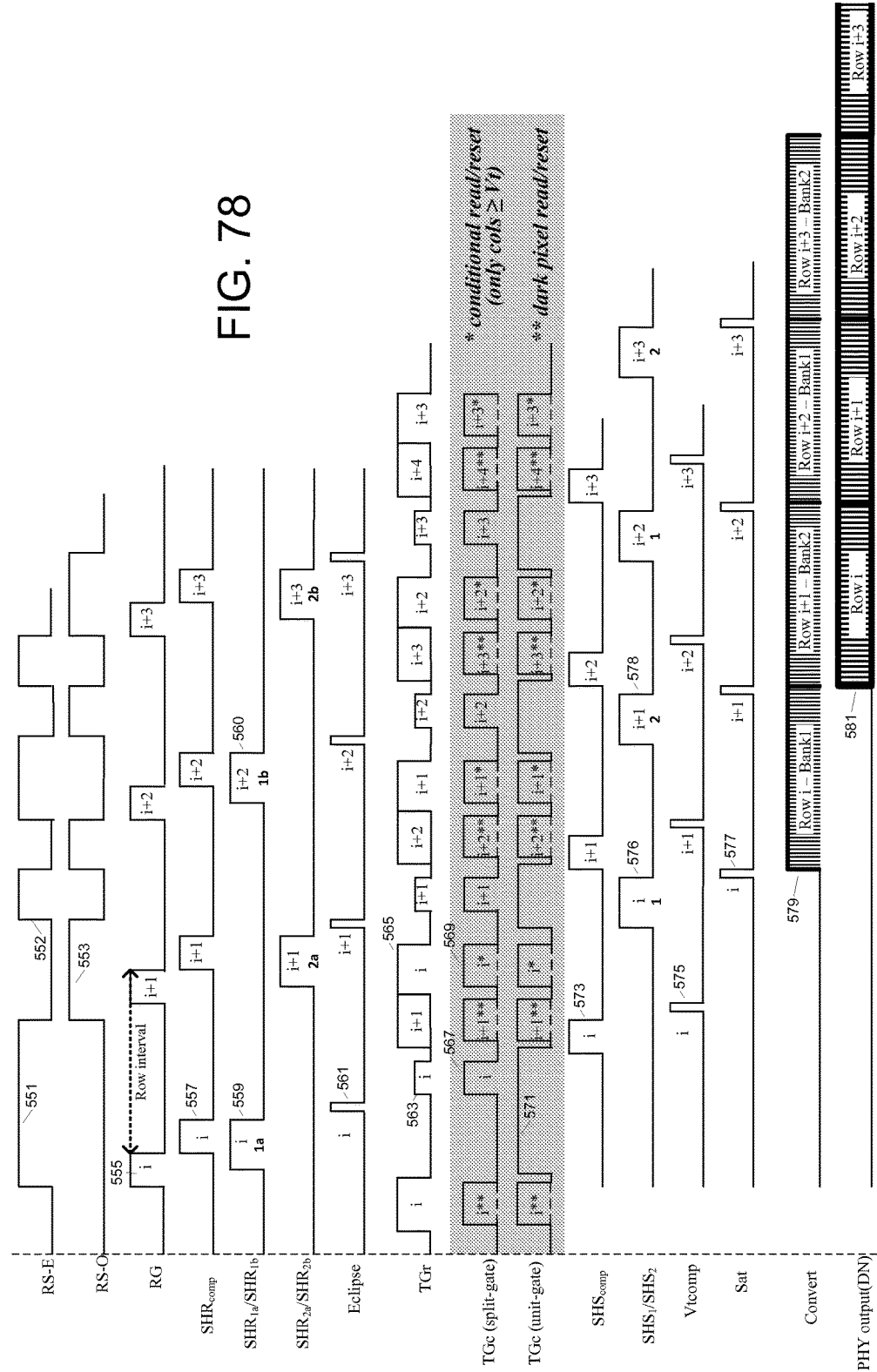
FIG. 78 illustrates a more complete timing diagram for emulated dark-pixel read-out, showing the pipelined sequence of operations within the pixel array, sample-and-hold logic, comparator and ADC circuitry.

FIG. 78 illustrates a more complete timing diagram for emulated dark-pixel read-out, showing the pipelined sequence of operations within the pixel array, sample-and-hold logic, comparator and ADC circuitry. As shown, additional TGc pulses are applied to reset the photodiode in columns selected for dark-emulation read-out in each row. As explained above, conditional-assertion of TGc during the signal-state read-out operation (i.e., TGc signal pulses denoted by '*') applies during conditional-read/reset operations—TGc is asserted unconditionally during the same interval in an unconditional read operation. In either case, pixels that were designated as dark pixels for that row (i.e., operations denoted by '**') are also read at the time of the conditional or unconditional read of the light-gathering pixels on the row for that subframe.

FIG. 79 illustrates an exemplary image sensor architecture 2170 that supports emulated-dark read-out operations discussed above. As shown, the image sensor includes row logic 2171 and read-out control logic 2173, both of which operate generally as discussed in reference to FIG. 52, except that row logic 2171 is modified to generate the additional TGr pulse shown in FIG. 78 (i.e., to enable pre-read photodiode reset operations in selected dark-emulation pixels) and read-out control logic 2713 is modified to provide one or more additional dark-emulation control signals as discussed below. As in the embodiment of FIG. 52, the pixel array includes a number of m*n pixel blocks, only one of which is shown (i.e., pixel block 'i' 985), and the column read-out circuitry includes a corresponding number of constituent read-out logic blocks, only one of which is shown (read-out block 'i' 2177). While the pixel array is implemented generally as described above, each of the read-out blocks 2177 is modified to support dark-emulation read-out. More specifically, read-out block 2177 includes multi-bank sample/hold circuitry 991, multiplexers 992 and 998, column-shared PGA 1001 and column-shared ADC 1003, status bit buffers 995 and 997, and output buffers 1005 and 1007, all of which operate generally as discussed above. Note that the RE/MP status flags stored with buffers 995 and 997 are similar to and consume the same storage as the RE/AB status flags discussed above, but are additionally used to signify instances of dark-emulation read-out data as discussed below. The per-column comparator circuitry 2181 also operates generally as discussed above, except that additional control logic is provided within the read-enable logic circuitry and status bit generation circuitry to accommodate dark-emulation read-out. Further, in the embodiment shown, a dark-column pattern controller 2183 is provided to control the pixel column or columns selected for dark-emulation read-out within a given row and/or subframe.

FIG. 80 illustrates an embodiment of a dark-column pattern controller 2201 that may be used to implement pattern controller 2183 of FIG. 79. In the implementation shown, pattern controller 2201 includes a pseudo-random number generator 2203 that outputs a pseudo-random M-bit number to M:n decoder 2205. Decoder 2205 decodes the incoming pseudo-random number to assert one of n dark-emulation enable signals (EnDE), thus enabling a dark-emulation operation within the corresponding pixel column. As each successive pixel row is selected for conditional or unconditional read-out, the pseudo-random number generator produces a new pseudo-random number, thereby selecting a different pixel column for dark-emulation and randomizing the pattern of dark-emulation pixels within the pixel block. In one embodiment, pseudo-random number generator 2203 may be designed to ensure a minimum pixel offset between pixels in successive rows and may also be seeded (or constructed) differently than the pseudo-random number generator for neighboring pixel blocks to randomize the dark-emulation pixel pattern from block to block. For example, a single generator may be used with different scramblings of M bitlines to each block—the pseudo-random number may be larger than M bits as well, with different subgroups of the bits supplied to each block Also, M:n decoder 2205 and/or pseudo-random number generator 2203 may include circuitry to ensure assertion of an adjacent green pixel in response to a pseudo-random number that would otherwise select a red or blue pixel column within a given column, thus effecting a green-pixel-only dark-emulation embodiment.

In other embodiments, the controller can comprise a circuit to feed a bit pattern into one end of a linear shift register, with one register element per column of the array. A pattern of '0' and '1' bits is fed into the shift register, along with calculated shift lengths between rows, to provide the EnDE[i] signals. For decimated modes, the register can be loaded with a fixed pattern that does not change between rows, subframes, and frames. In other embodiments, various other circuits may be employed to control which columns are designated for dark-emulation read-out within each row and subframe.

FIG. 81 illustrates an embodiment of a read-enable logic circuit 2220 modified to support dark-emulation read-out. More specifically, eclipse and overthreshold flags are supplied, together with the EnDE bit for the subject pixel column (i.e., EnDE[i]), to a read/dark-emulation logic circuit 2221 which asserts the TGc signal for that pixel column (i.e., TGc[i]) according to those inputs and a set of control inputs from the read-out control logic (i.e., element 2173 of FIG. 79). In one embodiment, shown for example in FIG. 82, read/dark-emulation logic 2221 asserts TGc[i] in response to one of three circumstances: (i) a conditional read is to be carried out as indicated by either an eclipsed state (in which the conditional read is executed to clear the photodiode and floating diffusion) or an overthreshold determination; (ii) an unconditional read is to be executed as signaled by an all-column unconditional-read signal from the read-out control logic; or (iii) the dark-read enable bit, EnDE[i], is asserted for the subject pixel column. In the depicted implementation, the EnDE bit is logically ANDed with a dual-pulse dark-emulation timing signal from the read-out control logic ("Dark Read") to generate a two-pulse TGc signal assertion; an initial pulse to enable the photodiode emptying operation discussed above, and a final pulse to enable the signal-state capture operation at the same time that signal-states are captured for light-gathering pixels.

Returning to FIG. 81, the EnDE[i] bit is also supplied to ADC-enable/dilation logic circuit 2203 to enable generation of status flags, RE and MP. In the embodiment shown, an asserted RE bit signals an ADC-enable event as discussed above, and when RE is low, the MP bit (multi-purpose bit) is high or low to indicate the reason for the ADC suppression (i.e., MP=0 if pixel underthreshold, MP=1 if pixel eclipsed or saturated). In contrast to embodiments in which one of the status flags (e.g., the AB bit described above) is unused and reallocated to ADC bit conveyance in the event of a logic '1' RE bit, the MP bit is retained in the ADC-enable case and used to indicate whether the read-out is a dark-emulation read-out (MP=1) or an image data read-out (MP=0). One consequence of this arrangement is that the net data stream size may be increased by one bit relative to the double-duty AB-bit/ADC-bit embodiments, though the status flags may be encoded within the ADC value itself (e.g. reserving upper and/or lower ADC values to signal the different status conditions shown), thus avoiding data bandwidth increase.

Figure 83:
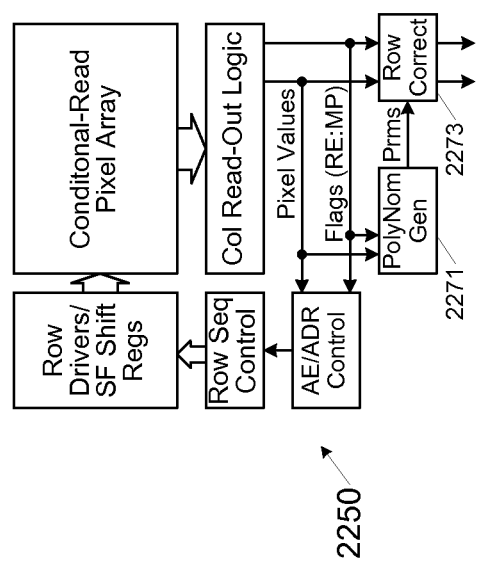
FIG. 83 illustrates an embodiment of a conditional-read image sensor that applies dark-emulation read-out data to perform row noise correction.

FIG. 83 illustrates an embodiment of a conditional-read image sensor 2250 that applies dark-emulation read-out data to perform row noise correction (RNC). As in embodiments discussed above, image sensor 2250 includes a conditional-read pixel array, row drivers (or shift registers) for sequencing through rows of the array (e.g., to enable interleaved subframe read-out in selected read-out modes), row sequence control, AE/ADR control and column read-out logic (e.g., including the read-out control logic and read-out logic blocks described in reference to FIG. 79), all of which operate generally as described above to generate pixel values and status flags, including an MP status flag that indicates whether a given pixel value resulted from a dark-emulation read-out operation.

Image sensor 2250 additionally includes a polynomial generator 2271 which receives the incoming pixel flags and pixel values and, based on those pixel values indicated to be dark-emulation read-out values (and their locations as indicated, for example, by determinism with respect to pixel value location within the read-out data stream), iteratively updates (and outputs) the coefficients and, optionally, the order of a row-noise-correction polynomial. Row correction logic 2273 receives the incoming polynomial parameters ("Prms") and applies the indicated row-noise-correction polynomial to the pixel values streaming from the column read-out logic. Though not specifically shown, row correction logic 2273 may buffer pixel values as necessary to account for polynomial generation latency, thus applying the polynomial generated/updated with respect to a given row of pixel values to the pixel rows to that row of pixel values.

The polynomial generator can be designed according to the requirements of the particular sensor. In some embodiments, actual dark columns can be implemented in the periphery, and can be used in some modes either instead of or along with the emulated dark pixels for row temporal noise correction. The polynomial generator may generate, e.g., a least-square linear fit, a higher-order fit, or a local fit that interpolates between nearby dark pixels to generate the row correction value for each pixel. The row correction logic may, in some embodiments, be capable of producing a "repaired" pixel value for the missing image data at a dark pixel; in other embodiments, such pixels are merely flagged and treated similar to saturated pixels during reconstruction.

In some embodiments, the polynomial generator and row temporal noise correction are implemented on a separate processor, e.g., used to reconstruct frames from multiple conditional/unconditional subframes. In such embodiments, the emulated dark pixel data is transmitted within the data stream and used at reconstruction. Preferably, dark row data would also be transmitted to the separate processor and used to correct column fixed pattern noise and dark current subtraction after row temporal noise correction.

The ability to provide arbitrarily complex in-array correction for row temporal noise can be exploited to provide other new features. For instance, it is possible to relax one or more parameters for across-array temporal noise uniformity, instead relying on dark-pixel emulation to back out the non-uniformity. In another example, pixels can be intentionally varied across the array, e.g., to compensate for light fall-off by providing higher quantum efficiency toward the edges, again relying on dark-pixel emulation to back out the resulting row temporal noise non-uniformity.

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit image sensor having a pixel array, the method comprising:
   oversampling the pixel array following each of a plurality of subexposure intervals that transpire within a frame interval to generate a respective plurality of subframes of image data, the plurality of subexposure intervals including at least one long subexposure interval and a plurality of uniform short subexposure intervals each shorter in duration than the long exposure interval;
   summing the subframes of image data generated with respect to the uniform short subexposure intervals to generate summed short-subexposure image data; and
   combining the summed short-subexposure image data with the subframe of image data generated with respect to the at least one long subexposure interval to produce an output image.

2. The method of claim 1 wherein combining the summed short-subexposure image data with the subframe of image data generated with respect to the at least one long subexposure interval to produce the output image comprises adjusting constituent pixel values within at least one of the subframe image of image data generated with respect to the at least one long subexposure or the summed short exposure image data to account for a difference between durations of the long and short subexposure intervals.

3. The method of claim 1 wherein oversampling the pixel array following each of the plurality of subexposure intervals comprises conditionally reading out pixel values from the pixel array following at least the one long subexposure interval, including reading out pixel values from and resetting over-threshold pixels within the pixel array for which a level of photocharge integration exceeds a conditional-read threshold, and refraining from resetting under-threshold pixels within the pixel array for which the level of photocharge integration does not exceed the conditional-read threshold such that photocharge integrated within the under-threshold pixels is left within the under-threshold pixels to be supplemented by further photocharge integration during at least one of the plurality of subexposure intervals that succeeds the long subexposure interval.

4. The method of claim 3 wherein combining the summed short-subexposure image data with the subframe of image data generated with respect to the at least one long exposure interval to produce the output image comprises increasing constituent pixel values within the subframe image of image data generated with respect to the at least one long subexposure and decreasing constituent pixel values within the summed short exposure image data to account for the photocharge left within the under-threshold pixels.

5. The method of claim 4 wherein increasing constituent pixel values within the subframe of image data generated with respect to the at least one long subexposure comprises increasing those constituent pixel values by respective amounts equal to amounts by which corresponding constituent pixel values within the summed short exposure image data are decreased.

6. The method of claim 4 wherein increasing constituent pixel values within the subframe of image data generated with respect to the at least one long subexposure comprises limiting the increase within those constituent pixel values to a pixel value that corresponds to the conditional-read threshold.

7. The method of claim 1 wherein combining the summed short-subexposure image data with the subframe of image data generated with respect to the at least one long subexposure interval comprises attenuating constituent pixel values within the subframe of image data generated with respect to the at least one long subexposure based on a difference between the subframe of image data generated with respect to the at least one long subexposure and the summed short subexposure image data.

8. The method of claim 7 wherein attenuating constituent pixel values within the subframe of image data generated with respect to the at least one long subexposure comprises multiplying the constituent pixel values within the subframe of image data generated with respect to the at least one long subexposure by a difference factor equal to or less than one, the method further comprising generating the difference factor based on the magnitude of a difference between constituent pixel values within the subframe of image data generated with respect to the at least one long subexposure and constituent pixel values within the summed short subexposure image data after scaling the constituent pixel values within at least one of the subframe of image data generated with respect to the at least one long subexposure and the summed short subexposure image to account for difference in durations of the long and short subexposure intervals.

9. The method of claim 1 wherein the uniform short exposure intervals transpire after the long exposure interval.

10. The method of claim 1 wherein oversampling the pixel array following each of the plurality of sub exposure intervals to generate the respective plurality of subframes of image data comprises commencing row-by-row read-out of the pixel array at respective times for each of the plurality of subframes of image data, including commencing row-by-row read-out of the pixel array for a final one of the subframes of image data prior to completion of row-by-row readout of the pixel array for any others of the subframes of image data.

11. An integrated-circuit image sensor comprising:
a pixel array;
read-out circuitry to oversample the pixel array following each of a plurality of subexposure intervals that transpire within a frame interval to generate a respective plurality of subframes of image data, the plurality of subexposure intervals including at least one long subexposure interval and a plurality of uniform short subexposure intervals each shorter in duration than the long exposure interval; and
image reconstruction circuitry to (i) sum the subframes of image data generated with respect to the uniform short subexposure intervals to generate summed short-subexposure image data, and (ii) combine the summed short-subexposure image data with the subframe of image data generated with respect to the at least one long subexposure interval to produce an output image.

12. The integrated-circuit image sensor of claim 11 wherein the read-out circuitry to oversample the pixel array following each of the plurality of subexposure intervals comprises circuitry to commence row-by-row read-out of the pixel array at respective times for each of the plurality of subframes of image data and to commence row-by-row read-out of the pixel array for a final one of the subframes of image data prior to completion of row-by-row readout of the pixel array for any others of the subframes of image data.

13. The integrated-circuit image sensor of claim 11 wherein the image reconstruction circuitry to combine the summed short-subexposure image data with the subframe of image data generated with respect to the at least one long exposure interval to produce the output image comprises logic to adjust constituent pixel values within at least one of the subframe image of image data generated with respect to the at least one long subexposure or the summed short exposure image data to account for a difference between durations of the long and short subexposure intervals.

14. The integrated-circuit image sensor of claim 11 wherein the read-out circuitry to oversample the pixel array following each of the plurality of subexposure intervals comprises circuitry to conditionally read out pixel values from the pixel array following at least the one long subexposure interval, including reading out pixel values from and to reset over-threshold pixels within the pixel array for which a level of photocharge integration exceeds a conditional-read threshold, and refrain from resetting under-threshold pixels within the pixel array for which the level of photocharge integration does not exceed the conditional-read threshold such that photocharge integrated within the under-threshold pixels is left within the under-threshold pixels to be supplemented by further photocharge integration during at least one of the plurality of subexposure intervals that succeeds the long subexposure interval.

15. The integrated-circuit image sensor of claim 14 wherein the image reconstruction circuitry to combine the summed short-subexposure image data with the subframe of image data generated with respect to the at least one long subexposure interval to produce the output image comprises logic to increase constituent pixel values within the subframe image of image data generated with respect to the at least one long subexposure and decreasing constituent pixel values within the summed short exposure image data to account for the photocharge left within the under-threshold pixels.

16. The integrated-circuit image sensor of claim 15 wherein the logic to increase constituent pixel values within the subframe of image data generated with respect to the at least one long subexposure comprises logic to increase those constituent pixel values by respective amounts equal to amounts by which corresponding constituent pixel values within the summed short exposure image data are decreased.

17. The integrated-circuit image sensor of claim 15 wherein the logic to increase constituent pixel values within the subframe of image data generated with respect to the at least one long subexposure comprises logic to limit the increase within those constituent pixel values to a pixel value that corresponds to the conditional-read threshold.

18. The integrated-circuit image sensor of claim 11 wherein the image reconstruction circuitry to combine the summed short-subexposure image data with the subframe of image data generated with respect to the at least one long subexposure interval comprises logic to attenuate constituent pixel values within the subframe of image data generated with respect to the at least one long subexposure based on a difference between the subframe of image data generated with respect to the at least one long subexposure and the summed short subexposure image data.

19. The integrated-circuit image sensor of claim 18 wherein the logic to attenuate constituent pixel values within the subframe of image data generated with respect to the at least one long subexposure comprises logic to multiply the constituent pixel values within the subframe of image data generated with respect to the at least one long subexposure by a difference factor equal to or less than one, the image reconstruction circuitry further comprising logic to generate the difference factor based on the magnitude of a difference between constituent pixel values within the subframe of image data generated with respect to the at least one long subexposure and constituent pixel values within the summed short subexposure image data after scaling the constituent pixel values within at least one of the subframe of image data generated with respect to the at least one long subexposure and the summed short subexposure image to account for difference in durations of the long and short subexposure interval.

20. An integrated-circuit image sensor comprising:
a pixel array;
means for oversampling the pixel array following each of a plurality of subexposure intervals that transpire within a frame interval to generate a respective plurality of subframes of image data, the plurality of subexposure intervals including at least one long subexposure interval and a plurality of uniform short subexposure intervals each shorter in duration than the long exposure interval;
means for summing the subframes of image data generated with respect to the uniform short subexposure intervals to generate summed short-subexposure image data; and
means for combining the summed short-subexposure image data with the subframe of image data generated with respect to the at least one long subexposure interval to produce an output image.

* * * * *